(12) United States Patent
Blum et al.

(10) Patent No.: US 12,436,411 B2
(45) Date of Patent: Oct. 7, 2025

(54) MOISTURE-RESISTANT EYE WEAR

(71) Applicant: e-Vision Optics, LLC, Sarasota, FL (US)

(72) Inventors: Ronald D. Blum, Roanoke, VA (US); Claudio Dalla Longa, Roanoke, VA (US); Mark Graham, Roanoke, VA (US); Joshua Haddock, Roanoke, VA (US); Yongping Wang, Philadelphia, PA (US)

(73) Assignee: e-Vision Optics, LLC, Sarasota, FL (US)

( * ) Notice: Subject to any disclaimer, the term of this patent is extended or adjusted under 35 U.S.C. 154(b) by 0 days.

(21) Appl. No.: 17/484,540

(22) Filed: Sep. 24, 2021

(65) Prior Publication Data
US 2022/0057657 A1 Feb. 24, 2022

Related U.S. Application Data

(63) Continuation of application No. 16/704,591, filed on Dec. 5, 2019, now Pat. No. 11,586,057, which is a
(Continued)

(51) Int. Cl.
*G02C 11/00* (2006.01)
*G02B 27/01* (2006.01)
(Continued)

(52) U.S. Cl.
CPC ............ *G02C 11/10* (2013.01); *G02B 27/017* (2013.01); *G02C 5/2209* (2013.01); *G02C 7/083* (2013.01);
(Continued)

(58) Field of Classification Search
CPC ...... G02C 11/10; G02C 5/2209; G02C 7/083; G02C 7/081; G02C 7/08; G02C 7/088;
(Continued)

(56) References Cited

U.S. PATENT DOCUMENTS 2,207,705 A 7/1940 Cox
2,437,642 A 3/1948 Henroteau
(Continued)

FOREIGN PATENT DOCUMENTS

CN 89113088 A 10/2001
DE 2304134 A1 8/1973
(Continued)

OTHER PUBLICATIONS

U.S. Appl. No. 61/362,877, filed Jul. 9, 2010.
(Continued)

*Primary Examiner* — Marin Pichler
(74) *Attorney, Agent, or Firm* — Smith Baluch LLP

(57) ABSTRACT

Embodiments may provide a first device that comprises eyeglasses, where the eyeglasses may further include a lens housing, a first temple and a second temple coupled to the lens housing, and a first and a second lens supported by the lens housing. The first device may further include a façade that covers the lens housing. The first device may further comprise an electronic component and at least one conductive path may be provided from the electronic component to the first lens having a portion that runs through the lens housing.

27 Claims, 30 Drawing Sheets

Related U.S. Application Data continuation of application No. 13/890,809, filed on May 9, 2013, now Pat. No. 10,613,355, which is a continuation-in-part of application No. 13/298,997, filed on Nov. 17, 2011, now Pat. No. 8,944,590, which is a continuation-in-part of application No. 13/179,219, filed on Jul. 8, 2011, now Pat. No. 8,979,259, and a continuation-in-part of application No. 13/175,633, filed on Jul. 1, 2011, now Pat. No. 8,783,861, and a continuation-in-part of application No. 13/175,634, filed on Jul. 1, 2011, now abandoned.

(60) Provisional application No. 61/481,353, filed on May 2, 2011, provisional application No. 61/362,877, filed on Jul. 9, 2010, provisional application No. 61/415,391, filed on Nov. 19, 2010, provisional application No. 61/376,719, filed on Aug. 25, 2010, provisional application No. 61/361,110, filed on Jul. 2, 2010.

(51) Int. Cl.
*G02C 5/22* (2006.01)
*G02C 7/08* (2006.01)
*G02C 7/10* (2006.01)
*H01R 35/04* (2006.01)
*G02C 5/14* (2006.01)
*H01R 13/24* (2006.01)

(52) U.S. Cl.
CPC ............ *G02C 7/101* (2013.01); *H01R 35/04* (2013.01); *G02B 2027/0134* (2013.01); *G02B 2027/0178* (2013.01); *G02C 5/146* (2013.01); *H01R 13/2414* (2013.01)

(58) Field of Classification Search
CPC .......... G02C 7/10; G02C 7/101; G02C 5/146; G02B 27/017; G02B 2027/0134; G02B 2027/0178; H01R 35/04; H01R 13/2414
USPC ... 351/41, 49, 168, 228, 246, 215, 216, 232, 351/159; 359/652, 655, 665, 666, 494
See application file for complete search history.

(56) References Cited

U.S. PATENT DOCUMENTS

| | | | |
|---|---|---|---|
| 2,576,581 A | 11/1951 | Edwards | |
| 2,915,598 A | 12/1959 | Brunton | |
| 2,930,857 A | 3/1960 | Hollingsworth | |
| 3,119,903 A * | 1/1964 | Rosemond ............ | G02C 11/06 351/158 |
| 3,160,735 A | 12/1964 | Gustave | |
| 3,161,718 A | 12/1964 | De Luca | |
| 3,245,315 A | 4/1966 | Marks et al. | |
| 3,309,162 A | 3/1967 | Kosanke et al. | |
| 3,612,744 A | 10/1971 | Thomas | |
| 3,614,215 A | 10/1971 | Leo | |
| 3,738,734 A | 6/1973 | Tait et al. | |
| 3,791,719 A | 2/1974 | Kratzer et al. | |
| 3,883,701 A | 5/1975 | Delorenzo | |
| 4,053,789 A | 10/1977 | Schultz | |
| 4,062,629 A | 12/1977 | Winthrop | |
| 4,152,846 A | 5/1979 | Witt | |
| 4,174,156 A | 11/1979 | Glorieux | |
| 4,181,408 A | 1/1980 | Senders | |
| 4,190,330 A | 2/1980 | Berreman | |
| 4,243,306 A | 1/1981 | Bononi | |
| 4,254,451 A | 3/1981 | Cochran, Jr. | |
| 4,264,154 A | 4/1981 | Petersen | |
| 4,279,474 A | 7/1981 | Belgorod | |
| 4,283,127 A | 8/1981 | Rosenwinkel et al. | |
| 4,290,052 A | 9/1981 | Eichelberger et al. | |
| 4,300,818 A | 11/1981 | Schachar | |
| 4,320,939 A | 3/1982 | Mueller | |
| 4,373,218 A | 2/1983 | Schachar | |
| 4,395,736 A | 7/1983 | Fraleux | |
| 4,418,990 A | 12/1983 | Gerber | |
| 4,423,929 A | 1/1984 | Gomi | |
| 4,431,262 A | 2/1984 | Tolles | |
| 4,451,709 A | 5/1984 | Waxman | |
| 4,457,585 A | 7/1984 | Ducorday | |
| 4,461,550 A | 7/1984 | Legendre | |
| 4,466,703 A | 8/1984 | Nishimoto | |
| 4,466,706 A | 8/1984 | Lamothe, II | |
| 4,520,238 A | 5/1985 | Ikeda | |
| 4,529,268 A | 7/1985 | Brown | |
| 4,537,479 A | 8/1985 | Shinohara et al. | |
| 4,564,267 A | 1/1986 | Nishimoto | |
| 4,572,616 A | 2/1986 | Kowel et al. | |
| 4,577,928 A | 3/1986 | Brown | |
| 4,598,960 A | 7/1986 | DiSanto et al. | |
| 4,601,206 A | 7/1986 | Watson | |
| 4,601,545 A | 7/1986 | Kern | |
| 4,609,824 A | 9/1986 | Munier et al. | |
| 4,712,870 A | 12/1987 | Robinson et al. | |
| 4,756,605 A | 7/1988 | Okada et al. | |
| 4,772,094 A | 9/1988 | Sheiman | |
| D298,250 S | 10/1988 | Kildall | |
| 4,787,733 A | 11/1988 | Silva | |
| 4,787,903 A | 11/1988 | Grendahl | |
| 4,795,248 A | 1/1989 | Okada et al. | |
| 4,813,777 A | 3/1989 | Rainville et al. | |
| 4,818,095 A | 4/1989 | Takeuchi | |
| 4,836,652 A | 6/1989 | Oishi et al. | |
| 4,842,400 A | 6/1989 | Klein | |
| 4,873,029 A | 10/1989 | Blum | |
| 4,875,030 A | 10/1989 | Chiu | |
| 4,880,300 A | 11/1989 | Payner et al. | |
| 4,890,903 A | 1/1990 | Treisman et al. | |
| 4,904,063 A | 2/1990 | Okada et al. | |
| 4,907,860 A | 3/1990 | Noble | |
| 4,909,626 A | 3/1990 | Purvis et al. | |
| 4,919,520 A | 4/1990 | Okada et al. | |
| 4,921,728 A | 5/1990 | Takiguchi et al. | |
| 4,927,241 A | 5/1990 | Kuijk | |
| 4,929,865 A | 5/1990 | Blum | |
| 4,930,884 A | 6/1990 | Tichenor et al. | |
| 4,944,584 A | 7/1990 | Maeda et al. | |
| 4,945,242 A | 7/1990 | Berger et al. | |
| 4,952,788 A | 8/1990 | Berger et al. | |
| 4,955,712 A | 9/1990 | Barth et al. | |
| 4,958,907 A | 9/1990 | Davis | |
| 4,961,639 A | 10/1990 | Lazarus | |
| 4,967,268 A | 10/1990 | Lipton et al. | |
| 4,968,127 A | 11/1990 | Russell et al. | |
| 4,981,342 A | 1/1991 | Fiala | |
| 4,991,258 A | 2/1991 | Drlik | |
| 4,991,951 A | 2/1991 | Mizuno et al. | |
| 5,015,086 A | 5/1991 | Okaue et al. | |
| 5,030,882 A | 7/1991 | Solero | |
| 5,049,090 A | 9/1991 | Johnson | |
| 5,050,981 A | 9/1991 | Roffman | |
| 5,066,301 A | 11/1991 | Wiley | |
| 5,067,795 A | 11/1991 | Senatore | |
| 5,073,021 A | 12/1991 | Marron | |
| 5,076,665 A | 12/1991 | Petersen | |
| 5,089,023 A | 2/1992 | Swanson | |
| 5,091,801 A | 2/1992 | Ebstein | |
| 5,108,169 A | 4/1992 | Mandell | |
| 5,114,218 A | 5/1992 | Black et al. | |
| 5,114,628 A | 5/1992 | Hoefer et al. | |
| 5,130,856 A | 7/1992 | Tichenor et al. | |
| 5,142,411 A | 8/1992 | Fiala | |
| 5,147,585 A | 9/1992 | Blum | |
| 5,150,234 A | 9/1992 | Takahashi et al. | |
| 5,171,266 A | 12/1992 | Wiley et al. | |
| 5,178,800 A | 1/1993 | Blum | |
| 5,182,585 A | 1/1993 | Stoner | |
| 5,184,156 A | 2/1993 | Black et al. | |
| 5,200,859 A | 4/1993 | Payner et al. | |
| RE34,251 E | 5/1993 | Achatz et al. | |

(56) References Cited

U.S. PATENT DOCUMENTS

| | | |
|---|---|---|
| 5,208,688 A | 5/1993 | Fergason et al. |
| 5,219,497 A | 6/1993 | Blum |
| 5,229,797 A | 7/1993 | Futhey et al. |
| 5,229,885 A | 7/1993 | Quaglia |
| 5,231,430 A | 7/1993 | Kohayakawa |
| 5,239,412 A | 8/1993 | Naka et al. |
| D342,063 S | 12/1993 | Howitt et al. |
| 5,305,028 A | 4/1994 | Okano |
| 5,306,926 A | 4/1994 | Yonemoto |
| 5,319,397 A | 6/1994 | Ryden |
| 5,324,930 A | 6/1994 | Jech |
| D350,342 S | 9/1994 | Sack |
| 5,352,886 A | 10/1994 | Kane |
| 5,359,444 A | 10/1994 | Piosenka et al. |
| 5,373,109 A | 12/1994 | Argyrakis et al. |
| 5,375,006 A | 12/1994 | Haas |
| 5,382,986 A | 1/1995 | Black et al. |
| 5,386,308 A | 1/1995 | Michel et al. |
| 5,424,927 A | 6/1995 | Schaller et al. |
| 5,440,357 A | 8/1995 | Quaglia |
| 5,443,506 A | 8/1995 | Garabet |
| 5,451,766 A | 9/1995 | Van |
| 5,455,638 A | 10/1995 | Kallman et al. |
| 5,463,428 A | 10/1995 | Lipton et al. |
| 5,488,439 A | 1/1996 | Weltmann |
| 5,489,302 A | 2/1996 | Skottun |
| 5,522,323 A | 6/1996 | Richard |
| 5,526,067 A | 6/1996 | Cronin et al. |
| 5,552,841 A | 9/1996 | Gallorini et al. |
| 5,606,743 A | 2/1997 | Vogt et al. |
| 5,608,567 A | 3/1997 | Grupp |
| 5,615,588 A | 4/1997 | Gottschald |
| 5,654,789 A | 8/1997 | Kirigaya et al. |
| 5,657,107 A | 8/1997 | Wagner et al. |
| 5,668,620 A | 9/1997 | Kurtin et al. |
| 5,682,223 A | 10/1997 | Menezes et al. |
| 5,683,457 A | 11/1997 | Gupta et al. |
| 5,684,637 A | 11/1997 | Floyd |
| RE35,691 E | 12/1997 | Theirl et al. |
| 5,710,615 A | 1/1998 | Kitani |
| 5,712,721 A | 1/1998 | Large |
| 5,728,155 A | 3/1998 | Anello et al. |
| 5,739,959 A | 4/1998 | Quaglia |
| 5,742,379 A | 4/1998 | Reifer |
| 5,760,868 A | 6/1998 | Jannard et al. |
| 5,760,869 A | 6/1998 | Mitamura |
| 5,764,338 A | 6/1998 | Mack |
| 5,774,273 A | 6/1998 | Bornhorst |
| 5,777,719 A | 7/1998 | Williams et al. |
| 5,796,183 A | 8/1998 | Hourmand |
| 5,815,233 A | 9/1998 | Morokawa et al. |
| 5,815,239 A | 9/1998 | Chapman et al. |
| 5,835,185 A | 11/1998 | Kallman et al. |
| 5,861,934 A | 1/1999 | Blum et al. |
| 5,861,936 A | 1/1999 | Sorensen |
| 5,877,876 A | 3/1999 | Birdwell |
| 5,900,720 A | 5/1999 | Kallman et al. |
| 5,916,181 A | 6/1999 | Socci et al. |
| 5,949,521 A | 9/1999 | Williams et al. |
| 5,953,098 A | 9/1999 | Lieberman et al. |
| 5,956,183 A | 9/1999 | Epstein et al. |
| 5,963,300 A | 10/1999 | Horwitz |
| 5,971,540 A | 10/1999 | Ofner |
| 5,980,037 A | 11/1999 | Conway |
| 5,999,328 A | 12/1999 | Kurtin et al. |
| 6,040,947 A | 3/2000 | Kurtin et al. |
| 6,050,687 A | 4/2000 | Bille et al. |
| 6,069,742 A | 5/2000 | Silver |
| 6,086,203 A | 7/2000 | Blum et al. |
| 6,086,204 A | 7/2000 | Magnante |
| 6,091,546 A | 7/2000 | Spitzer |
| 6,095,651 A | 8/2000 | Williams et al. |
| 6,097,450 A | 8/2000 | Humphrey |
| 6,099,117 A | 8/2000 | Gregory |
| 6,115,177 A | 9/2000 | Vossler |
| 6,136,926 A | 10/2000 | Raetzsch et al. |
| 6,142,941 A | 11/2000 | Benhalima et al. |
| 6,145,987 A | 11/2000 | Baude et al. |
| 6,163,926 A | 12/2000 | Watanabe |
| 6,188,525 B1 | 2/2001 | Silver |
| 6,191,881 B1 | 2/2001 | Tajima |
| 6,204,974 B1 | 3/2001 | Spitzer |
| 6,213,602 B1 | 4/2001 | Smarto |
| 6,270,220 B1 | 8/2001 | Keren |
| 6,271,915 B1 | 8/2001 | Frey et al. |
| 6,288,846 B1 | 9/2001 | Stoner, Jr. |
| 6,305,802 B1 | 10/2001 | Roffman et al. |
| 6,325,508 B1 | 12/2001 | Decreton et al. |
| 6,336,250 B1 | 1/2002 | Takeda et al. |
| 6,350,031 B1 | 2/2002 | Lashkari et al. |
| 6,390,623 B1 | 5/2002 | Kokonaski et al. |
| 6,396,622 B1 | 5/2002 | Alden |
| 6,412,941 B1 | 7/2002 | Xiao |
| 6,433,913 B1 | 8/2002 | Bauer et al. |
| 6,437,762 B1 | 8/2002 | Birdwell |
| 6,437,925 B1 | 8/2002 | Nishioka |
| 6,464,363 B1 | 10/2002 | Nishioka et al. |
| 6,491,391 B1 | 12/2002 | Blum et al. |
| 6,491,394 B1 | 12/2002 | Blum et al. |
| 6,501,443 B1 | 12/2002 | Mcmahon |
| 6,517,203 B1 | 2/2003 | Blum et al. |
| 6,554,425 B1 | 4/2003 | Roffman et al. |
| 6,582,075 B1 | 6/2003 | Swab et al. |
| 6,595,634 B1 | 7/2003 | Pilat, Jr. |
| 6,607,271 B2 | 8/2003 | Bar et al. |
| 6,609,794 B2 | 8/2003 | Levine |
| 6,614,408 B1 | 9/2003 | Mann |
| 6,616,275 B1 | 9/2003 | Dick et al. |
| 6,616,279 B1 | 9/2003 | Davis et al. |
| 6,618,208 B1 | 9/2003 | Silver |
| 6,619,799 B1 | 9/2003 | Blum et al. |
| 6,626,532 B1 | 9/2003 | Nishioka et al. |
| 6,631,001 B2 | 10/2003 | Kuiseko |
| 6,682,195 B2 | 1/2004 | Dreher |
| 6,709,105 B2 | 3/2004 | Menezes |
| 6,709,108 B2 | 3/2004 | Levine et al. |
| 6,715,876 B2 | 4/2004 | Floyd |
| 6,719,425 B2 | 4/2004 | Conner |
| 6,733,130 B2 | 5/2004 | Blum et al. |
| 6,738,199 B2 | 5/2004 | Nishioka |
| 6,768,536 B2 | 7/2004 | Okuwaki et al. |
| 6,772,448 B1 | 8/2004 | Hockaday et al. |
| 6,774,871 B2 | 8/2004 | Birdwell |
| 6,778,246 B2 | 8/2004 | Sun et al. |
| 6,824,265 B1 | 11/2004 | Harper |
| 6,833,938 B2 | 12/2004 | Nishioka |
| 6,840,619 B2 | 1/2005 | Dreher |
| 6,851,805 B2 | 2/2005 | Blum et al. |
| 6,857,741 B2 | 2/2005 | Blum et al. |
| 6,866,386 B1 | 3/2005 | Chen |
| 6,871,951 B2 | 3/2005 | Blum et al. |
| 6,883,916 B2 | 4/2005 | Menezes |
| 6,886,938 B1 | 5/2005 | Menezes |
| 6,893,124 B1 | 5/2005 | Kurtin |
| 6,902,271 B2 | 6/2005 | Perrott et al. |
| 6,918,570 B2 | 7/2005 | Ahn |
| 6,918,670 B2 | 7/2005 | Blum et al. |
| 6,927,894 B2 | 8/2005 | Blum et al. |
| 6,938,277 B2 | 9/2005 | Indahl |
| 6,948,818 B2 | 9/2005 | Williams et al. |
| 6,951,391 B2 | 10/2005 | Michael et al. |
| 6,955,433 B1 | 10/2005 | Benjamin et al. |
| 6,956,682 B2 | 10/2005 | Benjamin |
| 6,986,579 B2 | 1/2006 | Blum et al. |
| 7,008,054 B1 | 3/2006 | Kurtin et al. |
| 7,009,757 B2 | 3/2006 | Nishioka et al. |
| 7,018,040 B2 | 3/2006 | Blum et al. |
| 7,019,890 B2 | 3/2006 | Meredith et al. |
| 7,023,594 B2 | 4/2006 | Blum et al. |
| 7,030,411 B2 | 4/2006 | Krulevitch et al. |
| 7,041,133 B1 | 5/2006 | Azar |
| 7,063,420 B2 | 6/2006 | Lerner et al. |
| 7,077,519 B2 | 7/2006 | Blum et al. |
| 7,085,065 B2 | 8/2006 | Silver |

(56) References Cited

U.S. PATENT DOCUMENTS

| | | | |
|---|---|---|---|
| 7,090,348 | B2 | 8/2006 | Nason et al. |
| 7,104,645 | B2 | 9/2006 | Pilat et al. |
| 7,133,172 | B2 | 11/2006 | Nishioka |
| 7,140,727 | B2 | 11/2006 | Pilat et al. |
| 7,142,369 | B2 | 11/2006 | Wu et al. |
| 7,159,983 | B2 | 1/2007 | Menezes et al. |
| 7,188,948 | B2 | 3/2007 | Blum et al. |
| 7,192,136 | B2 | 3/2007 | Howell et al. |
| 7,195,353 | B2 | 3/2007 | Blum et al. |
| 7,209,097 | B2 | 4/2007 | Suyama et al. |
| 7,229,173 | B2 | 6/2007 | Menezes |
| 7,234,809 | B2 | 6/2007 | Blum et al. |
| 7,255,437 | B2 | 8/2007 | Howell et al. |
| 7,256,943 | B1 | 8/2007 | Kobrin et al. |
| 7,264,354 | B2 | 9/2007 | Blum et al. |
| 7,290,875 | B2 | 11/2007 | Blum et al. |
| 7,290,876 | B2 | 11/2007 | Duston et al. |
| 7,333,272 | B2 | 2/2008 | Oh et al. |
| 7,369,321 | B1 | 5/2008 | Ren et al. |
| 7,374,283 | B2 | 5/2008 | Blum et al. |
| 7,380,936 | B2 | 6/2008 | Howell et al. |
| 7,396,126 | B2 | 7/2008 | Blum et al. |
| 7,401,918 | B2 | 7/2008 | Howell et al. |
| 7,404,636 | B2 | 7/2008 | Blum et al. |
| 7,425,066 | B2 | 9/2008 | Blum et al. |
| 7,438,410 | B1 | 10/2008 | Howell et al. |
| 7,452,075 | B2 | 11/2008 | Juliano |
| 7,453,646 | B2 | 11/2008 | Lo |
| 7,475,984 | B2 | 1/2009 | Blum et al. |
| 7,475,985 | B2 | 1/2009 | Blum et al. |
| 7,481,531 | B2 | 1/2009 | Howell et al. |
| 7,500,746 | B1 | 3/2009 | Howell et al. |
| 7,500,747 | B2 | 3/2009 | Howell et al. |
| 7,517,083 | B2 | 4/2009 | Blum et al. |
| 7,527,375 | B2 | 5/2009 | Blum et al. |
| 7,533,993 | B2 | 5/2009 | Blum et al. |
| 7,543,934 | B2 | 6/2009 | Howell et al. |
| 7,553,019 | B2 | 6/2009 | Kuiper et al. |
| 7,581,833 | B2 | 9/2009 | Howell et al. |
| 7,588,332 | B2 | 9/2009 | Blum et al. |
| 7,594,726 | B2 | 9/2009 | Silver et al. |
| 7,604,349 | B2 | 10/2009 | Blum et al. |
| 7,621,634 | B2 | 11/2009 | Howell et al. |
| 7,654,667 | B2 | 2/2010 | Blum et al. |
| 7,656,509 | B2 | 2/2010 | Haddock et al. |
| 7,675,686 | B2 | 3/2010 | Lo et al. |
| 7,677,723 | B2 | 3/2010 | Howell et al. |
| 7,728,949 | B2 | 6/2010 | Clarke et al. |
| 7,731,358 | B2 | 6/2010 | Blum et al. |
| 7,744,215 | B2 | 6/2010 | Blum et al. |
| 7,760,898 | B2 | 7/2010 | Howell et al. |
| 7,771,046 | B2 | 8/2010 | Howell et al. |
| 7,777,660 | B2 | 8/2010 | Chen et al. |
| 7,782,541 | B2 | 8/2010 | Oh et al. |
| 7,784,935 | B2 | 8/2010 | Jackson et al. |
| 7,806,525 | B2 | 10/2010 | Howell et al. |
| 7,813,048 | B2 | 10/2010 | Lynch et al. |
| 7,850,304 | B2 | 12/2010 | Jacobs et al. |
| 7,883,206 | B2 | 2/2011 | Blum et al. |
| 7,883,207 | B2 | 2/2011 | Iyer et al. |
| 7,922,321 | B2 | 4/2011 | Howell et al. |
| 7,926,940 | B2 | 4/2011 | Blum et al. |
| 7,926,941 | B2 | 4/2011 | Blum et al. |
| 7,971,994 | B2 | 7/2011 | Blum et al. |
| 7,988,286 | B2 | 8/2011 | Blum et al. |
| 8,016,415 | B2 | 9/2011 | Figler et al. |
| 8,047,651 | B2 | 11/2011 | Blum et al. |
| 8,066,373 | B2 | 11/2011 | Blum et al. |
| 8,075,132 | B2 | 12/2011 | Blum et al. |
| 8,092,016 | B2 | 1/2012 | Blum et al. |
| 8,109,629 | B2 | 2/2012 | Howell et al. |
| 8,154,804 | B2 | 4/2012 | McGinn et al. |
| 8,197,063 | B2 | 6/2012 | Iyer et al. |
| 8,215,770 | B2 | 7/2012 | Blum et al. |
| 8,308,295 | B2 | 11/2012 | Blum et al. |
| 8,317,321 | B2 | 11/2012 | Haddock et al. |
| 8,319,937 | B2 | 11/2012 | Clarke et al. |
| 8,333,470 | B2 | 12/2012 | Blum et al. |
| 8,337,013 | B2 | 12/2012 | Howell et al. |
| 8,337,014 | B2 | 12/2012 | Kokonaski et al. |
| 8,408,699 | B2 | 4/2013 | Blum et al. |
| 8,430,507 | B2 | 4/2013 | Howell et al. |
| 8,434,863 | B2 | 5/2013 | Howell et al. |
| 8,434,864 | B2 | 5/2013 | Gupta et al. |
| 8,465,151 | B2 | 6/2013 | Howell et al. |
| 8,500,271 | B2 | 8/2013 | Howell et al. |
| 8,523,354 | B2 | 9/2013 | Haddock et al. |
| 8,534,832 | B2 | 9/2013 | Gupta et al. |
| 8,573,774 | B2 | 11/2013 | Gupta et al. |
| 8,579,435 | B2 | 11/2013 | Blum et al. |
| 8,641,191 | B2 | 2/2014 | Blum et al. |
| 8,662,665 | B2 | 3/2014 | Iyer et al. |
| 8,678,581 | B2 | 3/2014 | Blum |
| 8,708,483 | B2 | 4/2014 | Kokonaski et al. |
| 8,770,742 | B2 | 7/2014 | Howell et al. |
| 8,778,022 | B2 | 7/2014 | Blum et al. |
| 8,783,861 | B2 | 7/2014 | Blum et al. |
| 8,801,174 | B2 | 8/2014 | Willey |
| 8,827,446 | B2 | 9/2014 | Iyer et al. |
| 8,830,408 | B2 | 9/2014 | Haddock et al. |
| 8,854,519 | B2 | 10/2014 | Duston et al. |
| 8,905,541 | B2 | 12/2014 | Blum et al. |
| 8,915,588 | B2 | 12/2014 | Blum et al. |
| 8,921,445 | B2 | 12/2014 | Turshani et al. |
| 8,922,902 | B2 | 12/2014 | Blum et al. |
| 8,928,796 | B2 | 1/2015 | Van et al. |
| 8,931,896 | B2 | 1/2015 | Blum et al. |
| 8,944,590 | B2 | 2/2015 | Blum et al. |
| 8,979,259 | B2 | 3/2015 | Haddock et al. |
| 9,022,563 | B2 | 5/2015 | Gupta et al. |
| 9,028,062 | B2 | 5/2015 | Kokonaski et al. |
| 9,033,494 | B2 | 5/2015 | Blum et al. |
| 9,074,040 | B2 | 7/2015 | Turshani et al. |
| 9,081,208 | B2 | 7/2015 | Blum et al. |
| 9,096,026 | B2 | 8/2015 | Hall et al. |
| 9,122,077 | B2 | 9/2015 | Gupta et al. |
| 9,122,083 | B2 | 9/2015 | Blum et al. |
| 9,124,796 | B2 | 9/2015 | Blum et al. |
| 9,142,329 | B2 | 9/2015 | Trajkovska et al. |
| 9,146,407 | B2 | 9/2015 | Clarke et al. |
| 9,155,614 | B2 | 10/2015 | Blum et al. |
| 9,199,420 | B2 | 12/2015 | Trajkovska et al. |
| 9,207,467 | B2 | 12/2015 | Gupta et al. |
| 9,229,248 | B2 | 1/2016 | Kokonaski et al. |
| 9,268,153 | B2 | 2/2016 | Blum et al. |
| 9,323,101 | B2 | 4/2016 | Blum et al. |
| D755,281 | S | 5/2016 | Blum et al. |
| 9,329,309 | B2 | 5/2016 | Van Heugten |
| 9,411,172 | B2 | 8/2016 | Haddock et al. |
| 9,442,305 | B2 | 9/2016 | Blum et al. |
| 9,470,909 | B2 | 10/2016 | Willey et al. |
| 9,588,396 | B2 | 3/2017 | Haddock et al. |
| 9,625,767 | B2 | 4/2017 | Duston et al. |
| 9,690,117 | B2 | 6/2017 | Blum et al. |
| 9,712,738 | B2 | 7/2017 | Van et al. |
| 9,801,709 | B2 | 10/2017 | Blum et al. |
| 10,613,355 | B2 | 4/2020 | Blum et al. |
| 11,061,252 | B2 | 7/2021 | Blum et al. |
| 11,586,057 | B2 | 2/2023 | Blum et al. |
| 2001/0007493 | A1 | 7/2001 | Masunaga et al. |
| 2001/0043266 | A1 | 11/2001 | Robinson et al. |
| 2001/0055094 | A1 | 12/2001 | Zhang |
| 2002/0140899 | A1 | 10/2002 | Blum et al. |
| 2002/0149739 | A1 | 10/2002 | Perrott et al. |
| 2002/0163486 | A1 | 11/2002 | Ronzani et al. |
| 2002/0186346 | A1 | 12/2002 | Stantz et al. |
| 2003/0018383 | A1 | 1/2003 | Azar |
| 2003/0058543 | A1 | 3/2003 | Sheedy et al. |
| 2003/0076306 | A1 | 4/2003 | Zadesky et al. |
| 2003/0095336 | A1 | 5/2003 | Floyd |
| 2003/0151721 | A1 | 8/2003 | Lai et al. |
| 2003/0210377 | A1 | 11/2003 | Blum et al. |
| 2004/0000733 | A1 | 1/2004 | Swab et al. |
| 2004/0001180 | A1 | 1/2004 | Epstein |

(56) References Cited

U.S. PATENT DOCUMENTS

| | | |
|---|---|---|
| 2004/0008319 A1 | 1/2004 | Lai et al. |
| 2004/0096078 A1 | 5/2004 | Lin |
| 2004/0108971 A1 | 6/2004 | Waldern et al. |
| 2004/0117011 A1 | 6/2004 | Aharoni et al. |
| 2004/0130677 A1 | 7/2004 | Liang et al. |
| 2004/0156012 A1 | 8/2004 | Jannard et al. |
| 2004/0179280 A1 | 9/2004 | Nishioka |
| 2004/0196435 A1 | 10/2004 | Dick et al. |
| 2004/0223113 A1 | 11/2004 | Blum et al. |
| 2004/0246440 A1 | 12/2004 | Andino et al. |
| 2005/0073739 A1 | 4/2005 | Meredith et al. |
| 2005/0078274 A1 | 4/2005 | Howell et al. |
| 2005/0099594 A1 | 5/2005 | Blum et al. |
| 2005/0124983 A1 | 6/2005 | Frey et al. |
| 2005/0140922 A1 | 6/2005 | Bekerman et al. |
| 2005/0140924 A1 | 6/2005 | Blum et al. |
| 2005/0154330 A1 | 7/2005 | Loree, IV |
| 2005/0206844 A1 | 9/2005 | Blum et al. |
| 2005/0213027 A1 | 9/2005 | Blum et al. |
| 2005/0225723 A1 | 10/2005 | Pilu |
| 2005/0225823 A1 | 10/2005 | Ling et al. |
| 2005/0230596 A1 | 10/2005 | Howell et al. |
| 2005/0237477 A1 | 10/2005 | Lindahl et al. |
| 2005/0237485 A1 | 10/2005 | Blum et al. |
| 2005/0239502 A1 | 10/2005 | Swab et al. |
| 2005/0242771 A1 | 11/2005 | Blum et al. |
| 2005/0248719 A1 | 11/2005 | Howell et al. |
| 2005/0264752 A1 | 12/2005 | Howell et al. |
| 2005/0270479 A1 | 12/2005 | Canavan et al. |
| 2005/0270481 A1 | 12/2005 | Blum et al. |
| 2006/0001827 A1 | 1/2006 | Howell et al. |
| 2006/0019614 A1 | 1/2006 | Yamasaki |
| 2006/0023158 A1 | 2/2006 | Howell et al. |
| 2006/0044510 A1 | 3/2006 | Williams et al. |
| 2006/0066808 A1 | 3/2006 | Blum et al. |
| 2006/0077562 A1 | 4/2006 | Silver |
| 2006/0092340 A1 | 5/2006 | Blum et al. |
| 2006/0095128 A1 | 5/2006 | Blum et al. |
| 2006/0132382 A1 | 6/2006 | Jannard |
| 2006/0164593 A1 | 7/2006 | Peyghambarian et al. |
| 2006/0203186 A1 | 9/2006 | Ifergan |
| 2006/0238513 A1 | 10/2006 | Philipp |
| 2006/0238701 A1 | 10/2006 | Blum |
| 2006/0250699 A1 | 11/2006 | Silver et al. |
| 2007/0030254 A1 | 2/2007 | Robrecht et al. |
| 2007/0030442 A1 | 2/2007 | Howell et al. |
| 2007/0059503 A1 | 3/2007 | Park et al. |
| 2007/0064969 A1 | 3/2007 | Chou |
| 2007/0091257 A1 | 4/2007 | Spivey |
| 2007/0121061 A1 | 5/2007 | Kim |
| 2007/0159562 A1 | 7/2007 | Haddock et al. |
| 2007/0201000 A1 | 8/2007 | Jackson et al. |
| 2007/0211207 A1 | 9/2007 | Lo et al. |
| 2007/0258039 A1 | 11/2007 | Duston et al. |
| 2007/0263293 A1 | 11/2007 | Batchko et al. |
| 2007/0296918 A1 | 12/2007 | Blum et al. |
| 2008/0012832 A1 | 1/2008 | GuangHai |
| 2008/0019015 A1 | 1/2008 | Fernandez et al. |
| 2008/0084532 A1 | 4/2008 | Kurtin |
| 2008/0088596 A1 | 4/2008 | Prest et al. |
| 2008/0100792 A1 | 5/2008 | Blum et al. |
| 2008/0106694 A1 | 5/2008 | Blum et al. |
| 2008/0106695 A1 | 5/2008 | Kokonaski et al. |
| 2008/0129953 A1 | 6/2008 | Blum et al. |
| 2008/0136788 A1 | 6/2008 | Nishikawa et al. |
| 2008/0144854 A1 | 6/2008 | Abreu |
| 2008/0218684 A1 | 9/2008 | Howell et al. |
| 2008/0231799 A1 | 9/2008 | Iuliano |
| 2008/0273166 A1 | 11/2008 | Kokonaski et al. |
| 2008/0273167 A1 | 11/2008 | Clarke |
| 2008/0273169 A1 | 11/2008 | Blum et al. |
| 2008/0316420 A1 | 12/2008 | Agazarova |
| 2009/0002626 A1 | 1/2009 | Wakabayashi |
| 2009/0015785 A1 | 1/2009 | Blum et al. |
| 2009/0082835 A1 | 3/2009 | Jaax et al. |
| 2009/0091818 A1 | 4/2009 | Haddock et al. |
| 2009/0116118 A1 | 5/2009 | Frazier et al. |
| 2009/0120901 A1 | 5/2009 | White et al. |
| 2009/0201460 A1 | 8/2009 | Blum et al. |
| 2009/0213471 A1 | 8/2009 | Silver et al. |
| 2009/0251660 A1 | 10/2009 | Figler et al. |
| 2009/0256977 A1 | 10/2009 | Haddock et al. |
| 2009/0264966 A1 | 10/2009 | Blum et al. |
| 2009/0296044 A1 | 12/2009 | Howell et al. |
| 2010/0002190 A1 | 1/2010 | Clarke et al. |
| 2010/0039709 A1 | 2/2010 | Lo |
| 2010/0110368 A1* | 5/2010 | Chaum .................. G02C 11/10 351/158 |
| 2010/0177277 A1 | 7/2010 | Kokonaski et al. |
| 2010/0201938 A1 | 8/2010 | Jackson et al. |
| 2010/0208194 A1 | 8/2010 | Gupta et al. |
| 2010/0208195 A1 | 8/2010 | Gupta et al. |
| 2010/0265456 A1 | 10/2010 | Matsui |
| 2010/0271588 A1 | 10/2010 | Kokonaski et al. |
| 2010/0309426 A1 | 12/2010 | Howell et al. |
| 2011/0013136 A1 | 1/2011 | Archambeau et al. |
| 2011/0058141 A1 | 3/2011 | Cozzani |
| 2011/0249230 A1 | 10/2011 | Blum |
| 2012/0002159 A1 | 1/2012 | Blum et al. |
| 2012/0002160 A1 | 1/2012 | Blum et al. |
| 2012/0019773 A1 | 1/2012 | Blum et al. |
| 2012/0092775 A1 | 4/2012 | Duston et al. |
| 2012/0127420 A1 | 5/2012 | Blum et al. |
| 2012/0127423 A1 | 5/2012 | Blum et al. |
| 2012/0140167 A1 | 6/2012 | Blum |
| 2012/0212696 A1 | 8/2012 | Trajkovska et al. |
| 2012/0262667 A1 | 10/2012 | Willey |
| 2012/0300171 A1 | 11/2012 | Gupta et al. |
| 2012/0301604 A1 | 11/2012 | Hall et al. |
| 2013/0010256 A1 | 1/2013 | Haddock et al. |
| 2013/0050639 A1 | 2/2013 | Trajkovska et al. |
| 2013/0070198 A1 | 3/2013 | Willey et al. |
| 2013/0201439 A1 | 8/2013 | Kokonaski et al. |
| 2013/0208238 A1 | 8/2013 | Blum et al. |
| 2013/0215374 A1 | 8/2013 | Blum et al. |
| 2013/0235332 A1 | 9/2013 | Blum et al. |
| 2013/0242253 A1 | 9/2013 | Blum et al. |
| 2013/0250135 A1 | 9/2013 | Blum et al. |
| 2013/0250233 A1 | 9/2013 | Blum et al. |
| 2013/0282117 A1 | 10/2013 | Van et al. |
| 2013/0293825 A1 | 11/2013 | Trajkovska et al. |
| 2013/0329183 A1 | 12/2013 | Blum et al. |
| 2013/0342807 A1 | 12/2013 | Blum et al. |
| 2014/0036172 A1 | 2/2014 | Trajkovska-Broach et al. |
| 2014/0132916 A1 | 5/2014 | Iyer et al. |
| 2014/0198370 A1 | 7/2014 | Trajkovska-Broach et al. |
| 2014/0204333 A1 | 7/2014 | Blum et al. |
| 2014/0237817 A1 | 8/2014 | Trajkovska-Broach et al. |
| 2014/0293215 A1 | 10/2014 | Blum et al. |
| 2014/0313473 A1 | 10/2014 | Willey et al. |
| 2014/0327875 A1 | 11/2014 | Blum et al. |
| 2014/0327950 A1 | 11/2014 | Trajkovska-Broach et al. |
| 2014/0347581 A1 | 11/2014 | Haddock et al. |
| 2015/0027613 A1 | 1/2015 | Trajkovska-Broach et al. |
| 2015/0301338 A1 | 10/2015 | Van et al. |
| 2015/0335420 A1 | 11/2015 | Blum et al. |
| 2015/0378177 A1 | 12/2015 | Blum et al. |
| 2015/0378180 A1 | 12/2015 | Blum et al. |
| 2016/0202399 A1 | 7/2016 | Van et al. |
| 2017/0031181 A1 | 2/2017 | Blum et al. |
| 2017/0075141 A1 | 3/2017 | Blum et al. |
| 2017/0108713 A1 | 4/2017 | Blum et al. |
| 2017/0172729 A1 | 6/2017 | Blum et al. |
| 2017/0176777 A1 | 6/2017 | Blum et al. |
| 2017/0205680 A1 | 7/2017 | Trajkovska-Broach et al. |
| 2017/0242317 A1 | 8/2017 | Li et al. |
| 2017/0293197 A1 | 10/2017 | Van et al. |
| 2017/0297283 A1 | 10/2017 | Van |
| 2017/0336637 A1 | 11/2017 | Van |
| 2020/0363567 A1 | 11/2020 | Kan et al. |

(56) References Cited

U.S. PATENT DOCUMENTS

| | | |
|---|---|---|
| 2022/0011604 A1 | 1/2022 | Blum et al. |
| 2023/0305320 A1 | 9/2023 | Blum et al. |

FOREIGN PATENT DOCUMENTS

| | | |
|---|---|---|
| DE | 4223395 A1 | 1/1994 |
| DE | 20103525 U | 3/2003 |
| EP | 0027339 A2 | 4/1981 |
| EP | 0061002 A1 | 9/1982 |
| EP | 0154962 A2 | 9/1985 |
| EP | 0225034 A1 | 6/1987 |
| EP | 0233104 A1 | 8/1987 |
| EP | 0237365 A1 | 9/1987 |
| EP | 0308705 A2 | 3/1989 |
| EP | 0578833 A1 | 1/1994 |
| EP | 0649044 A1 | 4/1995 |
| EP | 1575250 A1 | 9/2005 |
| EP | 1647854 A1 | 4/2006 |
| EP | 1727393 A1 | 11/2006 |
| EP | 1785763 A1 | 5/2007 |
| EP | 1916561 A2 | 4/2008 |
| EP | 2233964 A1 | 9/2010 |
| GB | 799294 A | 8/1958 |
| GB | 2011640 A | 7/1979 |
| GB | 1563929 A | 4/1980 |
| GB | 2169417 A | 7/1986 |
| GB | 2170613 A | 8/1986 |
| GB | 2451178 A | 1/2009 |
| IT | UD20010094 A1 | 11/2002 |
| JP | S5576323 A | 6/1980 |
| JP | S5885900 U | 6/1983 |
| JP | S58113912 A | 7/1983 |
| JP | S58113913 A | 7/1983 |
| JP | S61156227 A | 7/1986 |
| JP | S61177429 A | 8/1986 |
| JP | H01237610 A | 9/1989 |
| JP | H05100201 A | 4/1993 |
| JP | H09294654 A | 11/1997 |
| JP | H11352445 A | 12/1999 |
| JP | 2008083299 A | 4/2008 |
| WO | 9201417 A1 | 2/1992 |
| WO | 9827863 A1 | 7/1998 |
| WO | 9901063 A1 | 1/1999 |
| WO | 9921400 A1 | 4/1999 |
| WO | 9927334 A1 | 6/1999 |
| WO | 9941624 A1 | 8/1999 |
| WO | 0102895 A1 | 1/2001 |
| WO | 0135159 A1 | 5/2001 |
| WO | 0175510 A1 | 10/2001 |
| WO | 03050472 A1 | 6/2003 |
| WO | 03068059 A2 | 8/2003 |
| WO | 2004008189 A1 | 1/2004 |
| WO | 2004015481 A1 | 2/2004 |
| WO | 2004028203 A2 | 4/2004 |
| WO | 2004034095 A2 | 4/2004 |
| WO | 2004072687 A2 | 8/2004 |
| WO | 2005016057 A1 | 2/2005 |
| WO | 2005093550 A2 | 10/2005 |
| WO | 2005103863 A2 | 11/2005 |
| WO | 2005119344 A1 | 12/2005 |
| WO | 2006055884 A2 | 5/2006 |
| WO | 2006055884 A3 | 5/2006 |
| WO | 2006086155 A2 | 8/2006 |
| WO | 2006123596 A1 | 11/2006 |
| WO | 2006126881 A2 | 11/2006 |
| WO | 2007062601 A1 | 6/2007 |
| WO | 2007142520 A1 | 12/2007 |
| WO | 2007142602 A1 | 12/2007 |
| WO | 2008002388 A2 | 1/2008 |
| WO | 2008024071 A1 | 2/2008 |
| WO | 2008045283 A2 | 4/2008 |
| WO | 2008046858 A1 | 4/2008 |
| WO | 2008051520 A2 | 5/2008 |
| WO | 2008115251 A1 | 9/2008 |
| WO | 2009081542 A1 | 7/2009 |
| WO | 2009098719 A1 | 8/2009 |
| WO | 2009109749 A1 | 9/2009 |
| WO | 2009125184 A2 | 10/2009 |
| WO | 2009126946 A1 | 10/2009 |
| WO | 2009136667 A1 | 11/2009 |
| WO | 2010062479 A1 | 6/2010 |
| WO | 2010062504 A2 | 6/2010 |
| WO | 2010080999 A1 | 7/2010 |
| WO | 2011119601 A1 | 9/2011 |
| WO | 2012068527 A2 | 5/2012 |
| WO | 2014184137 A1 | 11/2014 |

OTHER PUBLICATIONS

U.S. Appl. No. 61/366,746, filed Jul. 22, 2010.
U.S. Appl. No. 61/376,719, filed Aug. 25, 2010.
U.S. Appl. No. 61/382,963, filed Sep. 15, 2010.
U.S. Appl. No. 61/415,391, filed Nov. 19, 2010.
U.S. Appl. No. 61/441,817, filed Feb. 11, 2011.
U.S. Appl. No. 61/481,353, filed May 2, 2011.
"Hearing Mojo: Varibel Hearing-Aid Glasses Integrate Eight Directional Microphones," Feb. 27, 2009, pp. 1-4, URL—http://hearingmojo.com/blog-mt/blog-mt/2006/04/varibel_hearingaid_glasses_dou.html.
Anderson, M.; Adaptive Optics: Liquid Crystals Lower the Cost of Adaptive Optics; Laser Focus World, Dec. 1999.
Bradley, Arthur; Profile: Larry N. Thibos, PhD., and Donald T. Miller, PhD.; Indiana Journal of Optometry; Spring 1999; vol. 2, No. 1.
Davis, Robert A.; Computer Vision Syndrome—The Eyestrain Epidemic; Review of Optometry, Sep. 15, 1997.
Donald T. Miller, Xin Hong, and Larry N. Thibos, "Requirements for segmented spatial light modulators for diffraction-limited imaging through aberrated eyes," G.D. Love, ed. Proceedings of the 2nd International Workshop on Adaptive Optics for Industry and Medecine, World Scientific, Singapore, 63-68 (Jul. 1999).
European Search Report in related EP07852880.9 application dated Feb. 9, 2010. 7 pages.
Eyecare Business, Oct. 1997. 76 pages.
International Preliminary Report on Patentability and Written Opinion of the International Searching Authority directed to related International Patent Application No. PCT/US2008/058056, dated Nov. 10, 2009; 6 pages.
International Preliminary Report on Patentability and Written Opinion of the International Searching Authority directed to related International Patent Application No. PCT/US2010/020498, dated Jul. 12, 2011; 9 pages.
International Preliminary Report on Patentability and Written Opinion of the International Searching Authority directed to related International Patent Application No. PCT/US2011/042882, dated Jan. 8, 2013; 11 pages.
International Preliminary Report on Patentability and Written Opinion of the International Searching Authority directed to related International Patent Application No. PCT/US2011/042883, dated Jan. 8, 2013; 9 pages.
International Preliminary Report on Patentability and Written Opinion of the International Searching Authority directed to related International Patent Application No. PCT/US2011/043591, dated Jan. 15, 2013; 10 pages.
International Preliminary Report on Patentability and Written Opinion of the International Searching Authority directed to related International Patent Application No. PCT/US2011/061495, dated May 21, 2013; 8 pages.
International Preliminary Report on Patentability and Written Opinion of the International Searching Authority directed to related International Patent Application No. PCT/US2011/061505, dated May 21, 2013; 14 pages.
International Preliminary Report on Patentability corresponding to the PCT/US2011/042882 application.
International Search Report and Written Opinion corresponding to the PCT/US2011/042048 application dated Apr. 12, 2013. 18 pages.

(56) References Cited

OTHER PUBLICATIONS

International Search Report and Written Opinion directed to related International Patent Application No. PCT/US2011/043591, dated Feb. 3, 2012; 16 pages.
International Search Report and Written Opinion in corresponding PCT/US2008/058056 application.
International Search Report and Written Opinion in International Patent Application No. PCT/US2011/029419 dated Jun. 28, 2011. 13 pages.
International Search Report and Written Opinion of the International Searching Authority directed to related International Patent Application No. PCT/US2008/058056, dated Jul. 17, 2008; 7 pages.
International Search Report corresponding to the PCT/US2011/042882 application.
International Search Report corresponding to the PCT/US2011/042883 application.
International Search Report corresponding to the PCT/US2011/043591 application.
International Search Report corresponding to the PCT/US2011/061495 application.
International Search Report corresponding to the PCT/US2011/061505 application.
International Search Report directed to related International Patent Application No. PCT/US2008/058056, dated Jul. 17, 2008; 1 page.
International Search Report directed to related International Patent Application No. PCT/US2010/020498, dated Jun. 25, 2010; 5 pages.
International Search Report directed to related International Patent Application No. PCT/US2011/042882, dated Feb. 15, 2012; 5 pages.
International Search Report directed to related International Patent Application No. PCT/US2011/042883, dated Feb. 7, 2012; 6 pages.
International Search Report directed to related International Patent Application No. PCT/US2011/061495, dated Feb. 29, 2012; 13 pages.
International Search Report directed to related International Patent Application No. PCT/US2011/061505, dated May 25, 2012; 6 pages.
International Search Report directed to related International Patent Application No. PCT/US2012/051202, dated Jan. 15, 2013; 4 pages.
Kowel, Stephen T., et al; Focusing by electical modulation of refraction in a liquid crystal cell; Applied Optics; Jan. 15, 1984; vol. 23, No. 2.
Lazarus, Stuart M.; The Use of Yoked Base-Up and Base-In Prism for Reducing Eye Strain at the Computer; Journal of the American Optometric Association, Apr. 1996.
Liquid Lenses Eye Commercial Breakthrough; Opto & Laser Europe, Nov. 2003.
Miller, Donald T., et al.; Requirements for Segmented Spatial Light Modulators for Diffraction-Limited Imaging Through Aberrated Eyes; Adaptive Optics Conference; Jul. 1999; Durham, UK.
Naumov, A.F.; Control Optimization of Spherical Modal Liquid Crystal Lenses; Optics Express, Apr. 26, 1999; vol. 4, No. 9; Optical Society of America.
Naumov, A.F.; Liquid Crystal Adaptive Lenses with Modal Control; Optics Letters, Jul. 1, 1998, vol. 23, No. 13; Optical Society of America.
Partial International Search Report corresponding to PCT/US2012/051202 application.
Partial International Search Report in corresponding. PCT/US2010/020498 application. undated. 3 pages.
Supplementary European Search Report directed to related European Patent Application No. 07852880.9-2217, dated Feb. 9, 2010, 7 pages.
Thibos, Larry N., et al.; Electronic Spectacles for the 21st Century, Indian Journal of Optometry, Spring 1999; vol. 2, No. 1.
Thibos, Larry N., et al.; Use of Liquid-Crystal Adaptive-Optics to Alter the Refractive State of the Eye; Optometry and Vision Science; Jul. 1997; vol. 74, No. 7; American Academy of Optometry.
Thibos, Larry N., et al.; Vision through a liquid-crystal spatial light modulator; Adaptive Optics Conference; Jul. 1999; Durham, UK.
U.S. Appl. No. 60/796,876, filed May 3, 2006.
U.S. Appl. No. 60/854,677, filed Oct. 27, 2006.
U.S. Appl. No. 60/854,697, filed Oct. 27, 2006.
U.S. Appl. No. 61/326,703, filed Apr. 22, 2010.
U.S. Appl. No. 61/358,447, filed Jun. 25, 2010.
U.S. Appl. No. 61/361,110, filed Jul. 2, 2010.
Declaration of John Feland, in IPR2024-01069, dated Jun. 14, 2024, 96 pages.
Declaration of John Feland, IPR2024-01071, dated Jun. 18, 2024, 100 pages.
Declaration of John Feland, Ph.D. in IPR2024-01030, dated Jun. 14, 2024, 101 pages.
Declaration of John Feland, Ph.D., IPR2024-01070, dated Jun. 20, 2024, 121 pages.
Declaration of Rachel J. Watters, IPR2024-01069, dated May 29, 2024, 93 pages.
Declaration of Sylvia D. Hall-Ellis, IPR2024-01069, dated Jun. 14, 2024, 85 pages.
Declaration of Sylvia D. Hall-Ellis, IPR2024-01070, dated Jun. 21, 2024, 109 pages.
Excerpts from McGraw-Hill Dictionary of Engineering (2d ed. 2003), IPR-2024-01030, 7 pages.
Excerpts from Merriam Webster's Collegiate Dictionary (10th ed. 1997), IPR-2024-01030, 3 pages.
Excerpts from Walter Sikonowiz, Designing and Creating Printed Circuits (1981) ("Sikonowiz"), IPR-2024-01030, 18 pages.
Gian Carlo Corazza, Marconi's History, 86 Proceedings of the IEEE 1307-11 (1998) ("Corazza"), 5 pages.
Harper, Charles, ed., Handbook of Materials and Processes for Electronics (McGraw-Hill, 1970): Chapter 5, Licari, J.J. & Brands, E.R., Coatings for Electronics [Ex. A to Ex. 1013 (Watters Declaration)], 89 pages.
Injection Molding Handbook, Ch. 17 (3d ed. 2000), 76 pages.
IPC-2221A: Generic Standard on Printed Board Design. IPC May 2003. 124 pages.
McGraw-Hill Concise Encyclopedia of Science & Technology (1994), 7 pages.
Petition for Inter Partes Review of U.S. Pat. No. 10,613,355 (IPR2024-01069) dated Jun. 21, 2024, 96 pages.
Petition for Inter Partes Review of U.S. Pat. No. 8,708,483 (IPR2024-01030) dated Jun. 21, 2024, 101 pages.
Petition for Inter Partes Review of U.S. Pat. No. 8,801,174 (IPR2024-01070) dated Jun. 21, 2024, 109 pages.
Petition for Inter Partes Review of U.S. Pat. No. 8,905,541 (IPR2024-01071) dated Jun. 21, 2024, 104 pages.
Sandra Corns Pickel, The Evolution of the Modern Spectacle Frame, 136 Review of Optometry 9 (Jun. 15, 1999) (Pickel), 4 pages.
Sikonowiz, Walter, Designing and Creating Printed Circuits (Hayden Book Co., 1981), 23 pages.
Steer, Michael, Microwave and RF Design: Radio Systems, (Nc State University) 2019, 264 pages.
U.S. Appl. No. 60/583,169, filed Jun. 26, 2006, 197 pages.
U.S. Appl. No. 61/157,579, filed Mar. 5, 2009, 43 pages.
U.S. Appl. No. 60/924,225, filed May 4, 2007, 18 pages.
U.S. Appl. No. 60/929,419, filed Jun. 26, 2007, 20 pages.
U.S. Appl. No. 60/929,991, filed Jul. 20, 2007, 13 pages.
U.S. Appl. No. 60/978,517, filed Oct. 9, 2007, 15 pages.

* cited by examiner

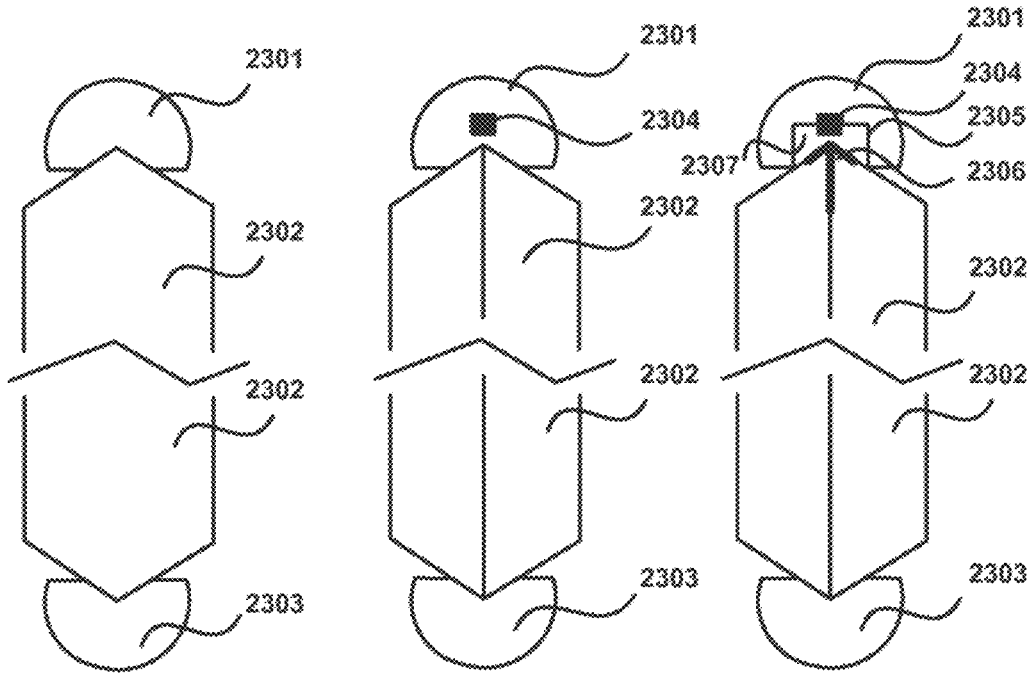
FIG. 23A  FIG. 23B  FIG. 23C
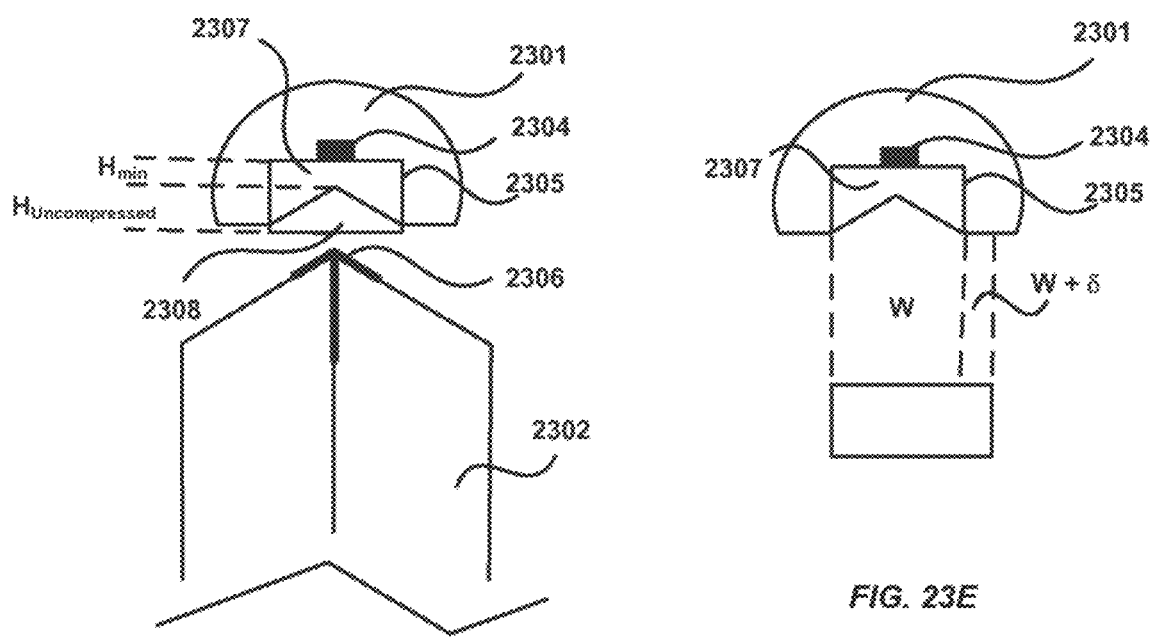
FIG. 23D
FIG. 23E

MOISTURE-RESISTANT EYE WEAR

CROSS-REFERENCES TO RELATED APPLICATIONS

The present application is a continuation of and incorporates by reference in its entirety U.S. patent application Ser. No. 16/704,591, filed Dec. 5, 2019, which is a continuation of U.S. patent application Ser. No. 13/890,809, filed May 9, 2013, which is a continuation-in-part of U.S. application Ser. No. 13/298,997, filed Nov. 17, 2011, which is a continuation-in-part of U.S. application Ser. No. 13/179,219, filed Jul. 8, 2011, which in turn claims priority to U.S. Prov. Pat. App. No. 61/481,353, filed May 2, 2011, and of U.S. Application No. 61/362,877, filed Jul. 9, 2010. U.S. application Ser. No. 13/298,997 is also a continuation-in-part of U.S. application Ser. No. 13/175,633, filed Jul. 1, 2011, and of U.S. application Ser. No. 13/175,634, filed Jul. 1, 2011, each of which claims priority to U.S. Prov. Pat. App. No. 61/415,391, filed Nov. 19, 2010; U.S. Prov. Pat. App. No. 61/376,719, filed Aug. 25, 2010; and U.S. Prov. Pat. App. No. 61/361,110, filed Jul. 2, 2010.

BACKGROUND OF THE INVENTION

In today's world, spectacle eyeglass frames are very fashionable. While the trend for the eyeglass lenses is to make them thinner, lighter, and less visible, at the same time, it is the eyeglass frame that makes the fashion statement for the eyeglass wearer.

Concurrent with these trends is another concerning including electronics into spectacle eyewear. The trend of utilizing electronics in eyewear appears to be accelerating and the applications being developed by others are expanding. As these trends continue, it is becoming important to find ways to incorporate electronics into eyewear without harming the aesthetics and functionality of the eyewear. Some of the challenges may be to not limit the fashion design of the eyeglass frame or limit the materials which the eyeglass frame can be made of, maintain as few completed eyeglass frames or eyeglass frame components (frame fronts, bridges, temples) stock keeping units (SKUs) as possible, allow for robust placement of the electronics, and in a way that can be manufactured so that it remains affordable, and aesthetically desirable.

BRIEF SUMMARY OF THE INVENTION

Embodiments may provide electronic (also referred to herein as "electro-active") spectacle frames that comprise a façade that may cover a structural component of the electronic frames. Some embodiments may comprise a housing module that houses (e.g., contain, encapsulate, surround a portion of, etc.) one or more electronic components (and/or an electronics module) of the electronic spectacles. Some embodiments may comprise a spring hinge and an electrical path from a temple to a lens. Some embodiments may also comprise a conductive compliant material that provides part of an electrical path between the electronic components (e.g. components in an electronics module) and electronics located on the electronic spectacle frames and/or electro-active lenses. Some embodiments may also comprise a single electronics module or multiple electronics module.

A first device may be provided that comprises eyeglasses, where the eyeglasses may further include a lens housing, a first temple and a second temple coupled to the lens housing, and a first and a second lens supported by the lens housing. The first device may further include a façade that covers the lens housing. The first device may further comprise an electronic component and at least one conductive path may be provided from the electronic component to the first lens having a portion that runs through the lens housing.

In some embodiments, in the first device as described above, the electronic component may comprise an electronics module. In some embodiments, the electronics module may be coupled to the first temple.

In some embodiments, in the first device as described above, the electronic component may be coupled to the lens housing. In some embodiments, in the first device as described above, at least one conductive path may be provided from the electronic component to the second lens having a portion that runs through the lens housing.

In some embodiments, in the first device as described above, the façade covers a portion of the lens housing. In some embodiments, in the first device as described above, the façade covers the entire lens housing.

In some embodiments, in the first device as described above, the lens housing may comprise rimless or semi-rimless spectacle frames. In some embodiments, the lens housing may comprise at least one of: screws or rim wire. In some embodiments, the conductive path comprises a conductive wire. In some embodiments, the façade provides an appearance of rimmed spectacle frames.

In some embodiments, in the first device as described above, the lens housing may comprise rimless or semi-rimless spectacle frames and the façade may provide an appearance of full rimmed spectacle frames. In some embodiments, in the first device as described above, the lens housing may comprise rimless spectacle frames and the façade provides an appearance of semi-rimless spectacle frames. In some embodiments, in the first device as described above, the lens housing may comprise full-rimmed spectacle frames and the façade may provide an appearance of full rimmed, semi-rimless, or rimless spectacle frames. In some embodiments, in the first device as described above, the lens housing may comprise rimless or semi-rimless spectacle frames and the façade provides an appearance of rimless spectacle frames. In some embodiments, in the first device as described above, the lens housing may comprise semi-rimless spectacle frames and the façade may provide an appearance of semi-rimless spectacle frames.

In some embodiments, in the first device as described above, the façade masks the conductive path. In some embodiments, in the first device as described above, the conductive path may comprise a conductive wire. In some embodiments, in the first device as described above, the conductive path may comprise conductive rubber. In some embodiments, the conductive path may comprise a portion of the lens housing.

In some embodiments, in the first device as described above, the facade may be coupled to the lens housing utilizing an adhesive material. In some embodiments, in the first device as described above, the facade may be coupled to the lens housing utilizing one or more screws. In some embodiments, in the first device as described above, the façade may be removably coupled to the lens housing. In some embodiments, where the façade may be removably coupled to the lens housing, the lens housing may be configured to be coupled to a plurality of facades, where each of the plurality of facades may be different.

In some embodiments, in the first device as described above, the façade may comprise metal and the lens housing may comprise a plastic material, such as for instance acetate.

In some embodiments, in the first device as described above, the façade may comprise a plastic material and the lens housing may comprise a metal. In some embodiments, in the first device as described above, both the façade and the lens housing may comprise either a metal or a plastic material.

It should be understood that, after reading the disclosure provided herein, a person of ordinary skill in the art may understand that various combinations of the devices described above may be made such that some or all of the features described with regards to one device may be combined with some or all of the features of another device.

BRIEF DESCRIPTION OF THE DRAWINGS

FIGS. 23A-23E show exemplary embodiments of a device in accordance with some embodiments.

DETAILED DESCRIPTION OF THE INVENTION

Figure 1:
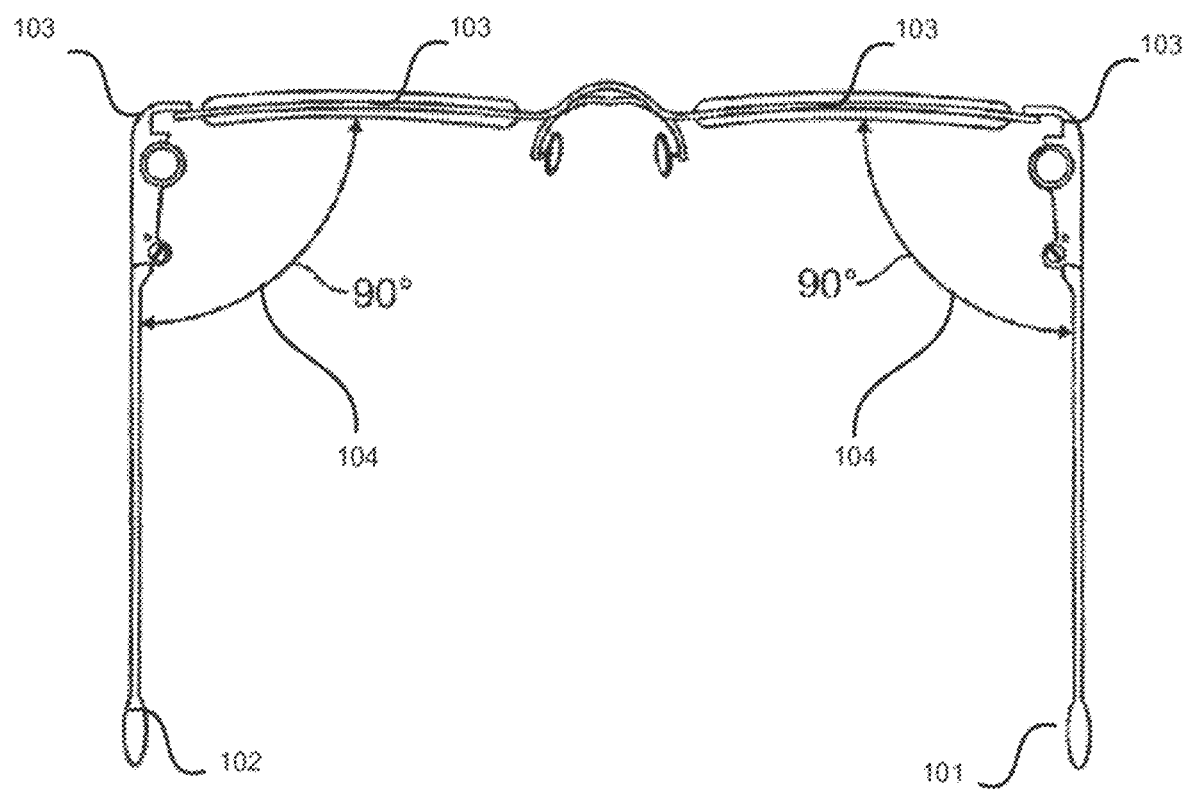
FIG. 1 is an illustration of spectacle frames.

The following disclosure provides exemplary devices comprising electro-active (i.e. electronic) spectacles. Before discussing specific embodiments, some descriptions of some specific terms are provided below.

As used herein, a "frame" may refer to a complete wearable housing that secures both spectacle lenses and aligns them in the proper place relative to the wearer's eyes when being worn. The frame may comprise elements such as a first and second temple, as well as the lens housing that is configured to support the spectacle lenses.

As used herein, a "hinged temple" may refer to a side piece of a frame that connects to the lens housing (or directly to the lens) by way of a hinge attachment mechanism, and further provides stability by resting on the wearer's ears when worn.

As used herein, a "hinge-less temple" may refer to a side piece of a frame that connects to the lens housing (or directly to the lens) without a hinge attachment mechanism, and further provides stability by resting on the wearer's ears when worn.

As used herein, a "temple end piece" may refer to a part of the temple that is found farthest away from the lens housing. The temple end piece usually begins behind the ear of the wearer and ends at the end of the temple that is located farthest away from the lens housing, but this is not required.

As used herein, a "lens housing end piece" may refer to a part of the lens housing farthest away from the bridge and spatial to the bridge. Each frame typically has two lens housing end pieces: one on the spatial side of the right lens and one on the spatial side of the left lens.

As used herein, a "bridge" may refer to a part of the frame that fits over/superior to the wearer's nose. The bridge is usually found between the portion of the lens housing that supports the right lens and the portion of the lens housing that supports the left lens, or is between the right and left lenses themselves. In some embodiments, the bridge may comprise a portion of the lens housing.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim.

As used herein, a "hinge" may refer to the part of the frame that allows for connecting the lens housing and the temples in such away that the lens housing and the temple can open and close against the lens housing on its posterior side when not being worn. In some embodiments, the hinge may connect directly to the lens.

As used herein, "eye-wire" may refer to the rim that surrounds the lens of a spectacle frame. Eye-wire may comprise a portion of the lens housing that holds one lens (a right or a left) in a full rimmed or semi-rimless frame. There may be two eye-wires to each lens housing.

However in a completely rimless frame there are no eye wires.

As used herein, a "lens housing" may refer to a part of the frame that is configured or adapted to support or hold the first and the second lenses in place (preferably firmly in place). The lens housing may also comprise the part of the frame to which the temples attach. The lens housing may comprise any component or material adapted to support the lenses, including, for example, screws, nylon monofilament, eye-wire, etc. or any combination thereof. The lens housing may comprise any material, including metal or plastic. A lens housing may be included in any type of frame design, including fully rimmed, semi-rimless, and rimless. In some embodiments, the lens housing may also include the bridge, such as when the lens housing comprising a single component or two components that support both the first and the second lens. Moreover, as used herein, reference to a "lens" also includes any suitable optic or optical component. That is, the lens housing may hold any optical component, and need not necessarily comprise a lens that has a focal point (e.g. a lens could include a piece of glass or plastic that may serve any purpose). For example, a "lens" as used herein may refer to optical components that may project or maintain an imaginary image perceivably by viewer and/or be used in heads-up displays, video games, checking electronic mail, and/or any other suitable manner.

As used herein, an "electronics module" may refer to a housing or container that comprises a plurality of electrical components. For instance, an electronics module may comprise a power source (such as a battery), a sensing mechanism (such as a capacitance switch, which may activate or deactivate the electronics) and/or a controller (such as a microprocessor).

As used herein, an "electronic component" may refer to any electronic device, including a power source, a controller (such as a microprocessor), a sensing mechanism (such as a touch switch), etc. that may be coupled to an electro-active frame.

As used herein, a "rimless frame" may refer to a frame that is designed having a lens housing that does not comprise eye-wires. That is, for instance, the lens housing does not comprise eye wires but may comprise, for instance, nylon monofilament wire, screws, or other material to hold the lenses in place.

As used herein, a "semi-rimless frame" may refer to a frame that has a lens housing that comprises partial rim (i.e. eye-wire that does not completely encapsulate or encircle the lens) and/or may have a nylon monofilament wire or similar feature that secures the lenses to the frame.

As used herein, a "full rimmed frame" or "fully rimmed" may refer to a frame that comprises a lens housing having a complete rim that encapsulates or encircles the first and second lens (i.e. the lens housing comprises full eye-wires).

As used herein, a "Zyle frame" may refer to a frame that comprises mostly plastic As used herein, a "metal frame" may refer to a frame that comprises mostly metal As used herein, a "right spatial void" may refer to the space created where the right portion of the lens housing that is within the plane of the front of the wearers face turns back to meet the right temple. The angle formed between the right portion of the lens housing and the right temple is approximately (but not always) 90 degrees. This space is further defined as that which is bounded on three sides: On a first side by an imaginary line that is provided on the inside back surface of the right lens or inside right portion of the lens housing, on a second side by that of an imaginary line that is located in the middle of the right temple not including any electronics affixed thereto, and on a third side which is bounded by the right side of the face and/or head of the wearer.

As used herein, a "left spatial void" may refer to the space created where the left portion of the lens housing frame front that is within the plane of the front of the wearers face turns back to meet the left temple. The angle formed between the left portion of the lens housing and the left temple is approximately 90 degrees. This space is further defined as that which is bounded on three sides: On a first side by an imaginary line that is provided on the inside back surface of the left lens or inside left portion of the lens housing, on a second side by that of an imaginary line that is located in the middle of the left temple not including any electronics affixed thereto, and on a third side which is bounded by the left side of the face and/or head of the wearer.

As used herein, "coupled" may refer to any manner of connecting two components together in any suitable manner, such as by way of example only: attaching (e.g. attached to a surface), disposing on, disposing within, disposing substantially within, embedding within, embedded substantially within, etc. "Coupled" may further comprise fixedly attaching two components (such as by using a screw or embedding a first component into a second component during a manufacturing process), but does not so require. That is, two components may be coupled temporarily simply by being in physical contact with one another. Two components are "electrically coupled" or "electrically connected" if current can flow from one component to another. That is, the two components do not have to be in direct contact such that current flows from the one component directly to the other component. There may be any number of other conductive materials and components disposed electrically between two components "electrically coupled" so long as current can flow there between.

As used herein, a "conductive path" refers to a continuous path for which electrons (i.e. current) may flow from one point to another. The conductive path may comprise one component, or more than one component. For instance, a conductive path may comprise portions of a lens housing, a temple, a hinge, a lens, and/or conductive material disposed between some or all of the components.

As used herein, "electro-active spectacles," "electronic spectacles," "electro-active spectacle frames," "electronic spectacle frames," "electro-active eyeglasses," "electro-active eyeglass frames," "electro-active frames," "electro-active lenses" or any permutation of "electro-active" or "electronic" may broadly refer to any eyeglass frame or lens that comprises an electronic component or components. The electrical components can be coupled to any part of the electro-active (e.g. electronic) frames or lenses. This may comprise, for instance, any and all uses where by the eyeglass frames house some, most, or all of the electronics and the lens comprises a component or components that may be activated and/or deactivated by an electrical current or voltage, such as by way of example only, electronic focusing eyeglasses, electro-chromic eyeglasses, electronic tinted eyeglasses, eyeglasses comprising a micro-display allowing for viewing a digital image in space, eyeglasses comprising an electronic heads up display, eyeglasses that comprise an antistatic element to keep the eyeglass lenses clean, electronic shutter eyeglasses for viewing 3D images, electronic eyeglasses that comprise an occlusion control for vision training; electronic eyeglasses for myopia control, eyeglasses that comprise a component of a telescope or the complete telescope, eyeglasses that comprise a microscope, eyeglasses that comprise a camera, eyeglasses that comprise a directional microphone, eyeglasses that comprise a rangefinder, eyeglasses that comprise an image intensifier, eyeglasses that comprise a night vision enhancement feature, occupation eyeglasses, gaming eyeglasses; eyeglasses that may comprise electronic components to provide a user with functionality for receiving input from a wearer and performing a specific operation in response, such as providing information to the wearer—e.g. a virtual personal assistant (that is, eyeglasses that may comprise electronic components such as an input device (e.g. a microphone) for receiving signals (e.g. commands or questions) from a wearer; a micro-processor that may process the input received from the wearer and determine an appropriate action or response; a memory or other storage device that may store associations between input received and predetermined functions; voice recognition software for identifying the information in an input received from a wearer; an output device (e.g. a speaker) for communicating or signaling information to a wearer, etc.).

Additional functionality and electrical components that may comprise portions of electro-active or electronic spectacles may be utilized, including those that are discussed in more detail below.

As used herein, reference to a "first" or a "second" does not limit the referenced component to a particular location unless expressly stated. For instance, reference to a "first temple" may comprise the temple located on either the left side or the right side of a wearer's head.

As used herein, the term "approximately" may refer to plus or minus 10 percent, inclusive. Thus, the phrase "approximately 10 mm" may be understood to mean from 9 mm to 11 mm, inclusive.

Electro-Active Frames Comprising a Spring Mechanism

Some embodiments of electro-active spectacle frames provided herein may include a spring mechanism. The spring mechanism may, for instance, be disposed on the frame of the spectacles (such as on the temple, embedded within the temple, coupled to the temple and the lens housing, etc.) and may provide a force that causes the temple member to apply pressure in a direction substantially perpendicular to, and in the direction of, a wearer's head. In this manner, the spectacle frames may fit tightly on a person's head, regardless of the size or shape. This may provide for a more comfortable fit and reduce the risk that the eyeglasses could become dislodged or accidentally fall off of the wearer's head. Moreover, the use of a spring mechanism for an electro-active frame may provide the additional benefit of conserving power when the frames are not in use by severing an electrical connection between electronics located on the lens housing (or in the lens) and a power source located on the temple. That is, for instance, the spring mechanism may, by moving the temple of the frame away from the lens housing, separate two conductors such that current cannot flow from the temple to the lens housing (or any other separation).

The use of springs (e.g. spring hinges) for non-electro-active lenses is well known in the art. Examples of such spring hinges are provided in the following references, which are hereby incorporated by reference in their entireties:

U.S. Pat. No. 6,336,250 to Takeda entitled "Spring hinge for Eyeglasses."

U.S. Pat. No. 5,760,869 to Mitamura entitled "Eyeglasses Frame with Spring Hinges."

U.S. Pat. No. 5,657,107 to Wagner et al. entitled "Spring Hinge for Eyewear"

U.S. Pat. No. 4,991,258 to Drlik entitled "Eyeglass Spring Hinges."

To date, there has not been a similar approach used for electro-active eyeglasses. In addition to some of the benefits provided by a spring mechanism (including those noted above, such as a tighter fit and the ability to conserve power by disconnecting components), there are additional considerations that the inventors have identified related to the use of such devices in electro-active frames. For instance, electro-active eyeglass frames may require that an electrical path be provided from a temple to the lens housing, which is not utilized on traditional (i.e. non-electro-active frames) frames. However, the use of spring devices (such as spring hinges) in electro-active eyeglass frames may cause the temple and lens housing to form an angle that is less than 90 degrees, even when the frames are in use. This could cause a disruption in electrical connectivity between electronics or a power source located on a temple with any electronics located on the lens housing (or in the lens itself). FIG. 1 illustrates this situation.

As shown in FIG. 1, a typical position of the temple relative to the lens housing (e.g. when the frames are being worn) is for the first 101 and/or the second temple 102 to form approximately a ninety degree angle with the lens housing 103. In practice, this angle may be slightly smaller or greater (depending on factors such as the wearer's head size and shape, the size of the frame, etc.). In this position, a conductive path may connect components on the first 101 or second temple 102 to components disposed on the lens housing 103. However, the use of a spring mechanism that applies force in the direction of a wearer's head may cause this angle 104 to be substantially less than ninety degrees (for instance, it may be 85 degrees or less), which could cause a separation in the conductive path between the first 101 or second 102 temple and the lens housing 103. For example, if a portion of the conductive path from the first temple 101 to the lens housing 103 comprises electrical contacts located at the respective ends of each of these components (such that, for example, when the first temple 101 and lens housing 103 are worn, there is a direct connection between the electrical contacts), then this connection may be broken as the angle 104 between the components is reduced. As noted above, the use of springs or similar devices in eyeglass frames to provide continuous pressure is likely to create such angles, and therefore such springs and similar devices have not been used with electro-active frames.

Figure 2A:
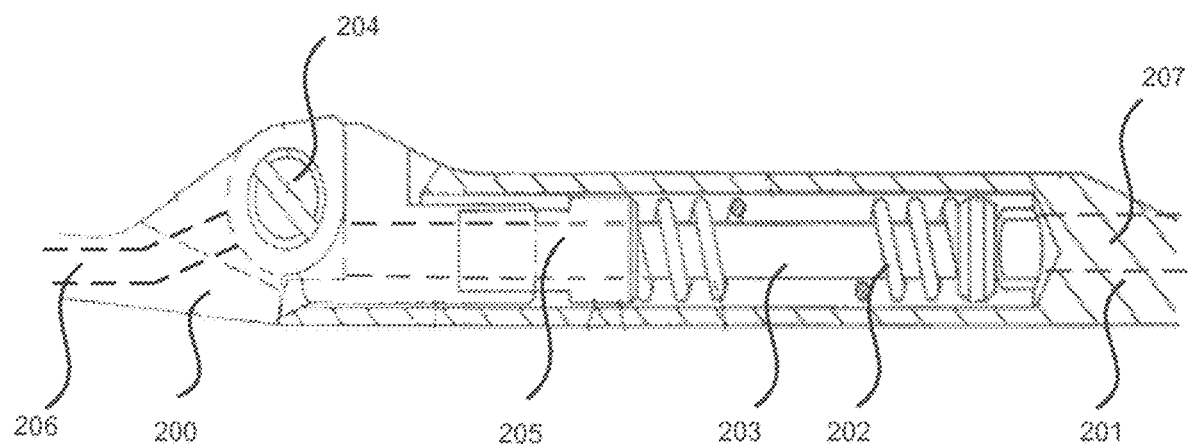
FIGS. 2A and 2B are cross sectional diagrams of devices in accordance with some embodiments.
Figure 2B:
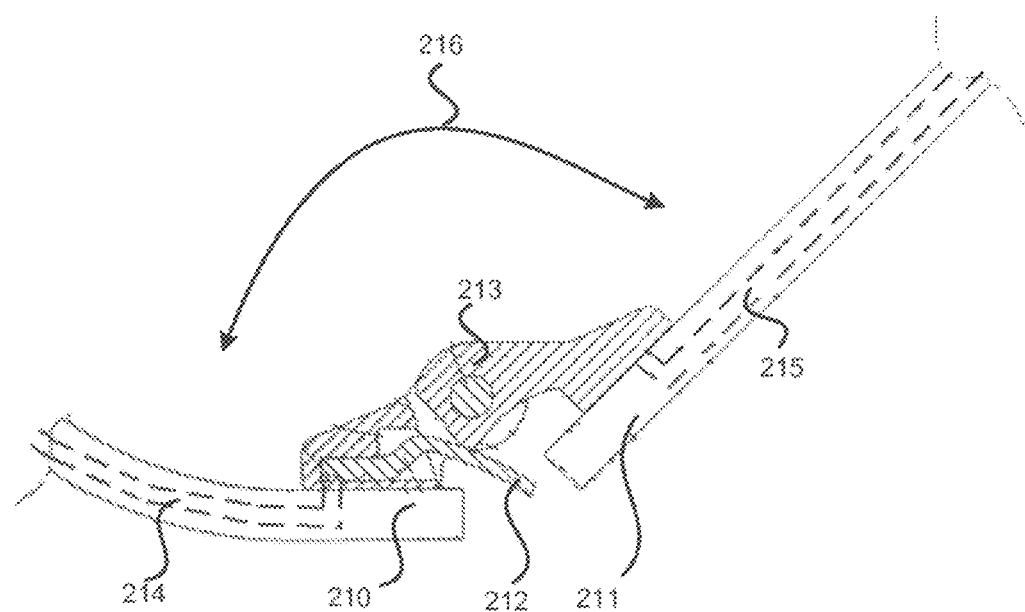

Provided herein is an electro-active frame that comprises a spring mechanism. As used herein, a "spring mechanism" may refer to an elastic object that may be used to store mechanical energy. It may comprise a spring and/or other components such as conductors located within the spring or disposed alongside the spring (or within the coils of a coil spring). When compressed or stretched, the first spring mechanism may exert a force on one or more of the components of a device, such as the temple or the lens housing of an electro-active frame. The first spring mechanism may provide a continuous force (either variable or constant) in a direction substantially perpendicular to the head of a wearer when the first device (e.g. an electro-active frame) is worn. The first spring mechanism may, in some embodiments, also conduct electricity and thereby form a part of a conductive path using a spring (or components thereof) or a conductor coupled to or disposed therein. In some embodiments, the conductor may be embedded within the spring mechanism, be coupled to the spring mechanism, and/or encircled by the spring mechanism. As used herein, a spring mechanism may also comprise additional components, such as a hinge that may be coupled to the temple and/or the lens. The spring mechanism may comprise any suitable material, including metal, plastic, or some combination thereof. FIGS. 2A and 2B show two examples of electro-active frames comprising spring mechanisms.

A first device is provided that comprises a frame that includes a lens housing adapted to support a first lens and a second lens. The first device also comprises a first temple movably coupled to the lens housing, and a second temple movably coupled to the lens housing. That is, the first and second temples may be coupled to the lens housing such that each may be moved relative to the lens housing so that the angle between them (e.g. angle 104 in FIG. 1) may change. In this regard, the lens housing and the temples may be coupled in any suitable manner that allows for this movement, including, by way of example, through the use of a hinge or a screw.

The first device further comprises a first spring mechanism coupled to the first temple and the lens housing. As defined above, this does not require that the spring mechanism be permanently attached to both components. For example, the spring mechanism may be fixed to the first temple and apply force to the lens housing when the first temple and lens housing (or components thereof, such as the end pieces) are within a certain distance of one another (i.e. the angle 104 between the components is close to ninety degrees (e.g. within five degrees), or some other suitable value). When the first temple and the lens housing are moved sufficiently apart the spring mechanism may no longer be in physical contact with the lens housing. An example of this situation is provided in FIG. 2B and described in detail below. Although defined above, it is worth noting that the spring mechanism need not be in the form of a coil spring, but may take any suitable shape and may be located in any suitable location on the frame. Such locations, as will be described below, may include disposed on, or embedded within, the lens housing and/or on the first temple. An example of a spring mechanism embedded within the first temple is shown in FIG. 2A, which will be described below.

The first device also comprises a first conductive path from the first temple to the lens housing for at least one position of the first temple relative to the frame. That is, as defined above, electrons (in the form of current) may be distributed (i.e. conducted), or be capable being distributed (i.e. conducted), from the first temple to the lens housing. In so doing, the first device may, for example, comprise an electro-active frame that has some electronic components (such as a power source, controller, sensing mechanism, etc.) located on the first temple, and other electronic components (such as those described below) disposed on the lens housing and/or on (or within) the lenses themselves.

As defined above, the first conductive path may be provided by any suitable component or components. For instance, the conductive path could comprise the first temple, the spring mechanism, and the lens housing themselves (i.e. each could comprise conductive material) or some or all of these components could comprise conductive components disposed on (or embedded within) them that form a part of the conductive path. As indicated above, the conductive path need not always be present, but may be provided for at least one position of the first temple relative to the lens housing. With reference again to FIG. 1, the first temple 101 may be moved to a plurality of positions relative to the lens housing 103, each of which may have a different angle 104. Preferably, the first conductive path is provided when the first temple and the lens housing are in a position corresponding to when the first device is being worn by a wearer. In some embodiments, this position may have an angle corresponding to approximately ninety degrees. However, embodiments are not so limited and the angle may depend on many factors, as described above. It should also be understood that the conductive path may be provided for a plurality of positions.

In some embodiments, in the first device as described above, the first conductive path is provided by the first spring mechanism. That is, for example, the first spring mechanism may provide some (or all) of the first conductive path between the first temple and the lens housing. This may be due, in part, to the fact that the spring mechanism may be located between (or substantially between) both the first temple and the lens housing. In some embodiments, the first spring mechanism comprises a spring that provides the first conductive path. The spring of the spring mechanism need not comprise a traditional coil spring, but may comprise any elastic material that stores mechanical energy, such as when the spring is displaced. An example of a non-coil spring is provided with reference to FIG. 2B. As noted above, the spring may comprise any conductive material when providing at least a portion of the first conductive path. Preferable, the spring mechanism comprises metal.

By utilizing the spring mechanism to form a part of the conductive path, some embodiments may provide the advantage of reducing the number of components that are required to be coupled to the frame. Moreover, in some embodiments, the use of the spring mechanism to serve as part of the conductive path may be one way in which the conductive path can be selectively provided (e.g. the conductive path may be available when the first device is being worn and unavailable when the first device is not being worn). For instance, the spring mechanism may be permanently coupled (i.e. fixedly, such as through the use of a screw, adhesive, etc.) to only the first temple, and be selectively coupled (i.e. temporally, such as coming into physical contact, but not being adhered to, screwed together, etc.) to the lens housing such that the spring mechanism is in physical contact with the lens housing in some but not all positions of the first temple relative to the lens housing. In embodiments where the first spring mechanism provides some or all of the conductive path, then in positions where the first spring mechanism is no longer contacting the lens housing, the conductive path may not be provided. This may be one way of providing a selectively available conductive path between the first temple and the lens housing.

In some embodiments, in the first device as described above, the first spring mechanism comprises a spring and a first conductor. The conductor may comprise any suitable material and may have any suitable shape. There need not be any physical contact between the spring and the conductor.

For instance, in some embodiments, the spring is disposed substantially around the first conductor. By "substantially around," it is meant, for example, that the spring may encircle or surround some (but not necessarily all) of the conductor. This is illustrated in the exemplary embodiment shown in FIG. 2A. For instance, if the spring comprises a coil spring, then the conductor may be located within the coils of the spring. In some embodiments, the conductor may be disposed within (e.g. embedded in) the spring, such that the spring may comprise both the conductor (or more than one conductors) and an insulating material. The insulating material may electrically insulate the conductors that are within the spring such that the a plurality of conductive paths are provided by the spring (i.e. through the embedded conductors). This may
allow for multiple signals to be transmitted from the first temple to the lens housing, for a signal and power to be transmitted, etc. In some embodiments, the spring is coupled to the first conductor. That is, the spring may be attached or disposed on the conductor. Each of the spring and/or the conductor may comprise a part of the conductive path. In some embodiments, the spring is disposed along a side of the first conductor. By "along side," it is meant that the spring and the conductor may be substantially parallel and located no more than 3 cm apart at any given point. Preferable, the spring and the conductor are no more than 1 cm apart such that the spring mechanism may have a small profile (i.e. for aesthetic reasons). Again, embodiments are not so limited, and the conductor may be located in any suitable location. Thus, in some embodiments, the first conductive path or a portion thereof may be provided by the first conductor.

In some embodiments, in the first device as described above, the first conductive path further comprises pogo pins. A "pogo pin" may comprise a device that establishes a (usually temporary) connection between two components. An illustration of an embodiment that utilizes pogo pins is shown in FIGS. 3-10. The pogo pins may be disposed within the first temple, but embodiments are not so limited and the pogo pins may be located in other locations, such as disposed on the first temple, on the lens housing (or embedded therein) and/or coupled to the first spring mechanism. In some embodiments, the first device further comprises a second spring mechanism that may press the pogo pins against electrical contacts on the lens housing for a plurality of positions of the first temple. The use of the second spring mechanism may provide the ability to maintain the conductive path between the first temple and the lens housing for some or all of the positions of the first temple relative to the lens housing. That is, as the distance between the portion of the lens housing comprising the electrical contacts and the first temple increases (i.e. as the angle 104 in FIG. 1 decreases), the second spring mechanism may lengthen the conductive path (i.e. cause the pogo pins to extend) so as to maintain the electrical contact (and thereby the conductive path). When the angle 104 is then increased, the lens housing and/or first temple may apply force to the second spring mechanism such that it contracts (i.e. the pogo pins contract), but such that the electrical contact is still maintained. By providing a force on the pogo pins so as to press against the electrical contacts of the lens housing (or congruently, against the first temple) for some, but not all, of the position of the temple, embodiments may provide the ability to selectively provide a conductive path between the first temple and the lens housing.

In some embodiments, in the first device as described above, the first spring mechanism may include a spring hinge. That is, the spring mechanism may comprise a fixed portion that is coupled to both the lens housing and the first temple (i.e. the hinge) that allows for the relative movement between the two components so as to change the angle 104. The spring may be coupled to either or both of the lens housing and the first temple, and may provide a force that may move the first temple to one of a plurality positions and/or presses the first temple against a wearer's head. In some embodiments, in the first device as described above, an electronics module is further provided. The electronics module may, for example, comprise at least one of: a power source, a controller, and a sensing module. The use of an electronics module may, in some embodiments, provide the ability to more readily fabricate electro-active spectacles, as the electronics may be manufactured separately and inserted into a plurality of frame designs. The electronics module may be coupled to the first temple or in another suitable location (note that some embodiments may dispose the electronics module or components thereof, for instance, on the lens housing). For example, the electronics module could be embedded or substantially embedded in the first temple (as is described below with reference to the exemplary embodiments shown in FIGS. 3-10). In some embodiments, the first conductive path may be electrically connected to the electronics module. That is, a conductive path may be provided from the electronics module to the lens housing and may comprise a number of components, such as the first spring mechanism or components thereof.

In some embodiments, in the first device as described above, the first conductive path conducts electricity from the first temple to the lens housing when the first temple is in a first position. The first conductive path does not conduct electricity from the first temple to the lens housing when the first temple is in a second position. As was described above, the first and second positions may correspond to relative positions between the first temple and the lens housing. The first position, in which the conductive path conducts electricity, may correspond to a position of the first temple when the first device is in use (e.g. when the first device is worn) and the second position may correspond to a position of the first temple when the device is not in use (i.e. when the device is not worn). As noted above, the conductive path may be provided by any of the components of the first device, such as the first spring mechanism, lens housing, first temple, etc. Embodiments that selectively (i.e. in some instances but not all) provide the conductive path from the lens housing to the first temple may provide some or all of the advantages described above, which may include power conservation and efficiency related to
some or all of the electronic components of the first device not operating when the first device is not in use (e.g. any electronics disposed on the lens housing will not be electrically connected to electronic components on the first temple).

In some embodiments, where the first conductive path conducts electricity from the first temple to the lens housing when the first temple is in a first position and the first conductive path does not conduct electricity from the first temple to the lens housing when the first temple is in a second position, the lens housing comprises a first electrical contact and the first spring mechanism forms an electrical connection with the first electrical contact in the first position. In some embodiments, the first spring mechanism does not form an electrical connection with the first electrical contact in the second position. That is, in embodiments wherein the first conductive path or a portion thereof includes the spring mechanism (or a component thereof), the spring mechanism may directly connect to (i.e. physically contact) the electrical contacts disposed on the lens housing. In this manner, the conductive path provided at least in part by the spring mechanism may be selectively provided by contacting and not contacting the electrical contacts on the lens housing.

In some embodiments, in the first device as described above, the first spring mechanism is coupled to the first lens. This may be the case, for instance, when the first device comprises rimless eyeglass frames. The spring mechanism may provide some or all of the same functionality as in full rimmed or semi-rimless embodiments, such as by applying a force such that the first temple applies pressure on the wearer's head. The spring mechanism may also be coupled to the lens housing, even in rimless embodiments (such as when a screw or hinge is coupled to the lens). In some embodiments, the lens includes a first electrical contact, and the first spring mechanism forms an electrical connection with the first electrical contact when the frame is in the first position. That is, the spring mechanism may form a portion of the conductive path that drives current to the lens (and may power and/or control any electronics therein) from the first temple. As noted above, in some embodiments, the spring mechanism may directly connect to the lens, and thereby may also form a direct electrical connection with the electrical contacts disposed thereon. The spring mechanism may itself comprise conductive components (including in some embodiments a conductive spring) that may form the connection. In such embodiments, the spring mechanism may be fixedly coupled to the lens, but the conductive components of the spring mechanism may selectively contact the electrical contacts of the lens.

In some embodiments, in the first device as described above, the first spring mechanism is housed within the first temple. As used herein, the term "housed within" may refer to when the first spring mechanism is coupled to the first temple in such a way that a portion of the first spring mechanism (such as a spring or a conductor) is within the structure of the first temple.

However, the first spring mechanism may have some components exposed outside of the structure of the first temple, such as to make electrical connections with other components such as the lens housing. Embodiments that include the spring mechanism embedded within the temple may provide aesthetic value (that is, the electro-active frames may present a more favorable outward appearance), as it may provide a more finished look with components covered or contained within the overall structure of the device. In addition, embedding the first spring mechanism in the first temple (or any component, such as the lens housing) may also provide a more durable or reliable device, as the first temple may protect the spring mechanism from ambient conditions as well as physical damage that spectacle frames are typically subjected to on a regular basis.

In some embodiments, in the first device as described above, the first spring mechanism is in electrical contact with the electronics module. As defined above, electrical contact does not require direct physical contact. There may be any number of conductors located between two components that are in electrical contact. The spring mechanism may be disposed between the electronics module and the electronic components that it controls and/or provides power to, and therefore it may be efficient in some embodiments that the spring mechanism electrically connect to the electronics module. This connection may be made regardless of the position of the first temple, particularly in embodiments whereby the first spring mechanism is disposed on the first temple. In some embodiments, the first spring mechanism is in direct electrical contact with the electronics module. That is, there are no other conductors disposed between the electronics module and the electrical connector. Some exemplary embodiments are illustrated in FIGS. 3-10.

In some embodiments, where the first conductive path conducts electricity from the first temple to the lens housing when the first temple is in a first position and the first conductive path does not conduct electricity from the first temple to the lens housing when the first temple is in a second position, the first spring mechanism maintains electrical contact with the electronics module in both the first position and the second position. This may be the case, for instance, for embodiments on which the spring mechanism is disposed on the first temple. As the first temple is moved (e.g. by the spring mechanism) from the first position (where the spring mechanism may be electrically connected to the lens housing) to the second position, the electrical contact between the first spring mechanism and the lens housing may be severed (e.g. the spring mechanism and the lens housing may no longer be physically coupled). This may provide the selective conductive path discussed above. Embodiments may provide the advantage that only one electrical contact may be required to be connected/disconnected (i.e. only one electrical switch) so as to activate and deactivate the electronics on the lens housing.

In some embodiments, in the first device as describe above, the first spring mechanism is in a first condition when the first temple is in a first position and a second condition when the first temple is in a second position. By "condition," it is meant that any characteristic of the spring mechanism (including the position of the spring mechanism, its size, shape, or length, and/or the conductivity of the spring mechanism) may change. In some embodiments, this change in condition may provide the change in electrical connectivity. For instance, the shape of the first spring mechanism may change so as to provide (or not provide) physical contact between the spring mechanism (or components thereof) and the lens housing. In some embodiments, the spring mechanism may, for example, maintain electrical contact with the lens housing and the first temple by changing its length or shape (e.g. as the distance between the first temple and the lens housing increases, the spring mechanism may increase in length to maintain contact). In this regard, the first spring mechanism may have a first length when the first temple is in a first position and a second length when the first temple is in a second position. The first length and the second length are different. By "length" it is meant that the dimension of the electrical connector in a direction that is substantially parallel to the largest dimension of the temple (preferably when the first device is worn).

In some embodiments, in the first device as described above where the first conductive path conducts electricity from the first temple to the lens housing when the first temple is in a first position, and the first conductive path does not conduct electricity from the first temple to the lens housing when the first temple is in a second position, the first position is an open position. By "open position," it is meant that the first temple is in a position that is substantially perpendicular to the first and/or second lens such as when the frame is positioned on a wearer's head. However, it need not be exactly perpendicular, as in some cases there may be embodiments where the angle between the temple and the lens is less than ninety degree. The angle is shown in FIG. 1 by the angle 104. The angle 104 may vary based on both the shape and size of the wearer's head as well as the size and shape of the frames. For instance, in some embodiments, the first position may comprise the first temple and the lens housing being positioned such that the angle 104 between them is between 60 degrees and 110 degrees. Preferably, the angle 104 between the temple and the lens housing in the first position is between 80 degrees and 90 degrees. This typically corresponds to the angle 104 for when the first device is being worn, and thereby the electronics of the first device may be used.

In some embodiments, in the first device as described above where the first conductive path conducts electricity from the first temple to the lens housing when the first temple is in a first position, and the first conductive path does not conduct electricity from the first temple to the lens housing when the first temple is in a second position, the second position is a closed position. By "closed position," what is meant which is that the temple and the lens form an angle 104 that is significantly less than ninety degrees. This may correspond, for instance, to a situation in which the device is not in a position on a wearer's head and therefore any frame electronics may not need to be activated. In some embodiments, the second position comprises the first temple and the lens housing being positioned such that there is an angle 104 between them of between 0 degrees and 60 degrees. Preferable, the second position comprises the first temple at an angle 104 between 0 degrees and 45 degrees with the lens housing. Again, these angles may correspond to when the first device is not in use.

FIGS. 2A and 2B illustrate two exemplary embodiments of spring mechanisms that could be used in the first device. First, with reference to FIG. 2A, a spring 202 is provided that is disposed between the lens housing 200 and the first temple 201. In this exemplary embodiment, a portion of the spring 202 is shown as being embedded in the first temple 201. The spring 202 is illustrated as a coil spring, and a conductor 203 is shown disposed within the spring 202 (i. e. the spring substantially encircles the conductor). In some embodiments, the conductor and spring may comprise the spring mechanism. A hinge 204 is shown coupled to both the lens housing 200 and the first temple 201. The hinge 204 permits the first temple to move relative to the lens housing 200. A conductive path is shown by the dotted lines 205 (within the spring mechanism), 206 (within the lens housing 200) and 207 (within the first temple). The conductive path could comprise an embedded conductor within these elements (e.g. a wire or embedded conductive material) or it could represent the components themselves (e.g. the lens housing 200, spring mechanism (i.e. spring 202 and/or conductor 203), and/or the first temple 201 could comprise conductive material). However, embodiments are not so limited, and the conductive path need not be provided by the spring mechanism or a component thereof. The spring 202 may apply a force to the first temple 201 such that the first temple 201 applies pressure on a wearer's head.

With reference to FIG. 2B, another exemplary spring mechanism for use in an electro-active frame is provided. The spring 212 is not a coil spring, but may comprise elastic material such that when the first temple 211 is moved close to the lens housing 210, the spring 212 becomes depressed. Because of the nature of the material of the spring 212, as it becomes compressed (i.e. it is displaced toward the lens housing 210) it provides an opposing force. This force may separate the lens housing 210 and the first temple and/or, for example, apply force to maintain the first device tightly on a wearer's head. The hinge 213 (which is shown as comprising conductive material) couples the lens housing 210 and the first temple 211 such that they may move relative to one another. A conductive path is shown by the dotted lines 214 (within the lens housing) and 215 (within the first temple). The conductive paths 214 and 215 may be connected (and thereby form a single conductive path) when the first temple 211 is positioned close to the lens housing 210 (e.g. when the spring 212 is sufficiently compressed). Although as illustrated, the conductive path is provided through the conductive hinge 213, embodiments are not so limited. That is, a portion of the conductive path (e.g. between conductive paths 214 and 215) may be provided by any suitable component, such as through the spring 212.

For example, the lens housing 210 and the first temple 211 could comprise electrical contacts at the interface where each may contact the spring 212. When the spring is compressed, there may be formed electrical contacts between the lens housing 210, the spring 212 and the first temple 211. In some embodiments, the conductive path 214 may connect directly to the spring 212 (which, for example, may itself comprise conductive material) such that an electrical contact need only be formed (selectively) with the conductive path 215 in the first temple 211.

For instance, when the first temple is moved to contact 212, but prior to fully compressing 212 to contact the lens housing 210, an electrical path from the first temple 211 to the lens housing 210 may be established. This exemplary embodiment may provide the ability to have the conductive path at angles 216 that are less than ninety degrees (which may be beneficial, for instance, to prevent connection problems when the electro-active frames are worn and the pressure applied by the spring causes an angle less than ninety degrees). It should be understood that the spring could, in some embodiments, be located on the first temple and the principles discussed herein would apply equally.

With reference to FIGS. 3-10, an exemplary embodiment of a first device is provided for illustration purposes only. The components that comprise the exemplary embodiment in FIGS. 3-10 include: a first temple 300; electrical connectors 301 to connect to the pogo pins; pogo pins comprising a spring 302 and conductive portion 303 (e.g. stainless steel cable); vertebrae 304; an end piece 305; a spring box cover 306; an electronics module 307; a cavity 308 in the first temple for housing the electronics module 307; and electrical connectors to the electronics module 310. It should be noted that this is for illustration purposes only, and is provided to demonstrate an exemplary embodiment in which pogo pins embedded or coupled to the first temple 300 may be used to maintain an electrical contact with the lens housing throughout a plurality of positions (i.e. angles) between the first temple 300 and the lens housing. Pogo pins may be used with or without a spring mechanism, but when combined with the use of a spring mechanism, embodiments may provide the benefit of maintaining the conductive path when the electro-active frames are worn despite the creation of an angle between the lens housing and the first temple that is less than ninety degrees.

Figure 3:
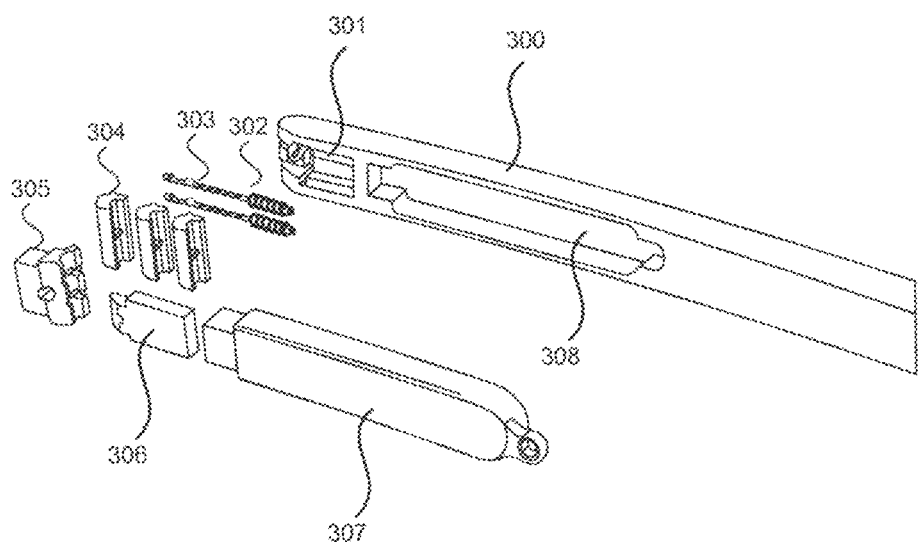
FIG. 3 shows an exploded view of components of a portion of an exemplary device in accordance with some embodiments.

FIG. 3 shows an exploded view of the components comprising a portion of an exemplary device in accordance with embodiments provided herein. The device comprises an electronics module 307 embedded in a cavity 308 of the first temple 300. The electronics module is electrically connected to pogo pins that comprise a spring 302 and a conductor 303. The pogo pins may be used to maintain a connection as the distance (and/or relative positions) between two electrical contacts increases or decreases, because the spring 302 applies force to maintain the electrical contact with the conductor 303. Thus, for instance, embodiments may provide that as the first temple 300 is moved relative to the lens housing, the pogo pins may maintain electrical contact with the lens housing and thereby provide a portion of a conductive path from the first temple 300 to the lens housing. The vertebrae 304 allow the first temple 300 to move relative to the lens housing, while covering the pogo pins. The end piece 305 may comprise a hinge such that the first temple 300 and the lens housing are coupled together, but may move relative to each other. The spring box 306 covers and protects the pogo pins and/or provides aesthetic value be given a finished look to the frames.

Figure 4:
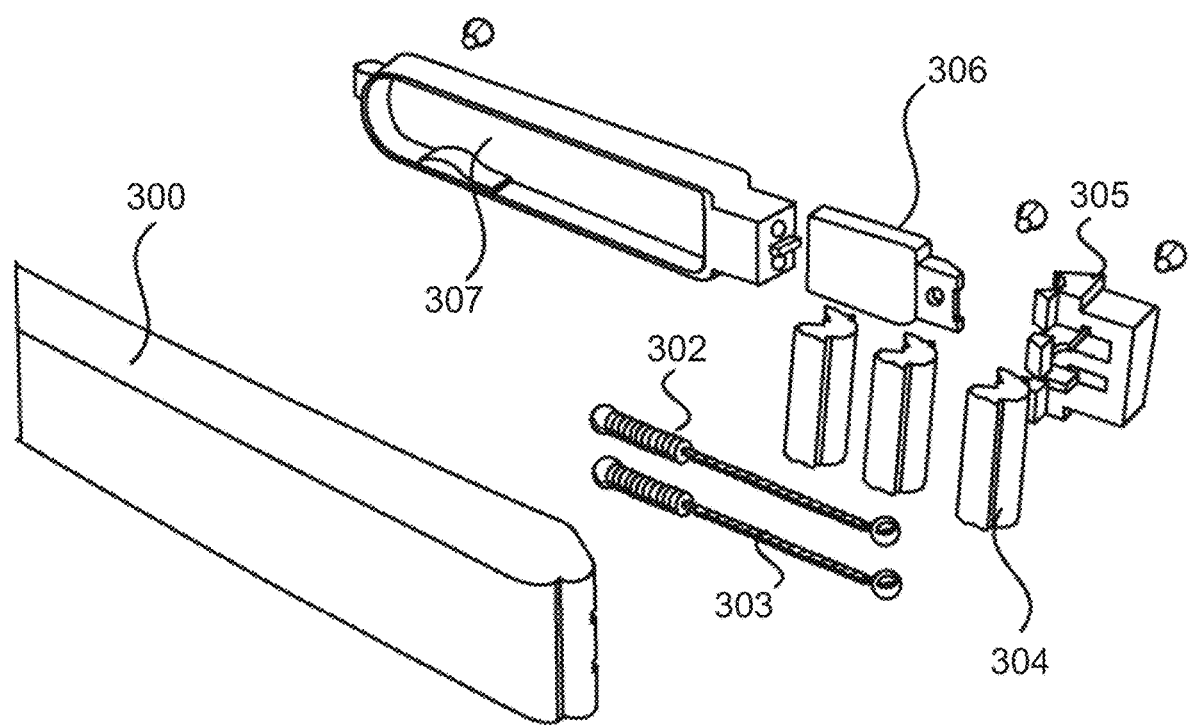
FIG. 4 shows an exploded view of components of a portion of an exemplary device in accordance with some embodiments.

FIG. 4 shows the same components described above with reference to FIG. 3 from an alternative angle. It should be noted that end piece 305, spring box cover 306, and electronics module 307 may be coupled to the first temple 300 using any suitable method (such as adhesive, two sided tape, a screw, etc.).

Figure 5:
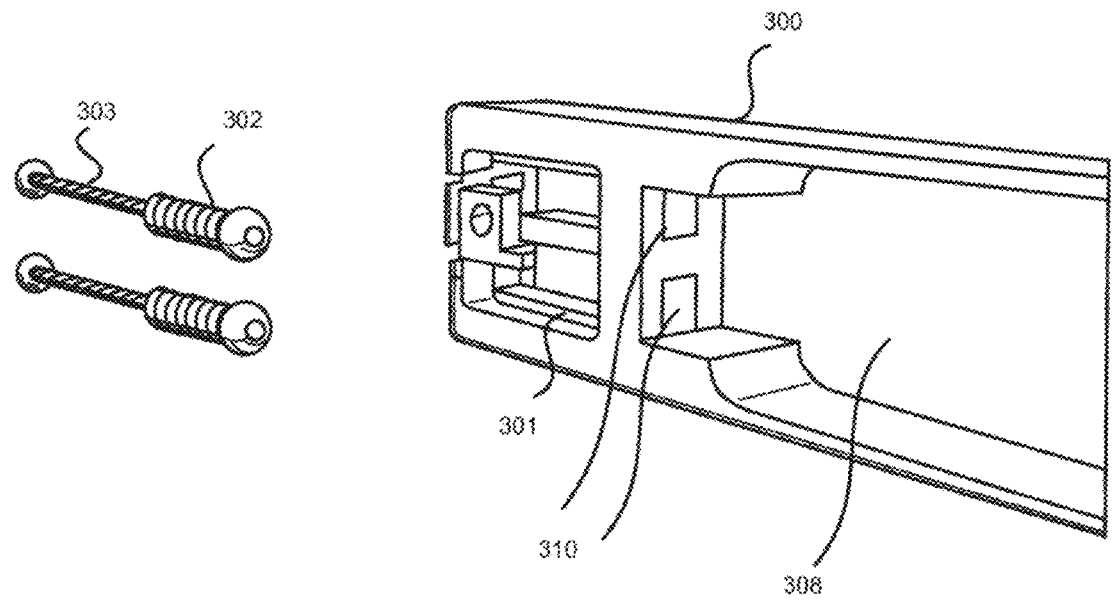
FIG. 5 shows an exploded view of components of a portion of an exemplary device in accordance with some embodiments.

FIG. 5 shows a close-up view of the first temple 300 of the exemplary device. As shown, the pogo pins (and in particular the end of the pogo pins comprising the spring 302) may form an electrical connection with electrical connectors 301. The electrical connectors 301 are embedded within a cavity in the first temple 300. Also shown are connectors 310 that may form an electrical connection with the connectors 301 and the electronics module 307. Thus, the electrical connectors 301 and 310 form a conductive path from the pogo pins to the electronics module (not shown) in the cavity 308. In some embodiments, the connectors 301 and 310 may comprise a single electrical conductor.

Figure 6:
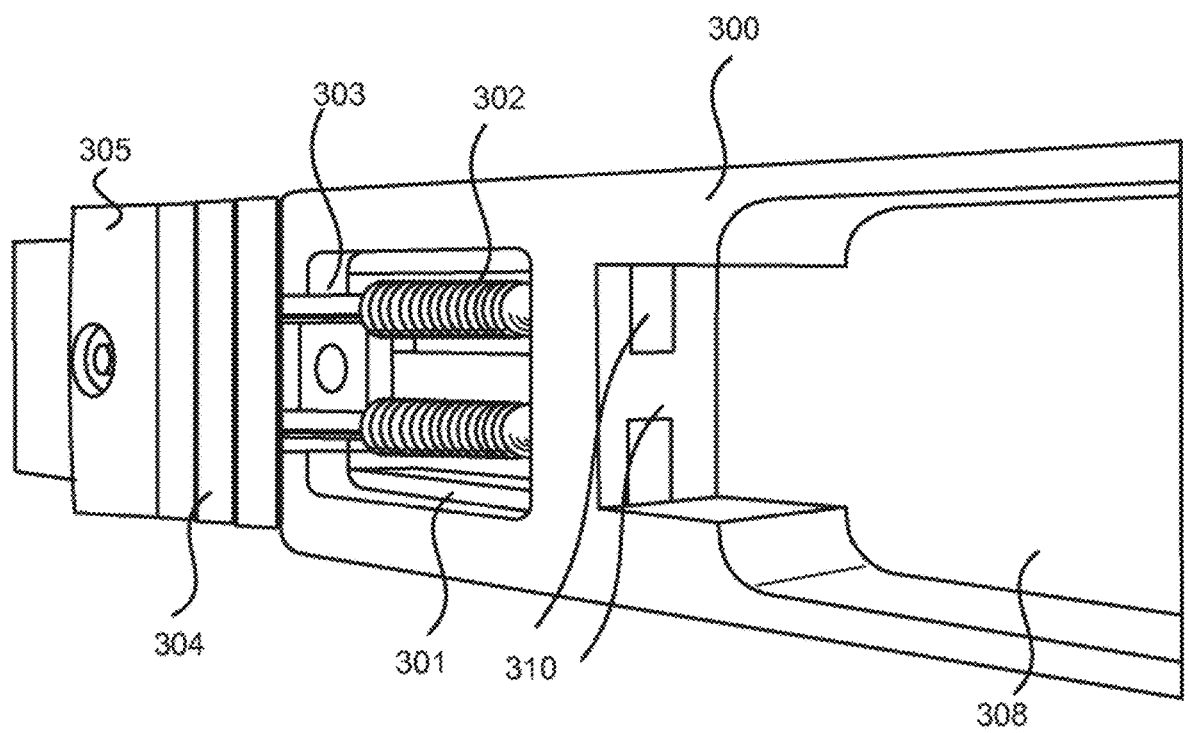
FIG. 6 shows a portion of an exemplary device in accordance with some embodiments.

FIG. 6 shows the components described above coupled together with (or disposed within) the first temple 300. As shown, the vertebrae 304 cover a portion of the conductor 303 of the pogo pins. The electrical connector 301 is shown in physical contact with the pogo pins, and the pogo pins are embedded substantially within the first temple 300.

Figure 7:
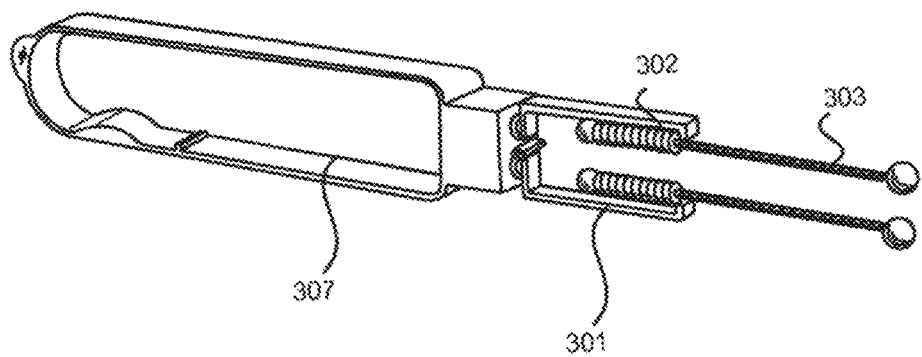
FIG. 7 shows components of an exemplary device in accordance with some embodiments.

FIG. 7 shows an isolated view of the connections formed between the electronics module 307 and the pogo pins. As shown, the electrical connectors 301 are coupled to the electronics module 307 and are in physical (and electrical) contact with a portion 302 of the pogo pins. In this manner, a conductive path is provided from the electronics module 307 to the pogo pins. The pogo pins (via conductor 303) may further form an electrical connection with a portion of the lens housing. In so doing, a conductive path may be provided from the first temple 300 (e.g. from the electronics module 307) to the lens housing. In this manner, the electronics module 307 may provide, for example, power and/or control signals to electronics housed on the lens housing and/or in the lens. Further, as described above, the use of the pogo pins may be beneficial, for example, with the use of a spring mechanism as they may continue to provide a portion of a conductive path between the electronics module 307 and the lens housing for a plurality of positions of the first temple 300 relative to the lens housing (e.g. a number of angles formed there between, as described above).

Figure 8:
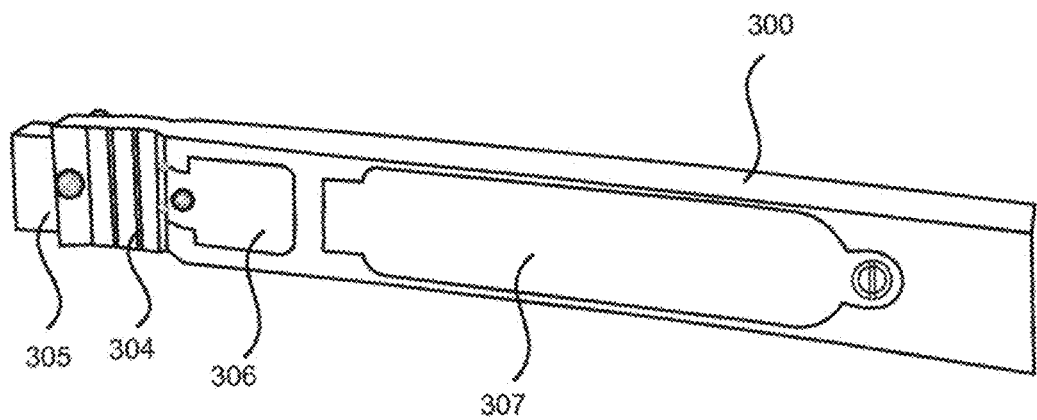
FIG. 8 shows an exemplary portion of an exemplary device with components coupled therein.
Figure 9:
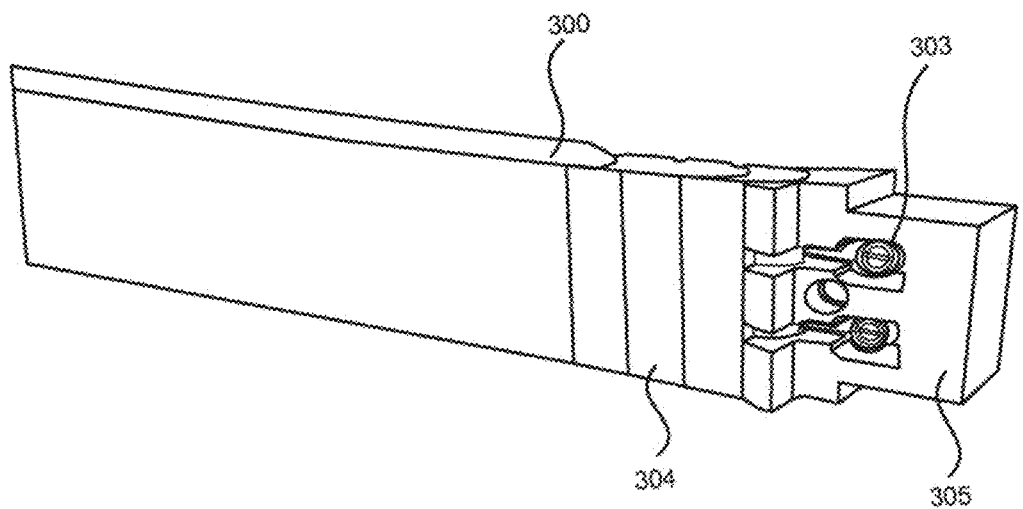
FIG. 9 shows an exemplary portion of an exemplary device with components coupled therein from a different angle.

FIGS. 8 and 9 show views of the first temple 300 with each of the identified components coupled together where appropriate. The exemplary embodiment may provide a finished look (which may be aesthetically pleasing), as each of the internal components (such as the pogo pins, the electrical connectors, and even the electronics module) are relatively concealed or masked with the first temple.

Figure 10:
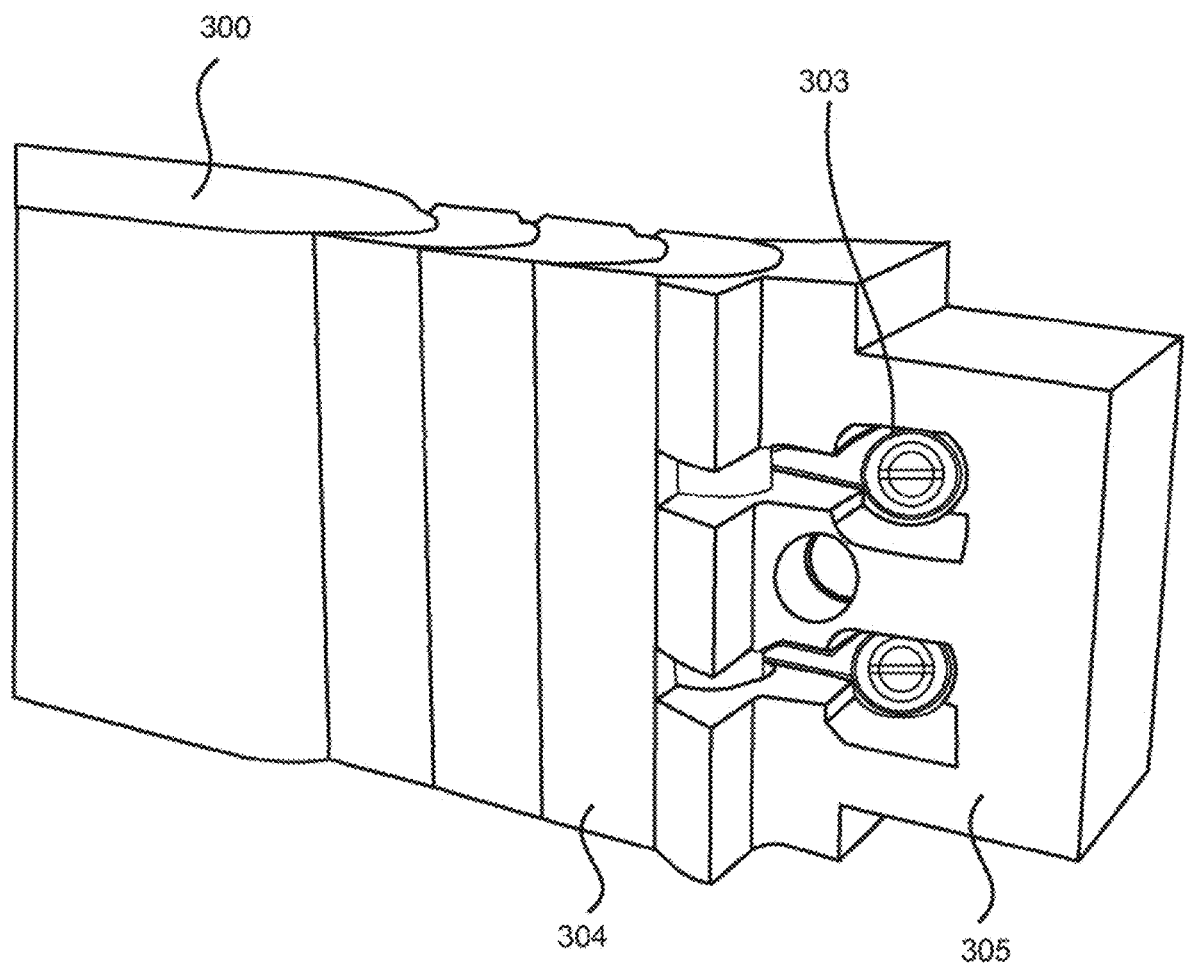
FIG. 10 shows a close-up view of an exemplary portion of an exemplary device with components coupled therein.

FIG. 10 shows a close up of the end piece 305 of the exemplary device. As shown the conductor 303 of the pogo pins are partially exposed so as to be capable of forming an electrical connection with the lens housing. The vertebra 304 cover a portion of the pogo pins, and also provide the ability for the first temple 300 to move relative to the lens housing, while remaining coupled thereto.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Some embodiments provided herein may thereby convey some of the advantages of utilizing a spring mechanism on eyeglass frames to embodiments comprising electro-active frames. For example, the use of the spring mechanism may provide for a better and/or more comfortable fit for the wearer, while providing the first conductive path from the first temple to the lens housing may allow for embodiments to utilize electronic components located on either or both of the lens housing (and/or the lens) and the temple. In addition, some embodiments may also provide the advantage of conserving power (and/or the lifetime of the electronics) by providing a conductive path from the temple to the lens housing for some positions of the temple relative to the lens housing, while not providing the conductive path in one ore more other positions.

Exemplary Embodiments Comprising Separate Conductive Paths

Some embodiments disclosed herein may provide for electro-active frames comprising multiple conductive paths that are electrically isolated from one another. As more sophisticated electronics are provided on electro-active frames, it may be necessary to provide for additional electrical connections between multiple components. To function properly, these electrical connections (and the conductive paths that provide the electrical signals and current) must be separated (i.e. electrically isolated) to properly control multiple components (or, if an electrical component must be supplied power and control signals, this may also require multiple electrically isolated paths as well). Often times, electrical components are located in the temple of the electro-active frames (typically because there may be more space to dispose such components therein in an aesthetically acceptable manner). Housing electronic components in the temple may require that electrical connections are made between these components in the temple and any electrical components coupled to the lens housing (which may include the lenses themselves).

Embodiments may provide that these conductive paths from the temple to the lens housing of an electro-active frame are provided by frame elements of electro-active frames. As used herein, a "frame element" is any structural component of a frame (including the frame itself) or a component embedded therein such as a wire, conductor (such as metal), or conductive rubber. Thus, for instance, a frame element may include a temple, a bridge, a lens housing (e.g. rim wire for full rimmed or semi-rimless frames, hinges that connect to the lens housing and the temple, and/or other lens housings such as screws, nylon monofilament, etc) or portions thereof. A frame element does not comprise exterior components attached to the frame, such as a wire that runs along an outer surface. In this manner, by providing the conductive paths in a frame element or elements, the electro-active frames may remain aesthetically pleasing by not having bulky cords or other connections running across the frames or in locations where they may be visible.

Electro-active frames, and in particular electro-active frames that have electrical components in one or both lenses, often comprise multiple electronic components such as driving and control components (e.g. one for each lens). This can result in expensive devices with duplicative components. The inventors have found that by, for instance, providing multiple isolated electrical paths using frame elements, is may be possible to reduce the number of duplicative electrical components and thereby significantly decrease the costs of such devices (e.g. by only a single electronics module that may control both of the lenses). That is, the electronic components (such as the power supply, the controller (such as a micro-processor), and
the sensor mechanism (such as a switch that can activate the device) are often the components that are of the greatest expense (or are at least are relatively expensive in comparison to some of the other components of the frames). By reducing the number of components in each device, the inventors have provided the benefit of decreasing the costs associated with fabrication materials and decreasing the complexity and time of manufacture. Moreover, frame designs may be lighter and more structurally durable, as there are less components disposed thereon.

Described below are exemplary embodiments of devices comprising conductive paths provided by one or more frame elements (or components thereof) from the temple of a device to the lens housing. The embodiments described below are for illustration purposes only and are not thereby intended to be limiting. After reading this disclosure, it may be apparent to a person of ordinary skill that various components as described below may be combined or omitted in certain embodiments, while still practicing the principles described.

A first device is provided that comprises a frame. The frame further includes a lens housing adapted to support a first lens and a second lens, a first temple coupled to the lens housing, and a second temple coupled to the lens housing. The first device further comprises a first conductive path provided by one or more frame elements from the first temple to the lens housing and a second conductive path provided by one or more frame elements from the first temple to the lens housing. That is, the first device, through the use of two conductive paths, may provide, for instance, multiple electrical connections between two devices (e.g. one connection that provides power and the other that provides a control input), or between a plurality of devices (e.g. a control module or power supply that provides a signal or current to two different components, such as to two electro-active lenses). In this regard, the first conductive path is electrically isolated from the second conductive path. Embodiments may thereby provide the ability to send separate signals (for instance, power and a control signal) from electronics that are housed in the temple to those located on the lens housing. It should be noted that an electrical component need not be located on the lens housing (for instance, an electrical component may be located in a lens of the device). The device in some embodiments need only provide a conductive path from the temple (i.e. any part of the temple or a component thereon) to the lens housing. The conductive path may further extend to the lenses or to another component disposed thereon (or it may even extend through the lens housing and to the other temple).

It is often desirable (and/or necessary) for electrical components to be located or disposed on the lens housing to serve their intended purposes. For instance, if an electronic component displays an image to the viewer, changes the refractive index of the lens, or otherwise provides functions related to the wearer's vision, then these components may need to be located on (or near) the lenses. However, as noted above, the lens housing (or the lenses themselves) often does not have adequate space for the additional electrical components that may be required to activate and/or utilize the electronic components located on the lens housing or lenses (such as a power source, controller, or sensing module). In addition, these components may be aesthetically unpleasing and noticeable if disposed on the lens housing (or the lenses themselves). It may therefore be desirable in some embodiments to locate some or all of these additional electrical components on (or within) the temples of the frame. The temples typically have space available on which the additional electronic components may be disposed on and/or hidden or masked so as to remain aesthetically appealing.

However, as noted above, it may be necessary to provide a conductive path between the components in the temple and those located on the lens housing (or on the lenses). By using the frame element (e.g. the components themselves or conductors embedded therein), the inventors have developed embodiments of a device that may provide the necessary conductive paths to the lens housing, while maintaining the aesthetics of the device. Moreover, by electrically isolating the components so as to provide separate conductive paths, the inventors have developed embodiments of a device that may provide multiple inputs and connections to electrical components that may be coupled to the lens housing.

In some embodiments, the first device as described above further comprises at least one electrical insulator disposed between at least a portion of the first conductive path and the second conductive path. By "at least a portion" it is meant that electrical insulator need not be disposed along the entire first or second conductive paths (or along an entire interface between the two paths). Embodiments may provide different ways of electrically isolating the two conductive paths that may, for instance, combine the use of the insulator with other components or features (such as by providing an air gap between the two conductive paths in a region) and/or may utilize multiple insulating materials.

Figure 11:
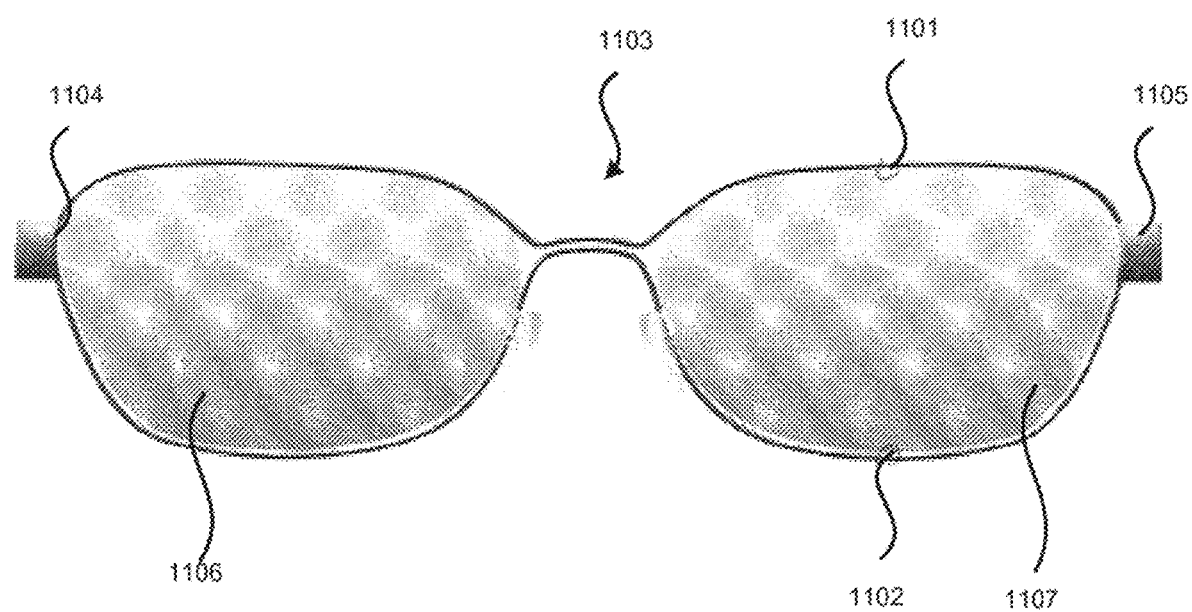
FIG. 11 shows an exemplary embodiment of a device in accordance with some embodiments.
Figure 12:
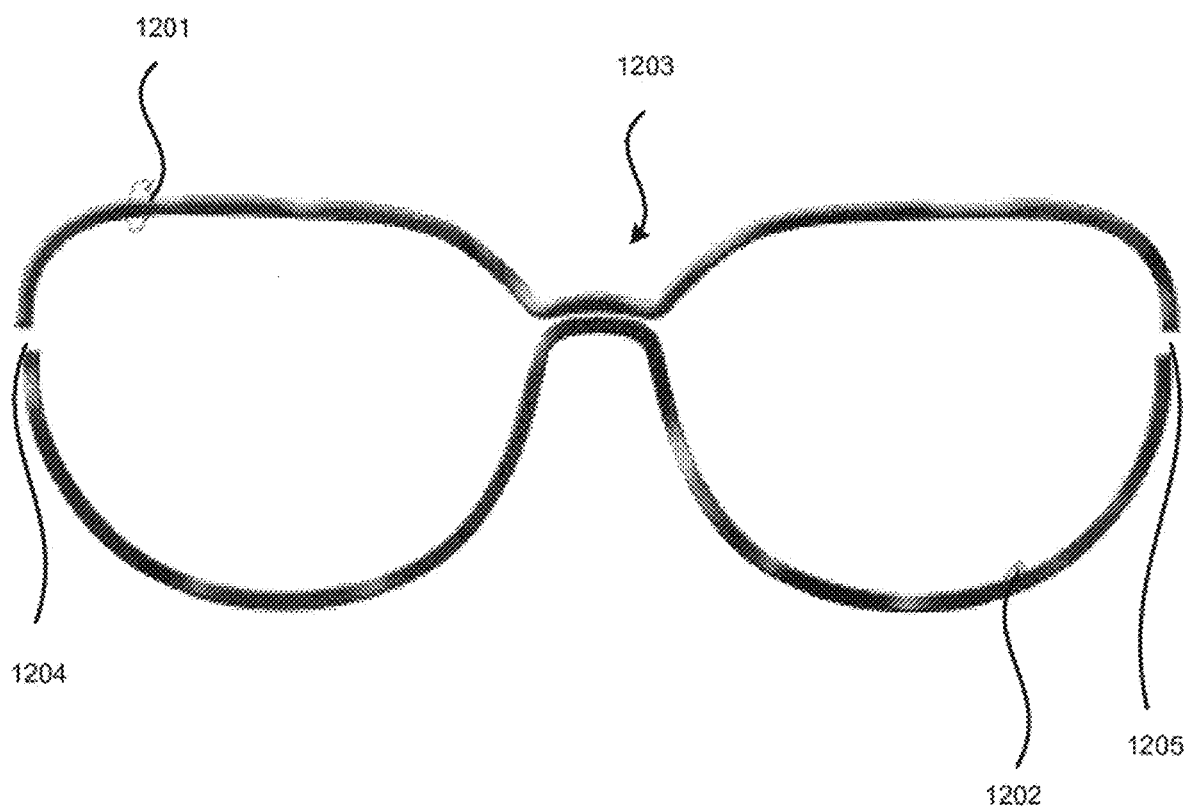
FIG. 12 shows an exemplary design mask in accordance with some embodiments.

The electrical insulator may be made of any suitable material, and may in some embodiments (such as embodiments where the conductors are embedded within a frame element) comprise a part of a frame element (such as when the frame element comprises a plastic material). For instance, in some embodiments, the electrically insulating material may comprise an injection moldable or similarly formed plastic material. In some embodiments, the electrically insulating material comprises nylon. The electrical insulator may be utilized in some embodiments in which the frame element comprises conductive material, and thereby two electrical paths may utilize the insulating materials to form the two conductive paths (although as described below, other methods may also be used when the frame elements comprise conductive material to isolate two conductive paths—such as by separating the paths using an air gap). Additional exemplary embodiments related to similar embodiments are shown in FIGS. 11-12. In addition, embodiments may comprise multiple electrical insulators (for instance multiple pieces of the same material or different material) and the insulating material may be located along different portions of the electrical paths (for instance, a portion of the insulating material may be located in the temple and another portion of the insulating material may be located in the lens housing).

In this regard, in some embodiments, the first device further comprises a first hinge coupled to the first temple and the lens housing. The first hinge may connect the temple to the housing, and allow the temple to move relative to the housing. The electrical insulator may be located at least within the first hinge. For instance, in some embodiments, a portion of the electrical path or paths may comprise the hinge (that is, the hinge may comprise conductive material or conductive material may be embedded therein). The hinge may comprise a portion of the conductive paths in some embodiments because it is coupled to both the lens housing (or comprises a part of the lens housing) and the temple, and thereby may provide a conductive path between the two frame elements. An example of a hinge comprising a portion of a conductive path is shown in FIGS. 2A (e.g. path 205-206) and 2B (e.g. path 214-215). The hinge may, for example comprise conductive material, and an insulator may be disposed therein so as to define two electrically isolated conductive paths. However, as noted above, the electrical insulator may be located in any suitable location, or in multiple locations, as needed. For instance, in some embodiments, the electrical insulator is located at least within the first temple. In some embodiments, the electrical insulator is located at least within the lens housing. This may be preferred, for example, in embodiments of semi-rimless frames wherein a partial eye-wire (which may be used to mask or hide an embedded conductor or conductors) is present only over one portion of the lenses (e.g. the top or the bottom of the lenses). The two conductive paths may be located in the partial eye wire, and the electrical insulator may be used to separate the two paths.

In some embodiments, the first device as described above further comprises an electronics module that is coupled to the first temple of the frame. As noted above, the electronics module and other components may be preferably located on the temple in some embodiments for both practical and aesthetic reasons. The electronics module may comprise, for example, a controller, a power source, and/or a sensing mechanism. Some or all of these components may be used to operate electrical components located on the lens housing, which may thereby require an electrical contact between the electronics module and the component. In this regard, the first and second conductive paths may be electrically connected to the electronics module. In this manner, the electronics module (or the components therein) may be electrically connected to components coupled to the lens housing (such as those located in the lenses for the first device). In some embodiments, the use of frame elements to provide portions of the conductive paths, in addition to the electronics module being embedded in the first temple, results in a device that may appear to an observer to be an ordinary (non-electro-active) frame. Furthermore, in some embodiments, the electronic components (e.g. coupled to an embedded electronics module) and the conductive paths (comprising a fame element or elements) may be protected from the elements, and may, for example, reduce the likelihood that a short may occurs from an outside charge or force.

In some embodiments, the first device as described above further comprises a first lens having a first electrical contact and a second lens having a second electrical contact. That is, some embodiments of the first device may comprise electro-active lenses (such as lenses that perform different function when current is supplied to them or a component therein). To provide current to the electro-active lens or components therein, the lenses may comprise one or more electrical contacts. In some embodiments, the first conductive path electrically connects to the first electrical contact of the first lens and the second conductive path electrically connects to the second electrical contact of the second lens. That is, the first conductive path may electrically connect to the first lens and the second conductive path may electrically connect to the second lens. In this manner, for example, embodiments may provide that a single electrical component (or electronics module) that is coupled to both the first and the second conductive paths may provide signals and/or current to the first and second lens of the device separately. For instance, embodiments may provide for the first and second lens to be controlled separately utilizing the electrically isolated conductive paths. Rather than a single electrical component (or electronics module), the first lens and the second lens may be individually controlled by separate electrical components (i.e. the first and second conductive path may, but need not, electrically connect to a single component).

In some embodiments, in the first device as described above that comprises a first lens having a first electrical contact that is electrically connected to the first conductive path, and a second lens having a second electrical contact that is electrically connected to the second conductive path, the first lens may further include a second electrical contact and the second lens may further include a first electrical contact. That is, the first and the second lenses may each comprise a first and a second electrical contact such that each may receive a plurality of signals or currents from one or more electrical components. In some embodiments, the first conductive path may electrically connect to the first electrical contact of the second lens and the second conductive path may electrically connect to the second electrical contact of the first lens. In this regard, the first lens and second lens may each be electrically connected to both the first and second conductive paths. Such embodiments may, but need not, provide for simultaneously controlling both the first and the second lens using a single electronics module or other components. Embodiments may thereby utilize, for example, a single electronics module that is electrically connected to both the first and second lenses.

As was described above, the use of a single electronics module and/or electrical components (such as those that may be coupled to the first temple of the device) to control a plurality of electrical components (such as those that are coupled to the lens housing and/or electro-active lenses of the first device) may provide several benefits. This includes, for example, removing redundant electrical components, and thereby reducing the manufacturing costs and complexity of the first device without sacrificing functionality. Such embodiments may also remove the need to synchronize the first and second lenses. That is, for example, if the first and second lenses are electro-active lenses and are controlled using two different electronics modules (or components therein), the operation of each may have to be matched with the other (otherwise, a wearer may become distorted or receive conflicting functionality from the lenses). Synchronizing the lenses could require additional electrical components and further add to the cost and the complexity of the first device.

Indeed, in some embodiments, the second temple or the second lens does not comprise an electronics module coupled thereto. In this manner, the electro-active frames may comprise less redundant features by utilizing a single electronics module (or the components therein) electrically connected to both the first and the second lens (or other components coupled to the lens housing). In some embodiments, the use of two electrical connections (i.e. via the first and second conductive paths) may be the minimal number of electrical contacts needed for electrical components located on the lens housing or the electro-active lenses (e.g. the first and second lenses) to function properly.

In some embodiments, in the first device as described above, the lens housing comprises a non-conductive material and the frame element providing the first conductive path (or a portion thereof) comprises a conductive material embedded in the lens housing. That is, the conductive path may comprise material embedded in the lens housing. This may provide the benefit that the lens housing material itself may electrically isolate the first conductive path from other components (such as the second conductive path). Also, utilizing a non-conductive material for the lens housing (rather than a conductive material) may prevent short faults with the electronic components, or false signals generated by outside sources (such as by static electricity). In some embodiments, the frame element providing the second conductive path (or a portion thereof) comprises a conductive material embedded in the lens housing. In such embodiments, the frame elements providing the portions of the first and second conductive paths may be embedded within the lens housing such that a sufficient amount of non-conductive material (e.g. the material that comprises the lens housing) is disposed between the two conductive paths such that they remain electrically isolated. In some embodiments, additional electrical insulation may be provided and embedded within the lens housing as well. In some embodiments, the lens housing comprises acetate. Acetate is one of the more common materials that eyeglass frames comprise. It is non-conductive and it may therefore be preferable to use this material for some of the embodiments described above utilizing non-conductive materials.

In some embodiments, in the first device as described above where the first device comprises a first and second lens having first and second electrical contacts, where the first conductive path electrically connects to the first contact of the first and second lens, and where the second conductive path electrically connects to the second contact of the first and the second lens, the lens housing may comprise a conductive material. A first portion of the lens housing may provide at least a part of the first conductive path. That is, a portion of the lens housing that comprises a conductive material may form an electrical connection between the first electrical contact of each of the first and second lenses. An exemplary embodiment of this is shown in FIGS. 11 and 12, and described in detail below. In some embodiments, at least a part of the second conductive path is provided by a second portion of the lens housing. That is, for example, the lens housing may be separated into a plurality of electrically isolated portions. This may be done in any manner, such as by having two separate conductive pieces that are shaped appropriately (e.g. shaped into the mold of the lens housing portions such that when coupled to the first device, the first and second portions may support the lenses) and coupling the two portions to the first device (such as by coupling the portions to hinges or the temples) so that the portions remain are physically separate (i.e. electrically isolated).

In this manner, some embodiments may offer some advantages over other designs for providing electrically isolated conductive paths such as, by way of example, providing a less complicated manufacturing process. That is, for embodiments where the lens housing itself comprises conductive material, there may be no need to provide conductive material embedded within the lens housing (which could be a complex and intricate process, particularly when attempting to define multiple electrically isolated conductive paths. By utilizing a more macro approach such as physically separating the large conducting components of the frame to form the conductive paths (e.g. a top portion 1101 and a bottom portion 1102 that are separated at the ends 1104 and 1105 where they may be coupled to the temples (or a hinge) of the first device and in the center 1103 by an air gap or insulation), embodiments may provide a readily achievable and commercially feasible design for providing the electrically isolated conductive paths.

Continuing with these exemplary embodiments, wherein the first device comprises a first and second lens having first and second electrical contacts, where the first conductive path electrically connects to the first contact of the first and second lens, where the second conductive path electrically connects to the second contact of the first and the second lens, where the lens housing comprises a conductive material, where a first portion of the lens housing provides at least a part of the first conductive path, and where at least a part of the second conductive path is provided by a second portion of the lens housing, the first portion of the lens housing and the second portion of the lens housing may be separated by at least one of an air gap or insulating material. This may again be illustrated with reference to the exemplary embodiments in FIGS. 11 and 12, where the electrical isolation between the first 1101 and the second 1102 conductive paths is an air gap at the bridge 1103. Other points of electrical isolation are provided at the edges of the lens housing 1104 and 1105 where the first portion 1101 and second portion 1102 of the lens housing are coupled to the temples at different locations. In some embodiments, rather than an air gap at the bridge 1103, electrical insulation may be used. This may provide an advantage over the air gap embodiments because the portions 1101 and 1102 above and below the air gap are likely to, at some point, be misshaped such that the electrical isolation may be compromised (particularly when considering the daily abuse that eyeglasses may be subject to). In contrast, if insulation is used at 1103, even if the portions 1101 and 1102 change shape, there may still be insulation disposed between the two portions, thereby potentially maintaining the electrical isolation. As noted above, in some embodiments, the bridge 1103 includes the first portion 1101 and the second portion 1102 of the lens housing (or portions thereof) and the air gap may be formed there. In some embodiments, the air gap has a maximum distance of at least approximately 10 mm. This distance for the air gap may provide enough separation between the first 1101 and second portion 1102 that the air gap is unlikely to be compromised during everyday use. In some embodiments, the first portion of the lens housing and the second portion of the lens housing comprise metal.

Continuing further with these exemplary embodiments, in some embodiments, where the first device further comprises at least one electrical insulator disposed between at least a portion of the first conductive path and the second conductive path, the electrical insulator may include a first component and a second component. The first component of the electrical insulator disposed between the first conductive path and the second conductive path comprises the first lens and the second lens. That is, again with reference to FIG. 11 for illustration purposes only, the first portion of the insulation may refer to the separation provide by the first 1106 and second 1107 lenses. That is, in some embodiments, the lenses are not made of a conductive material (or comprise embedded conductive materials) such that current could flow from the first portion 1101 to the second portion 1102 of the lens housing. In some embodiments, the second component of the electrical insulator disposed between the first conductive path and the second conductive path includes at least one of: an air gap and an electrically insulating material. That is, again with reference to FIG. 11, the second portion of the insulation may refer to the separation provided at the bridge 1103. In some embodiments, the second component of the electrical insulator is disposed between the first lens and the second lens. In this manner, the second portion of the insulator may prevent current from flowing between the two components and thereby compromising the electrical isolation of the first and second portions of the lens housing.

In some embodiments, and as noted above, the electrically insulating material that electrically isolates the first portion of the lens housing from the second portion of the lens housing may comprise an injection moldable or similarly formed plastic material. This material may be preferred because of its ability to mold its shape to the particular area it is confined to. Moreover, because it is injection moldable, it may be easier to apply this material to portions of the frame, such as embedding within the lens housing or the bridge area. In some embodiments, the electrically insulating material comprises nylon.

In some embodiments, the first device as described above may comprise semi-rimless eyeglass frames. As defined above, in some embodiments, semi-rimless eyeglass frames typically have partial eye-wires around some of the first and second lenses to provide support. It may be preferred that the first and second conductive paths are provided in this portion of the semi-rimless eyeglass frames because, for instance, the eye-wire is typically the thicker portion of the lens housing (i.e. this portion may be better able to hide the electrical components, and may also better protect the electrical connections from damage) in comparison to the nylon monofilament or other material that may be used on the remaining sections of the lenses to hold them in place. In this regard, in some embodiments, the first conductive path and the second conductive path are each disposed within the lens housing of the semi-rimless spectacles. For semi-rimless frame design embodiments, both of the electrical conductors that comprise the first and second conductive paths, respectively, may be disposed over the top of the lens (or the bottom, depending on the style of frames and/or where the portion of eye-wire (or the thicker portion of the lens housing) may be located). The first and second conductive paths may be separated by an electrically insulating material. That is, for instance, the lens housing in a semi-rimless design may comprise eye-wire (or any other suitable lens housing components) over the top portion of the first and second lens. This portion of the lens housing may comprise both the first and the second conductive paths, as well as an insulating material (such as nylon) disposed between the conductive paths such that the first and second conductive paths may be both electrically coupled to the first and second lens, and remain electrically isolated from the other.

In some embodiments, in the first device as described, the lens housing comprises full rimmed spectacle frames. Exemplary embodiments are shown again in FIGS. 11 and 12, but embodiments art not so limited. For example and as described above, full rimmed design embodiments may also comprise the first conductive path and the second conductive path provided by materials embedded within the lens housing. That is, embodiments are not limited to using only lens housing that comprise conductive materials. The full rim embodiments may include lens housings that comprise metal or plastic (or some combination thereof). In general, full rimmed designs may be preferred from a functional standpoint as the eye-wires that many such embodiments comprise may provide a ready means, as described in examples above, of providing a first and second conductive path from the temple to the lens housings, and/or from the lens housings to the lenses.

Although embodiments may provide one or more conductive paths from a temple to the lens housing which may, in some embodiments, provide one or more advantages related to reducing the number of components used for the electro-active frames, embodiments are not so limited. Indeed, the concepts discussed and described above may be equally applicable to embodiments that comprise multiple electronics modules and/or other components located on both the first and the second temple. In general, these embodiments may present advantages over single module embodiments such as, for instance, greater flexibility in controlling the individual components (such as electro-active lenses) by having individual controls located on each temple for each (or both) components. Provided below are additional exemplary embodiments:

A first device is further provided that comprises a frame. The frame further comprises a lens housing adapted to support a first lens and a second lens, a first temple coupled to the lens housing, and a second temple coupled to the lens housing. The first device further includes a first conductive path provided by one or more frame elements from the first temple to the lens housing, a second conductive path provided by one or more frame elements from the first temple to the lens housing, a third conductive path provided by one or more frame elements from the second temple to the lens housing, and a fourth conductive path provided by one or more frame elements from the second temple to the lens housing. As noted above, the use of frame elements provides many advantages over systems that may utilize exposed wires or other methods for establishing a conductive path between a temple of the frame and the lens housing. In the first device, each of the first, second, third, and fourth conductive paths are electrically isolated from each other. As noted above, it is generally beneficial to provide multiple electrically isolated conductive paths so as to control multiple electronic components and/or provide additional functionality, such as by providing power and signal paths to the components.

The first device as described above in some embodiments may provide the advantage that multiple electronics modules and/or electronic components may be disposed on either or both of the temples of the electro-active frame. This may, for instance, allow for more functionality than single module embodiments, based on, for instance providing for additional electronics to be included on the first device. Moreover, by providing electronics modules on both temples, embodiments may provide the advantage of not having to utilize a conductive path across the bridge of the frames to power/control electronic components on both sides of the lens housing. This may, in some embodiments, reduce the complexity of manufacturing that portion of the electro-active lens frame. In addition, in some embodiments, the conductive path across the bridge may be the location in which the electrical isolation between the various conductive paths is more likely to be compromised. Some embodiments may also provide for a more robust electro-active frame (and/or lens system), with potential backup systems and redundancy provided for the electronic components on each temple.

In some embodiments, in the first device as provided above, the first conductive path is electrically isolated from the second conductive path by an electric insulator and the third conductive path is electrically isolated from the fourth conductive path by an electric insulator.

The insulator may comprise any suitable material and may be located in any suitable location, such as at least in the temple, hinge, or lens housing, as described above. In some embodiments, the first device further includes a first electronics module that may be disposed on the first temple and a second electronics module disposed on the second temple. Such embodiment, as noted above, may provide the advantages of controlling multiple elements (such as electro-active lenses) individually, or providing a redundancy system so that the electro-active lenses may function after a failure in one of the electronics modules.

In some embodiments, the first device further includes a first lens having a first electrical contact and a second electrical contact and a second lens having a first electrical contact and a second electrical contact. In some embodiments, the first conductive path may electrically connect to the first electrical contact of the first lens, the second conductive path may electrically connect to the second electrical contact of the first lens, the third conductive path may electrically connect to the first electrical contact of the second lens, and the fourth conductive path may electrically connect to the second electrical contact of the second lens. In some embodiments, the first and second conductive paths electrically connect to the first electronics module and the third and fourth conductive paths electrically connect to the second electronics module.

That is, it may be the case that in some embodiments, the conductive paths that are provided from the first temple to the lens housing are segregated in both position and function from the conductive paths that are provided from the second temple to the lens housing (however, embodiments are not so limited). For instance, in some embodiments comprising electro-active lenses, the first and second conductive paths may be electrically connected to the first lens and the third and fourth conductive paths may be electrically connected to the second lens. In some embodiments, neither the first nor second conductive path is coupled to the second lens. Similarly, in some embodiments, neither the third nor the fourth conductive path may be electrically coupled to the first lens. In this regard, the first and second electrical paths may be electrically isolated from the third and fourth conductive paths based largely on the fact that there is no overlap in function or coverage. That is, for instance, the first and second conductive paths may be on a first side having a first lens, and the third and fourth conductive paths may be on a second side of the lens housing having the second lens. This, as noted above, in some embodiments, there may be no need to have a conductive path across the bridge. However, embodiments are not so limited, and any or all of the conductive paths may cross the bridge of the electro-active frames.

Figure 13:
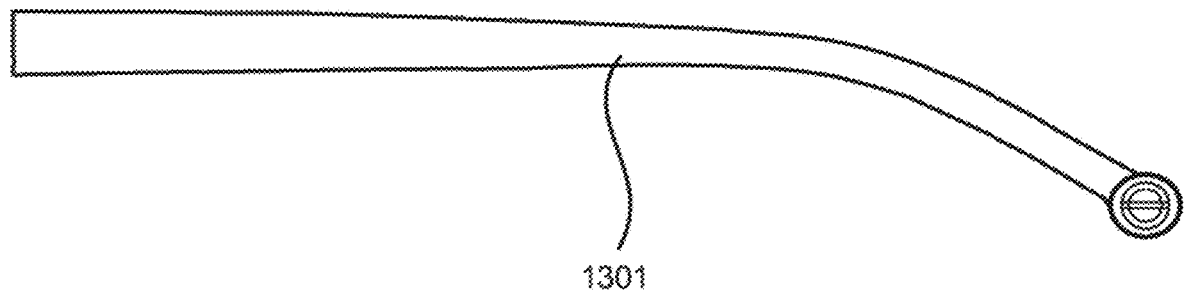
FIG. 13 shows an exemplary temple of an electronic spectacle frame in accordance with some embodiments.

With reference to FIGS. 11-13, exemplary embodiments of the first device comprising a plurality of electrically isolated conductive paths disposed on an electro-active spectacles frame are provided. With reference to FIG. 11, an exemplary embodiment of a device comprising electro-active lenses housed within an electro-active frame is provided. As described above, one or more electronic modules that can activate and deactivate one or both of the electro-active lenses 1106 and 1107 can be positioned within either or both temples of the electro-active spectacle frame.

As shown in FIG. 11, a full rimmed electro-active spectacle frame is provided.
Moreover, as shown, FIG. 11 is an example of an exemplary embodiment in which the lens housing may comprise conductive material. As was described above, embodiments are not so limited.

The exemplary device in FIG. 11 comprises an upper rim portion 1101 (i.e. a first portion of the lens housing) that may comprise a portion of a first conductive path. The upper rim portion 1101 can be made of metal in some embodiments, but is not so limited. The first conductive path can provide a first link (i.e. an electrical connection) between an electronics module and a first electronic contact or terminal (not shown) of one or both electro-active lenses or any other electronics components that may be located on the lens housing.

Continuing with the description of the exemplary embodiment shown in FIG. 11, the exemplary electro-active spectacle frame comprises a lower rim portion 1102 (i.e. a second portion of the lens housing) that may comprise a portion of a second conductive path. The lower rim portion 1102 may also be made of metal, but is not so limited and any conductive material may suffice. The second conductive path may provide a second link (i.e. electrical connection) between the electronics module and a second electronic contact or terminal (not shown) of one or both electro-active lenses or any other electronics components that may be located on the lens housing.

By providing the upper 1101 and lower 1102 rim portions, embodiments may provide separate conductive routes to both electro-active lenses 1106 and 1107. Thus, in some embodiments and as described above, the electro-active lenses (or any other components located on the lens housing) can be controlled/powered by a single electronics module positioned on either the right or left temple portion of the electro-active frame. However, embodiments are not so limited and may provide for multiple electronics modules located on either or both of the temples.

As shown in FIG. 11, the upper 1101 and lower 1102 rim portions, which may comprise a portion of the first and second conductive paths, respectively, may together form a bridge 1103 of the electro-active spectacle frames. The bridge 1103 of the electro-active spectacle frames can be formed without having the upper 1101 and lower 1102 rim portions touching (i.e. in physical or electrical contact), so as to ensure separate conductive paths (i.e. maintain the first and second conductive paths as electrically isolated from one another). In addition, the upper 1101 and lower 1102 rim portions are physically and electrically separated at the ends 1104 and 1105, so as to maintain electrical isolation from the other. The upper 1101 and lower 1102 rim portions may be coupled to a hinge, temple, or other frame component at the ends 1104 and 1105, but at different locations so as to remain electrically isolated from each other. The rim portions may also be electrically connected to the other portions of the first and second conductive paths at the ends 1104 and 1105.

With reference to FIG. 12, an exemplary illustration of an aesthetic component is provided (e.g. a design mask). The design mask comprises an upper snap-on element 1201 and a lower snap-on element 1202. The upper 1201 and lower 1202 snap-on elements can be positioned on top of the upper rim portion 1101 and the lower rim portion 1102, respectively.

The upper 1201 and lower 1202 snap-on elements may comprise a non-conductive material, such as plastic, but are not so limited. The upper 1201 and lower 1202 snap-on elements can be used to alter the style or design of the electro-active spectacles.

With reference to FIG. 13, an exemplary temple 1301 is shown that may comprise a part of an electro-active spectacles frame. One or more electronic components, such as an electronics module, may be coupled to the temple 1301.

Embodiments Comprising A Compliant Conductive Element

Previously, the inventors developed novel electro-active spectacle lenses that may be manufactured as semi-finished lens blanks capable of being surfaced and edged using methods known to those skilled in the art into finished spectacle lenses that, for instance, correct a patient's vision (or provide other beneficial functionality, such as tinting, polarizing, filtering, etc.) and fit within a spectacle frame. The inventors have also developed novel electro-active spectacle frames of various designs capable of operating and/or functioning with electro-active spectacle lenses and/or other electronic components, including, for example, the exemplary embodiments disclosed above.

As described therein with reference to exemplary lens design and manufacture, in some embodiments, the finished lenses may be processed from semi-finished lens blank using methods and equipment that may be known to those skilled in the art. In this regard, a means for making electrical connections between the frames and the lenses that is consistent with some or all of those methods and equipment may also be beneficial. In other instances (or in congruence), it may be beneficial to provide electrical connections between various components disposed on, or within, electro-active frames that may also provide flexibly, adaptability, durability, and/or more reliable electrical contacts.

As detailed below, a means for making such electrical connections (e.g. in a manner that may be consistent with currently used lens processing methods and/or frame designs) is provided. The means for providing the electrical connections between components of an electro-active fame (such as the connections from the lens to the frame), as described herein, may comprise a compliant conductive element. In this manner, embodiments may allow for a robust and forgiving connection consistent with the requirements related to the regular stress experienced by eyeglasses (such as when taken on and off one's face, being dropped, worn when sleeping, struck with objects, bent by small children, etc.). In addition, embodiments comprising a compliant conductive element that provides electrical connections as described herein may be utilized for any and all uses whereby the eyeglass frames houses some, most, or all of the electronics and the lens comprises a component or components that must be activated and or deactivated by an electrical current.

As used herein, a "compliant conductive element" may refer to a physically compliant and compressible material that is electrically conductive. That is, for instance, the material typically has the properties that it is physically malleable (e.g. capable of being deformed, at least along a surface) but is still electrically conductive such that is may comprise a portion of a conductive part. The conductive compliant element may comprise, by way of example only, conductive rubber.

Conductive rubber may include, but is not limited to, an elastic hydrocarbon polymer. A particular not limiting example of material that may comprise a compliant conductive element includes a metal loaded silicone elastomer. The compliant conductive element may be preferably extruded or otherwise molded into a shape that may conform to portions of either (or both) of the lens housing and lens so as to form an electrical connection (e.g. an electrically conductive bridge) between the lens and lens housing. The compliant conductive element may also be used to form electrical connections between other portions of the frame and/or other electrical components.

With some or all of the above in mind, a first device may be provided. The first device may include a lens comprising at least a first electrical contact. That is, for instance, the first lens may comprise an electro-active lens such that the lens may provide a particular functionality, feature, or property when current or voltage is supplied that it may not provide when no current or voltage is supplied (or the functionality may vary based on the amount of current or voltage supplied, etc.). Examples of such lenses were provided above. The electrical contact of the first lens may be utilized to electrically couple the lens (or a portion thereof) to other electronic components (such as, for instance, a controller or power supply) that may provide such voltage or current (e.g., in the form of a control signal or power supply).

The first device may also comprise a lens housing holding the lens. The lens housing may include at least a second electrical contact. That is, for instance, the lens housing (such as was defined above) or a component therein may comprise a part of a conductive path, and the second electrical contact may be used to electrically connect the conductive path to another conductive element (which may also be embedded in the lens housing, coupled the lens housing, or comprise any other part of the first device or component thereto, such as the lens).

The first device may further comprise a compliant conductive element disposed between the first and the second electrical contact that electrically connects the first and second electrical contacts. That is, the compliant conductive element may be disposed such as to provide current between the first electrical contact and the second electrical contact (in this exemplary case, between the lens and the lens housing). In this manner, embodiments may supply current (e.g. power or a control signal) from a component coupled to another portion of the first device (e.g. on a first temple of an electro-active frame) to the lens via the lens housing.

As noted above, the use of a compliant conductive element may, in some embodiments, provide some advantages over previously used conductors and other means of connecting components in an electro-active frame, particularly when forming connections to an electro-active lens. For instance, the use of a compliant conductive element (as described above) may form better electrical connections to the surface of an electrical contact (particularly shaped surfaces, such as beveled edges) because the compliant conductive element may conform substantially to some or all of those surfaces. In this manner, the interface between the electrical contacts (i.e. the area of the connection) may be larger, providing increased electrical conductivity between the two.

In addition, the use of a compliant conductive element may, in some embodiments, provide for a more robust electrical connection that may withstand external forces more effectively than previously used conductors. That is, in part because the electrical connections between a compliant conductive element and the electrical contacts may comprise a larger area, if a force applied to the device or a portion thereof causes a part of the electrical connection between the compliant conductive element and one of the electrical contacts to be separated (i.e. no longer directly electrically connected), there may still be sufficient contacts in other portions of the interface that may permit sufficient current to transfer between the components so as to result in little or no disruption in functionality of the device.

In addition, a compliant conductive element may, in some embodiments, conform and/or adapt to changes in the disposition of a first electrical contact in relation to a second electrical contact that it is disposed between (e.g. in the exemplary device described above, a compliant conductive element may adapt to changes in the disposition of the lens housing relative to the lens). For instance, if the separation between the lens and the lens housing increases at a location where an electrical contact is formed between the two components using a compliant conductive element, then in some embodiments, the compliant conductive element may expand in that location so as to maintain the electrical contact. Similarly, in some embodiments, if there is an increase in the force applied between the lens housing and the lens (for instance, an external force is applied to the lens housing causing it to be misshaped or displaced in the direction of the lens), the compliant conductive element may compress in the location between the components where the force is applied (this may include a temporary displacement, such as when the conductive compliant component absorbs some or all of the force applied by compressing and then expanding). By so doing, the compliant conductive element may, in some embodiments, absorb stress applied to the first device, and maintain the electrical connection between components.

Moreover, by absorbing some or all of the forces applied thereto, a compliant conductive element may, in some embodiments, prevent or limit damage to either of the components that comprise the first and second electrical contacts. For instance, if a force were applied to a typical device above that which causes the lens and the lens housing to directly contact, the lens may become chipped at the interface, which could threaten the integrity of the lens, the ability of the lens housing to hold the lens, and/or affect the electrical contacts between the two components. The use of conductive compliant material disposed between portions of these components may reduce or prevent this direct contact, and may serve to absorb such forces and limit damage.

The use of a compliant conductive element in a first device may, in some embodiments, provide advantages during the manufacture process as well. For instance, as noted above, many lenses are shaped and edged prior to being coupled to a lens housing of an electro-active frame. This may result in slight differences between each lens that is then coupled or housed within a lens housing. In embodiments where an electrical contact is formed between these components, the use of a compliant conductive element that may adapt or conform to features provided on either of the surfaces of the electrical contacts, as well as the relative disposition between the two components, may reduce manufacturing costs and defects, and provide for more reliable and suitable devices.

It should be noted that these advantages are provided as examples of the advantages that some embodiments may provide, and therefore embodiments disclosed herein need not have some or all of the advantages described above.

In some embodiments, in the first device as described above that includes a lens having a first contact, a lens housing having a second contact, and a compliant conductive element disposed between, and electrically connecting, the first and second contacts, the compliant conductive element comprises conductive rubber. That is, conductive rubber is an example of a material that may comprise the compliant conductive element. Conductive rubber may have some of the characteristics, such as physical malleability while also having sufficient conductivity, to provide some or all of the advantages noted above in some embodiments.

Figure 24:
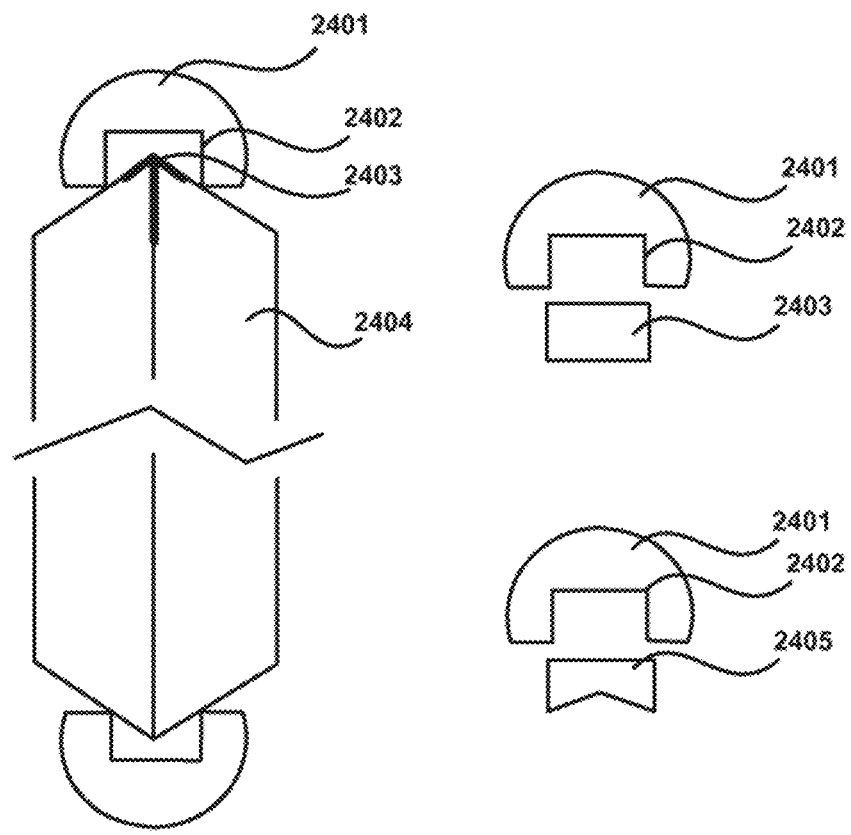
FIG. 24 shows an exemplary embodiment of a device in accordance with some embodiments.
Figure 25:
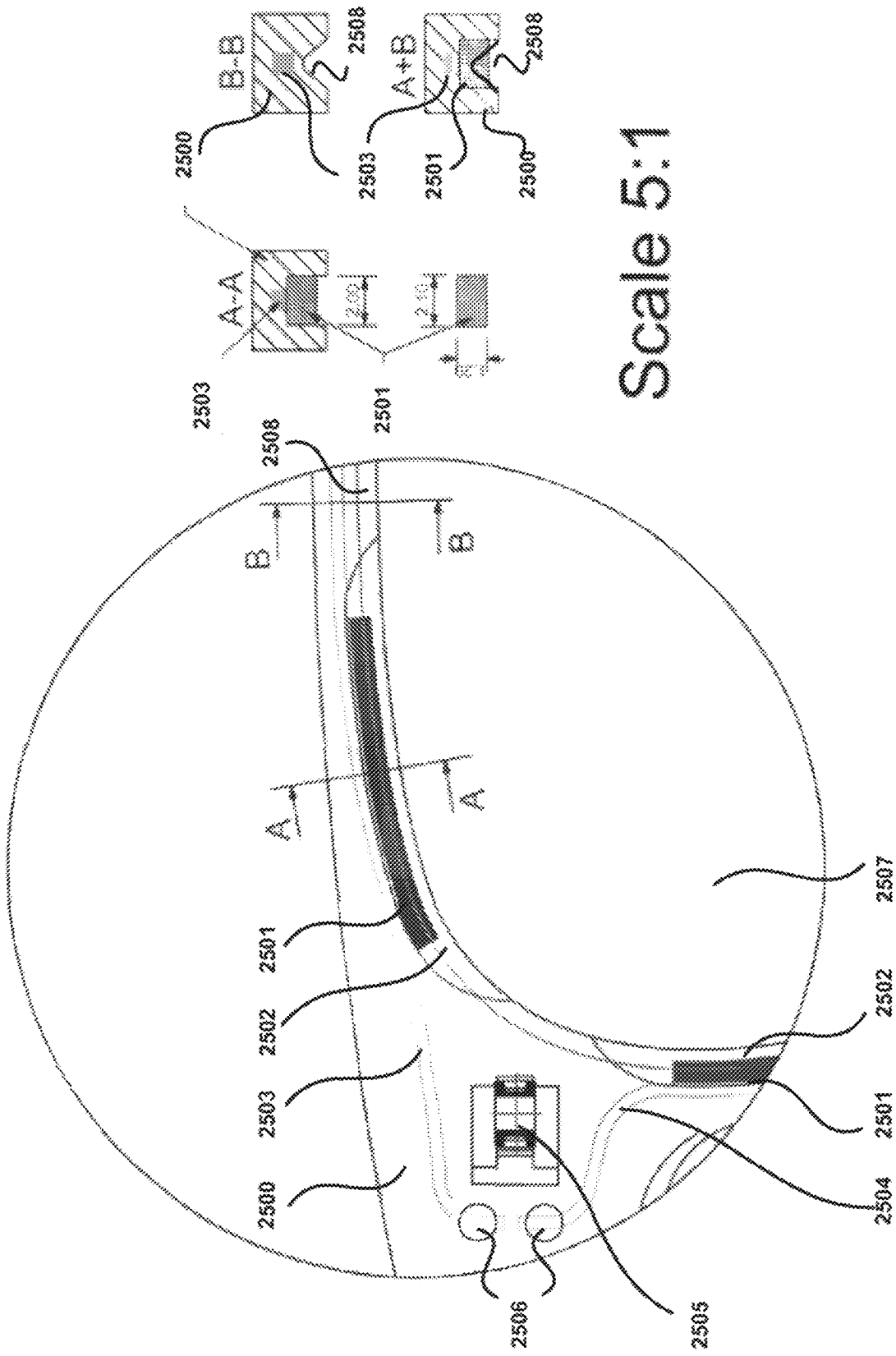
FIG. 25 shows an exemplary embodiment of a device in accordance with some embodiments.

In some embodiments, in the first device as described above that includes a lens having a first contact, a lens housing having a second contact, and a compliant conductive element disposed between, and electrically connecting, the first and second contacts, the compliant conductive element may be disposed substantially between the lens housing and the lens. That is, as noted above, in some embodiments, the compliant conductive element may be disposed between some or all of the portions of the lens and lens housing. In some embodiments, where the compliant conductive element is disposed between substantially all of the portions of the lens and lens housing, embodiments may comprise the compliant conductive element being disposed over the entire outer surface of the lens that is directly opposite to a surface of the lens housing (or only the portions of the outer surface of the lens that have a lens housing surface directly opposing the lens outer surface). In some embodiments, the compliant conductive element may be disposed between portions of the lens and lens housing where an electrical connection is not made (e.g. portions of the lens and lens housing not comprising an electrical contact). This may provide some of the benefits detailed above, including reducing damage caused by physical contact between the relatively rigid surfaces of the lens and lens housing, even in areas where no electrical connection is made. In some embodiments, the compliant conductive element is only disposed between portions of the lens and lens housing that comprises electrical contacts. The reduction in the amount of the compliant conductive element may thereby reduce manufacturing costs. An exemplary embodiment is shown in FIG. 25. In addition, in such embodiments, the lens housing may be manufactured so as to comprise different portions corresponding to sections that have the compliant conductive element disposed there between, and those that do not. In so doing, the first device may utilize a more efficient lens housing design to accommodate whether there is or is not compliant conductive material disposed between sections of the lens housing and the lens. Exemplary embodiments are disclosed in FIGS. 21-25.

Figures 20A, 20B, 20C:
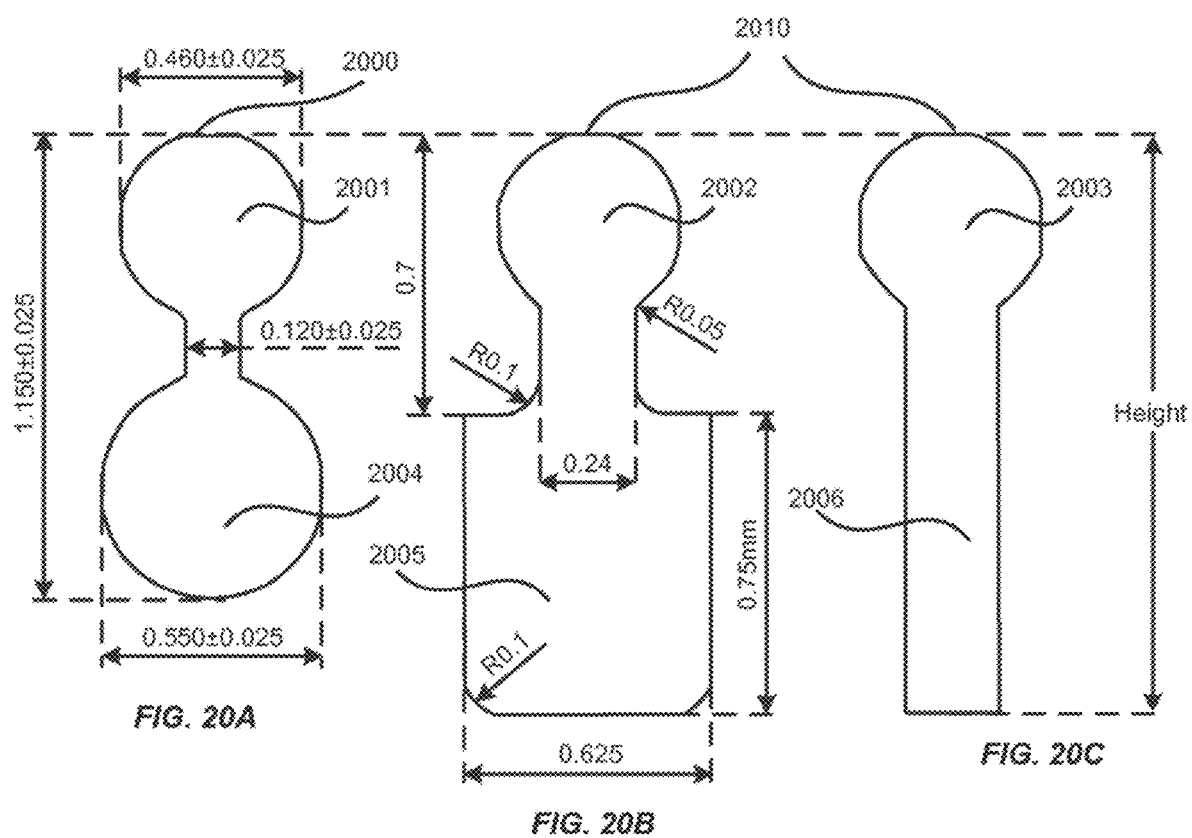
FIGS. 20A, 20B, and 20C show exemplary embodiments of components of a device in accordance with some embodiments.

In some embodiments, in the first device as described above, the compliant conductive element has a shape that comprises any one of, or some combination of: a triangle, a square, a "FIG. 8," an oval, a circle, or a rectangle. As used herein, the "shape" of the compliant conductive element may refer to the cross section of the compliant conductive element taken on a plane perpendicular to the longest dimension of the compliant conductive element. For example, in some embodiments where the compliant conductive element is extruded, the shape generally corresponds to the aperture through which the compliant conductive element was extruded. Examples of shapes of the compliant conductive element are shown in FIGS. 20A-C.

In some embodiments, it may be preferred that the shape of the compliant conductive element comprises a "FIG. 8" because, for instance, the compliant conductive element may provide structural support and assist in coupling the lens and the lens housing. A "FIG. 8" may refer to a compliant conductive element that has a shape that comprises two end pieces and a center piece disposed between the two end pieces. The two end pieces are thicker than the centerpiece. The two end pieces need not have the same thickness or the same length.

In some embodiments, it may be preferred that the compliant conductive element comprise a square or rectangle shape as opposed to a triangle shape (particularly when the lens has a beveled edge), because the square or rectangle shape may provide a greater area of electrical connectivity by conforming to more of the surface of the lens. This is due, in some embodiments, to the "triangle" shape resulting in the edge of the lens compressing the compliant conductive material against an opposing surface of the lens housing without permitting the compliant conductive element to cover the lower portions of the lens surface.

It should be noted that, in some embodiments, the shape of the compliant conductive element may not conform precisely to a corresponding shape (e.g. rectangle, square, etc.) at the surface of the compliant conductive element. That is, at the surface of at least a portion of the conductive compliant element, the shape of the compliant conductive element may be slightly altered as it conforms to an opposite surface of the lens or lens housing that it is physically contacted with. Thus, the "shape" of the compliant conductive element may refer to either the shape of the compliant conductive element when disposed between the first and the second electrical contacts, or the uncompressed shape of the compliant conductive element (i.e. the shape of the compliant conductive element either before it is between the first and second electrical contacts, or before it have a force applied to its surface). In addition, it should be understood that in some embodiments, the compliant conductive element may not comprise any shape, or it may comprise other shapes than those expressly mentioned, including irregular shapes and shapes that vary along the length of the compliant conductive element (i.e. the compliant conductive element may not have a single shape, but the shape may depend on the location of that particular portion of compliant conductive element.

In some embodiments, in the first device as described above, the compliant conductive element includes a first end having a first thickness, a second end having a second thickness, and a center portion having a third thickness that is disposed between, and coupled to, the first end and the second end. The first thickness of the first end and the second thickness of the second end are each greater than the third thickness of the center portion. An exemplary embodiment of this shape is shown in FIG. 20A. That is, embodiments so described may refer to the conductive element having a shape that corresponds to a "FIG. 8," which may have some or all of the advantages noted above.

In some embodiments, in the first device as described above, the compliant conductive element may comprise an extrusion. As used herein, an "extrusion" may refer to an object made by squeezing, or otherwise disposing, material through an aperture that shapes the material. It may be generally beneficial, in some embodiments, to use an extrusion for some or all of the compliant conductive element because, for instance, the use of an extrusion may be an efficient manner of disposing the compliant conductive element between the lens and the lens housing (or between any other two components). The space between the lens and the lens housing may be relatively small (on the order of a millimeter), and therefore an extrusion that may be injected into the cavity (particularly when the material may conform to the shape of the cavity) may be less complex than shaping a conductor into the correct size and shape and inserting it into the cavity. Moreover, it may be less complex to apply the compliant conductive element to portions of the lens housing that may be difficult to access based, for instance, on the design features of the first device. In addition, embodiments that utilize an extrusions may provide the advantage that compliant conductive element may be disposed between a plurality of different designs of lenses and lens housing, without having to design a specific a component or components for each combination.

In some embodiments, in the first device as described above, the lens comprises a first surface and the lens housing comprises a first surface. The compliant conductive element substantially conforms to at least a portion of the first surface of the lens and at least a portion of the first surface of the lens housing. As was described above, the compliant conductive element may have physical properties that permit it to adapt and conform to the interfaces of the components it is disposed between based on a force applied to its surface. Thus, in some embodiments, when the conductive compliant element is disposed in the lens housing or cavity thereto (or on a surface of the lens), and when the lens and lens housing are then coupled, a force may be applied to the compliant conductive element disposed between the opposing surfaces of the lens and the lens housing such that the conformation may occur. Embodiments may thereby provide some of the benefits that were described above, including the ability to provide better electrical contacts between electrical contacts, and maintaining those contacts despite changes in the relative positions of the surfaces.

In some embodiments, the first device as described further comprises a first temple coupled to the lens housing and an electronics module coupled to the first temple. The compliant conductive element is electrically connected to the electronics module. As defined above, electrically coupled does not require that the two components be in direct physical contact. Thus, embodiments may provide that the first device comprises a conductive path from the electronics module to the compliant conductive material. The conductive path could include, for example, a conductor coupled to the electronics module, a portion of the temple itself (or a conductor embedded therein), a portion of the lens housing itself (or a conductor embedded
therein), and the second electrical contact. As described above, it may be beneficial both structurally and aesthetically to locate electronic components in the temple of an electro-active frame because, for instance, the additional space provided (as compared to the lens and lens housing) as well as the ability to hide or mask those electronic components relatively out of sight of an observer (or at least not as pronounced a location as the lens housing or frame).

In some embodiments, in the first device as described above that comprises a first temple coupled to the lens housing and an electronics module coupled to the first temple, the first device further includes a conductor that is substantially embedded within the temple and/or the lens housing. The conductor may electrically connect the electronic module to the compliant conductive element. The conductor may comprise any suitable material, including metal.

Although the conductor in some embodiments may be embedded substantially within the lens housing and/or the first temple, the conductor may have portions exposed so as to make electrical contacts with other components. As was described above, a conductive path may comprise a number of electrically connected components, and therefore using a conductor embedded in either the temple and/or the housing may be a means for efficiently establishing a conductive path from the electronics module to the compliant conductive element. The compliant conductive element may then be electrically coupled to another electronic component (such as an electro-active lens). In this manner, embodiments may provide a conductive path to conduct current (e.g. control signals and/or power) from the temple to the compliant conductive material (and then, for instance, to the electro-active lens). As noted above, in some embodiments, a first portion of the conductor may be exposed and electrically connects the electronic module to the compliant conductive element. That is, as used herein, the first portion of the conductor may be "exposed" if it is not surrounded by a the lens housing along at least a portion of the conductor such that an electrical connection may be made to the compliant conductive element.

In some embodiments, in the first device as described above that comprises a first temple coupled to the lens housing, an electronics module coupled to the first temple, and a conductor that is substantially embedded within the temple and/or the lens housing, the lens housing comprises acetate. As noted above, acetate is a common material used in the manufacture of eyeglass frames, and is generally non-conductive. Thus, in some embodiments, so as to provide a conductive path from the electronics module coupled to the first temple, a conductor may be embedded in the lens housing comprising a non-conductive material. It may be generally preferred that a conductor is embedded within a frame element such that the frame element (or a portion thereof) may isolate a conductive path (or a portion thereof) from external forces, such as potential shorts and/or excess voltages. In contrast, in some embodiments where the lens housing comprises a conductive material, the lens housing itself (or a portion thereof) may comprise a portion of a conductive path that electrically connects the electronic module to the compliant conductive element.

In some embodiments, the first device as described above comprises semi-rimless, rimless, or fully rimmed spectacle frames. Exemplary embodiments of some of these spectacle frames are described below with reference to the figures.

In some embodiments, in the first device as described above that includes a lens having a first contact, a lens housing having a second contact, and a compliant conductive element disposed between, and electrically connecting, the first and second contacts, the lens includes a first groove, the lens housing includes a first cavity, and the compliant conductive element comprises a first and a second portion. The first portion of the compliant conductive element may be disposed substantially within the first groove of the lens. This is shown, for example in FIGS. 19 and 23-24. As used herein, "disposed within" may refer to a portion of the compliant conductive element being located such that the cavity of the lens housing or the groove of the lens surrounds approximately three sides of the portion of the compliant conductive element. The second portion of the compliant conductive element may be disposed substantially within the first cavity of the lens housing. In this manner, the compliant conductive element may support the coupling of the lens and the lens housing, while at the same time completing electrical connections with electrical contacts on the surface of each of the lens and the lens housing.

In some embodiments, in the first device as described above, the first portion and the second portion of the compliant conductive element are connected by a bridge. A "bridge" in this context refers to the material that is located between the first and second portions of the compliant conductive material. With reference to FIG. 20 for example, first portions 2002 and 2003 are connected, respectively, to second portions 2005 and 2006 by a "bridge." The bridge in these exemplary embodiments happens to comprise the same material as the first and second portions. However, the bridge may comprise any shape and any suitable material.

In some embodiments, in the first device as described above where the first portion of the compliant conductive element is disposed substantially within the first groove of the lens, and the second portion of the compliant conductive element is disposed substantially within the first cavity of the lens housing, the first portion of the compliant conductive element has a first shape that comprises any one of: a triangle, a square, a circle, and a rectangle. In some embodiments, the second portion of the compliant conductive element has a second shape that comprises any one of: a triangle, a square, a circle, and a rectangle. In general, it is preferred to choose the shape and dimensions of the portions of the compliant conductive element so as to maximize the electrical contacts that the material can make on the surfaces of the lens and/or the lens housing. In this regard, it may be beneficial to choose shapes that maximize the surface area interface when the conductive compliant element is compressed (usually a shape that corresponds to the shape of either the lens housing cavity or the lens groove. However, embodiments are not so limited. Examples of shapes are provided in FIGS. 20A-C. In some embodiments, the lens has a first surface that is located within the first groove and at least a part of the first portion of the compliant conductive element substantially conforms to the first surface of the first groove. The "first surface" may comprise as at least a portion of the outermost surface of the groove of the lens. Again, this is typically the surface forms part of the conductive path with the compliant conductive material. In this regard, In some embodiments, the first surface of the lens is coated with a conductive paint so as to not only contacts the compliant conductive material, but may also provide of an easier and better connection to the components of the electro-active lens.

In some embodiments, in the first device as described above where the first portion of the compliant conductive element is disposed substantially within the first groove of the lens, and the second portion of the compliant conductive element is disposed substantially within the first cavity of the lens housing, the first groove of the lens has width approximately within the range of 0.4 mm and 1.0 mm and a depth approximately within the range of 0.4 mm and 1.0 mm. In some embodiments, the groove of the first lens has width of approximately 0.7 mm and a depth of approximately 0.6 mm. As described below, the specific dimensions of the components may depend on the functionality of the lens and lens housing. However, generally it is desirable to have the relative dimensions between the width and of the height cavity, the groove, and of the compliant conductive element to be relatively similar. This may permit the compliant conductive element to see both a structural role (in coupling the lens and the lens housing, as well as serving as a protective layer of sorts between at least a portion of the lens and the lens component. The dimensions of these components is discussed with reference to FIGS. 20 and 23

In some embodiments, in the first device as described above where the first portion of the compliant conductive element is disposed substantially within the first groove of the lens, and the second portion of the compliant conductive element is disposed substantially within the first cavity of the lens housing, the lens housing has a first surface that is located within the first cavity. The "first surface" may comprise at least a portion of the outermost surface of the cavity of the lens housing. A part of the second portion of the compliant conductive element may substantially conform to the first surface of the first cavity. Similar to the connections that the compliant conductive material forms with the surface of the lens, the compliant conductive element also forms contacts with portions of the lens housing. However, in some (but certainly not all) embodiments the contacts formed with the lens housing are to embedded conductors that have portions exposed and therefore, while beneficial, it may not be as necessary for the compliant conductive material to conform to as much of the surface of the lens housing as it is to conform with the surface of the lens.

In some embodiments, in the first device as described above where the first portion of the compliant conductive element is disposed substantially within the first groove of the lens, and the second portion of the compliant conductive element is disposed substantially within the first cavity of the lens housing, the compliant conductive element has an uncompressed height of at least the distance between the first surface of the first groove of the lens and the first surface of the first cavity of the lens housing. The "uncompressed height" of the compliant conductive element is the height of the compliant conductive element when the material is not subject to an external stress. The "height" of the compliant conductive element may refer to the dimension of the element that is substantially perpendicular to the lens housing and the lens. An example illustrating the uncompressed height is shown in FIG. 23D. In some embodiments, the uncompressed height of the compliant conductive element is at least 0.75 mm. In some embodiments, the uncompressed height of the compliant conductive element is at least 1.45 mm. However, as noted above, the dimensions of the element may vary based on the other dimensions of the device. Generally, the greater the uncompressed height, the more surface covered (and more electrical connections that can be made) by the compliant conductive element when it is disposed between the lens and the lens housing. In this regard, in some embodiments, the first surface of the lens housing and the first surface of the lens compress at least a portion of the compliant conductive element when the lens housing and the lens are coupled. In this manner, the compliant conductive element can form electrical connections, while also providing ancillary benefits to the device, such as protecting the rigid components from damage from directly contacting one another.

In some embodiments, in the first device as described above, the lens comprises a first surface, the lens housing comprises a first cavity, and the compliant conductive element comprises a first surface. The compliant conductive element is disposed substantially within the first cavity of the lens housing, and the first surface of the compliant conductive element substantially conforms to the first surface of the lens. In some embodiments, the first surface of the lens comprises a first and second beveled edge. A "beveled edge" may refer to an inclination that is cut into a lens that forms an angle, including an angle equal to 90 degrees. The lens usually comprises a beveled edge (rather than a groove) in embodiments comprising full rimed frames (rather than semi-rimless frames), where the lens may be coupled to the lens housing based on the portion of the lens being disposed inside a cavity of the lens housing. In some embodiments, the first cavity has a first width and the compliant conductive element has an uncompressed width that is greater than the first width of the cavity. The "uncompressed width" may refer to the width of the compliant conductive element when the rubber is not subject to external stress. This is illustrated in FIG. 23E and described below.

In some embodiments, in the first device as described above, where the compliant conductive element is disposed substantially within a first cavity of the lens housing, and where a first surface of the compliant conductive element substantially conforms to a first surface of the lens, the cavity of the lens housing has a top surface. A portion of the lens extends into the first cavity of the lens housing. The compliant conductive element has an uncompressed height that is approximately equal to or greater than a distance from the top surface of the cavity of the lens housing to the portion of the lens that extends into the first cavity. This concept is illustrated in FIG. 23D. Generally, the compliant conductive element preferably has a height such that when the lens is disposed in the cavity of the lens housing, a portion of the lens contacts, and thereby compresses the compliant conductive element. As noted above, it is generally beneficial to have a height that is substantially greater than this minimum distance to provide more robust electrical connections. The "top surface" may refer to the surface of the lens housing that is opposite the lens.

In some embodiments, in the first device as described above, the compliant conductive element comprises metal loaded silicon elastomers. In some embodiments, the metal comprises silver and aluminum (AG—Al). However, any material that has the physical properties described above with reference to the compliant conductive material may be used.

In some embodiments, in the first device as described above, the compliant conductive element has a volume resistivity that is less than 10 Ω-cm. In some embodiments, in the first device as described above, the compliant conductive element has a volume resistivity that less than 1 Ω-cm. The "volume resistivity" may refer to the electrical resistivity, resistivity, or specific electrical resistance. Generally, it is preferable to have a low volume resistivity for a conductor because there will be less losses associated with the resistance. This may be particularly important in some embodiments, as the compliant conductive element may be compressed, which may thereby increase the density, and concurrently increase the resistivity of the element. Thus, it may be important in some embodiments to choose a material that has a low resistivity, even when uncompressed such that its volume is decreased.

In some embodiments, in the first device as described above, the compliant conductive element has a hardness on the shore durometer A scale that is greater than 50. In some embodiments, the compliant conductive element has a hardness on the shore durometer A scale that is greater than 65. The hardness of the element refers to its ability to conform to surfaces under pressure, as well as a materials general malleability. As noted above, in some embodiments, to form optimal connections, the compliant conductive element conforms to the shape of the lens and/or lens housing surfaces. In some embodiments, the compliant conductive element has a hardness on the shore durometer A scale that approximate equal to 70 and a volume resistivity of approximately 0.0008 Ω-cm.

Although described above with relation to a lens and a lens housing, embodiments are not so limited and may provide for the use of compliant conductive element between any two electrical contacts that may be disposed on any component or components of a first device (e.g. an electro-active frame).

It should be understood that, after reading the disclosure provided herein, a person of ordinary skill in the art may understand that various combination of the devices described above may be made such that some or all of the features described with regards to one device may be combined with some or all of the features of another device.

Description of Figures Related to a Compliant Conductive Element and Exemplary Embodiments Provided below is a more detailed description of some of the figures included herein that may relate to a compliant conductive element, as well as descriptions of the exemplary embodiments disclosed. As noted, these exemplary devices are for illustration purposes and are not intended to be limiting.

Figure 14:
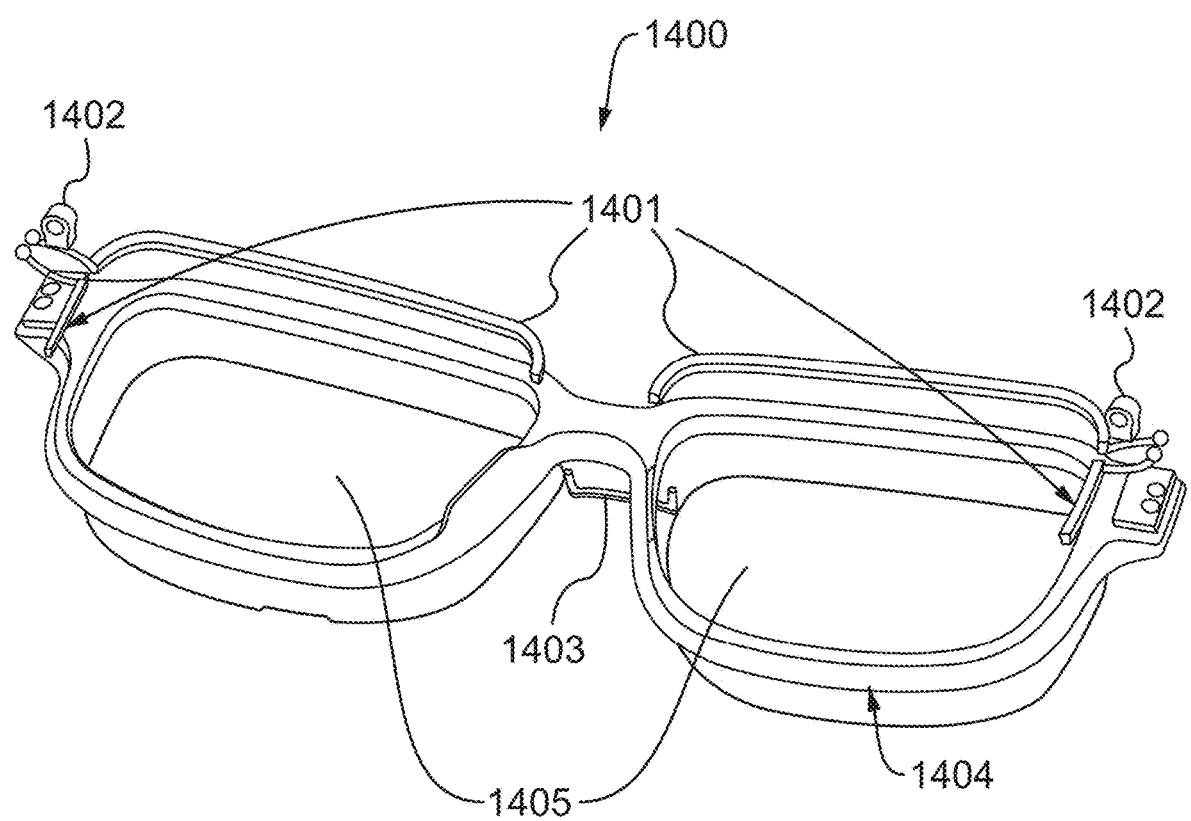
FIG. 14 shows an exemplary embodiment of a device in accordance with some embodiments.

With reference, to FIG. 14, an exemplary electro-active frame 1400 for use with electro-active lenses and/or other electronic components is shown. The exemplary electro-active frame 1400 can comprise lens housing 1404 (such as eye-wire) comprising any material such as, but not limited to, a plastic (e.g., acetate). In some embodiments, the electro-active frame 1400 can be made by a mold or other techniques, such as injection molding. Additionally, some embodiments may provide that the electro-active frame 1400 can be made from one or more separately formed or fabricated pieces that are brought together (i.e. coupled) to form a complete electro-active frame.

The compliant conductive element 1401 (such as, for example, a conductive rubber) may, in some embodiments, be used to conduct an electronic signal from one side of the electro-active frame 1400 or lens housing 1404 (or one component thereon) to another side of the electro-active frame 1400 or lens housing 1404 (or another component thereon, including a lens 1405). In some embodiments, the compliant conductive element 1401 may be encapsulated by (e.g. substantially surrounded by or embedded within) an insulator (such as the lens housing 1404 that comprises a plastic material). In some embodiments, the compliant conductive element 1401 may be positioned (e.g. disposed) inside the electro-active frame 1400 (or the lens housing 1404) as the electro-active frame 1400 is being fabricated (such as, for instance, during a molding process or an injection molding process). In some embodiments, the compliant conductive element 1401 may also be positioned inside cavities of the lens housing 1404 after the lens housing 1404 has been fabricated. This will be described in more detail below with reference to FIGS. 18-25. In some embodiments, the compliant conductive element 1401 may be positioned between two frame halves (or between a plurality of portions of the electro-active lens frame) that are subsequently brought together and sealed.

In some embodiments, the compliant conductive element 1401 may be positioned in or near the nose bridge 1403 to provide connectivity from a first side of the electro-active frame 1400 (and/or lens housing 1404) to a second side of the electro-active frame 1400 (and/or lens housing 1404). The use of such material in the bridge 1403 may permit the nose bridge in such embodiments to be relatively small, which could provide a more aesthetically pleasing frame appearance. These embodiments may also be combined, for instance, with a single electronics module located on one of the temples that provides electronic signals and/or current to both a first lens and a second lens 1405 (that is, the conductive compliant material 1401 may provide a conductive path from a first part of the lens housing 1404 comprising a first lens 1405 to a second part of the lens housing 1404 comprising a second lens 1405). In some embodiments, the compliant conductive element 1401 may be positioned on the back side of the electro-active frame 1400 (and/or lens housing 1404) (e.g. on the side facing the wearer's head) or buried within (e.g., embedded within) the electro-active frame 1400 (and/or lens housing 1404).

Continuing with reference to FIG. 14, at the hinges 1402 of the electro-active frame 1400, the compliant conductive element 1401 may form one or more electrical contacts with a temple (and/or components disposed thereon) of the electro-active frame 1400. That is, the compliant conductive material 1401 may form a portion of a conductive path by providing electrical connections at or near the hinge 1402 with conductors disposed on (or coupled to) the temple of the electro-active frame 1400. In some embodiments, the hinge 1402 itself may comprise a conductive material and may electrically connect to the compliant conductive element 1401 and a conductor coupled to the temple. In some embodiments, the hinge 1402 may comprise the same material as the compliant conductive element 1401.

Figure 15:
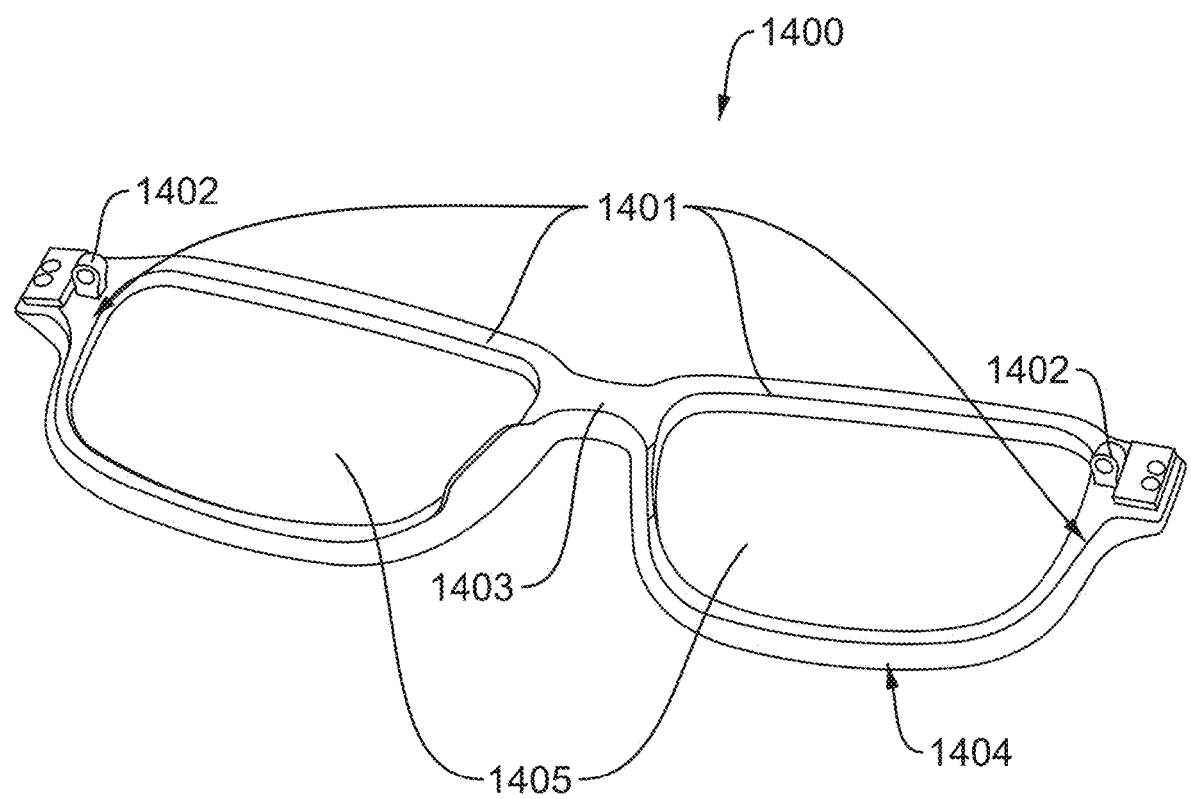
FIG. 15 shows an exemplary embodiment of a device in accordance with some embodiments.

With reference to FIG. 15, an assembled exemplary electro-active frame 1400 comprising compliant conductive element 1401 disposed within the lens housing 1404 is shown. When positioned (e.g. disposed) within the electro-active frame 1400 (and as shown, in lens housing 1404), the compliant conductive element 1401 need not be visible (e.g., at least a portion of the compliant conductive element 1401 may be disposed or positioned in the lens housing 1404 (e.g. the eye wire) of a fully rimmed or semi-rimless frame). Indeed, it may be preferred in some embodiments that the compliant conductive element 1401 is not visible for aesthetic reasons. In addition, embodiments comprising the compliant conductive element 1401 partially or completely embedded within one or more of the frame components may both provide electrical connections and also result in better protection for the conductive path created thereby from exterior forces and stresses, (for instance, the components may be less susceptible to short circuits and/or external electrical voltages and currents).

FIGS. 14 and 15 disclose an exemplary embodiment whereby the compliant conductive element 1401 comprises four separate conductive paths (i.e. two on the left side of the lens housing 1404 and two on the right side of the lens housing 1404). This may provide two separate conductive paths (and two electrical contacts) to each of the lenses 1405. In this manner, embodiments may make available the necessary electrical connections to provide power and or control signals to electro-active lenses 1405 or other components disposed on the lens housing 1404. In addition, in embodiments where the compliant conductive element 1401 (or other conductor) is also located in the bridge 1403, the lens housing 1404 may comprise two conductive paths—a first that electrically connects to a first electrical contact on each of the lenses 1405, and a second conductive path that is electrically isolated from the first conductive path and that electrically connects to a second electrical contact of each of the lenses 1405. Similar embodiments were discussed with reference to Single Electronics Module embodiments disclosed above.

Figure 16:
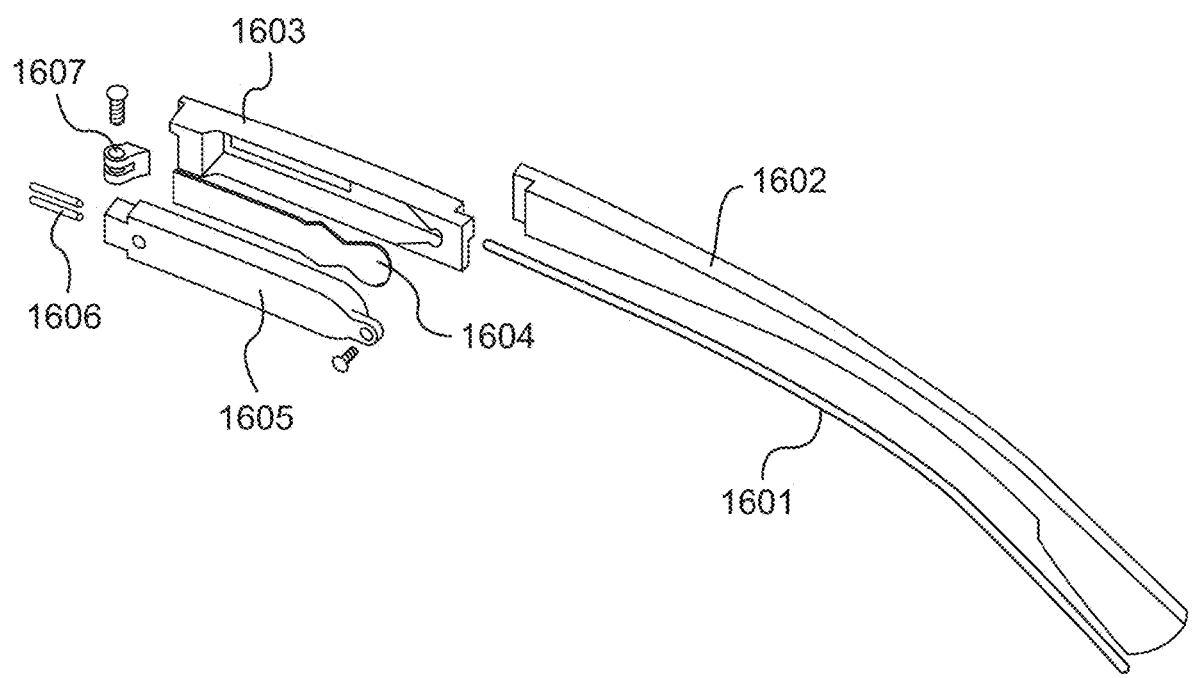
FIG. 16 shows an exploded view of components that may comprise an exemplary embodiment of a device in accordance with some embodiments.
Figure 17:
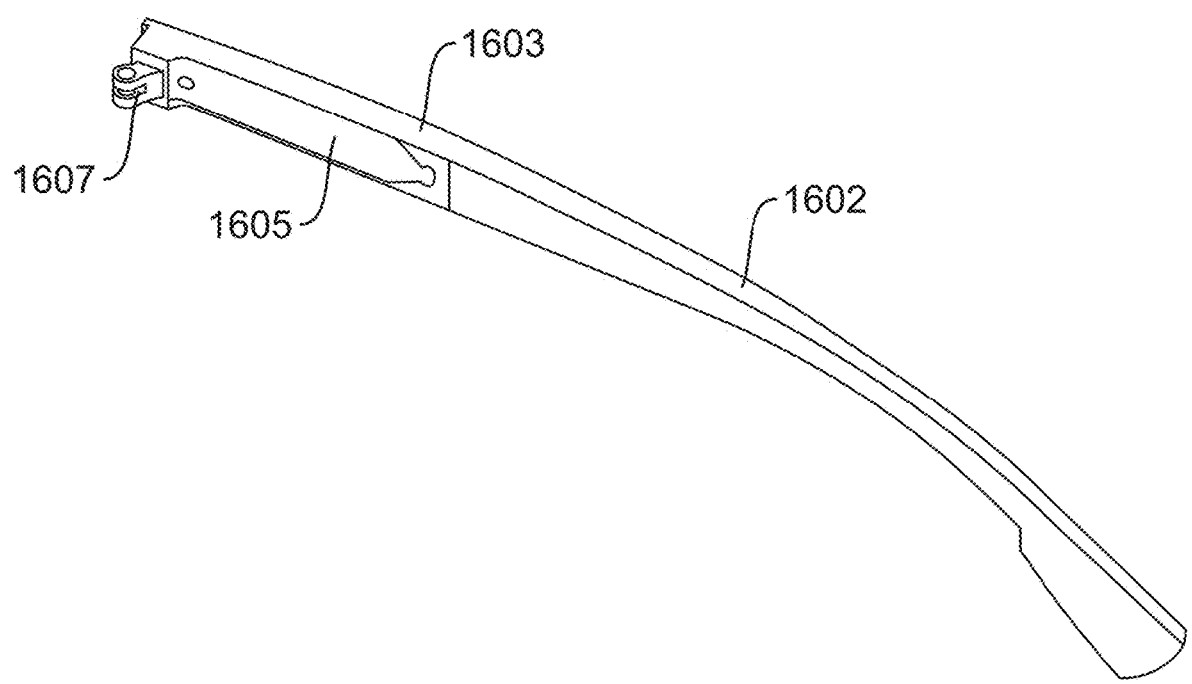
FIG. 17 shows an exemplary embodiment of a device in accordance with some embodiments.

FIGS. 16 and 17 illustrate the assembly of a portion of an electro-active frame. In some embodiments, the frame may comprise core 1601 that may comprise, for example, a steel wire. The exemplary components as shown are similar to those discussed with reference to FIGS. 3-10. Specifically, the components as shown for the exemplary electro-active frame include: A core element 1601, which may in some embodiments comprise a conductive material and may be coupled to or disposed within the temple 1602 so as to provide a portion of a conductive path from one component to another. As shown, the core element 1601 may, for instance, provide a conductive path from the temple end (which may comprise, e.g., a power source) to the electronics module 1605. A housing module 1603 is shown, which may house the electronics module 1605 and be coupled to the temple 1602. In some embodiments, the housing module 1603 may comprise a portion of the temple 1602. A switch 1604 (such as a capacitance or "cap" switch) is shown, which may be coupled to the electronics module 1605 and/or the housing module 1603 to provide a switch or control for the electronics module 1605. For instance, and as shown in FIG. 16, the housing module 1603 may have an opening that may allow a wearer to interact with switch 1604 so as to turn a function on or off, or to otherwise vary the functions provided by an electro-active spectacle. The electronics module 1605, the switch 1604, and the housing module 1603 may be coupled using any suitable manner, including one or more screws (as shown in FIG. 16) and/or two sided adhesive tape. One or more conductors 1606 may also be included to provide one or more electrical contacts (e.g. conductive paths) from the electronics module 1605 to the lens housing. The conductors 1606 could, for instance, electrically connect to the one or more conductive paths provided by compliant conductive element 1401 shown in FIGS. 14 and 15. A hinge 1607 is also shown, which may be coupled to the temple 1602 or a component thereof (such as the housing module 1603) and also to the lens housing. The hinge 1607 may provide the capability for each of these components to move relative to the other while remaining coupled. In some embodiments, the hinge 1607 may comprise one or more conductors, or may itself comprise conductive material so as to form a conductive path or portion thereof.

FIG. 17 illustrates the components shown in FIG. 16 coupled together in an exemplary embodiment. As can be seen, the core element 1601 is no longer visible as it is embedded within the temple 1602. Similarly, the electronics module 1605 is housed within the housing module 1603 and covered (and likely coupled to) on one side by the switch 1604. The hinge 1607 is coupled to the housing module 1603. The conductors 1606 may be embedded substantially within portions of the hinge 1607 and/or housing module 1603 so as to form a portion of a conductive path between the electronics module 1604 and the lens housing.

With reference to FIGS. 18 and 19, exemplary embodiments of semi-rimless spectacle frame designs will be described. It should be noted that although many of these concepts will be described therefore in the context of semi-rimless frames, many of the features and principles may also be used with (or applicable to) other frames, such as full rimmed and rimless.
Moreover, these embodiments are for illustration purposes, and are thereby not intended to be limiting.

Figure 18A:
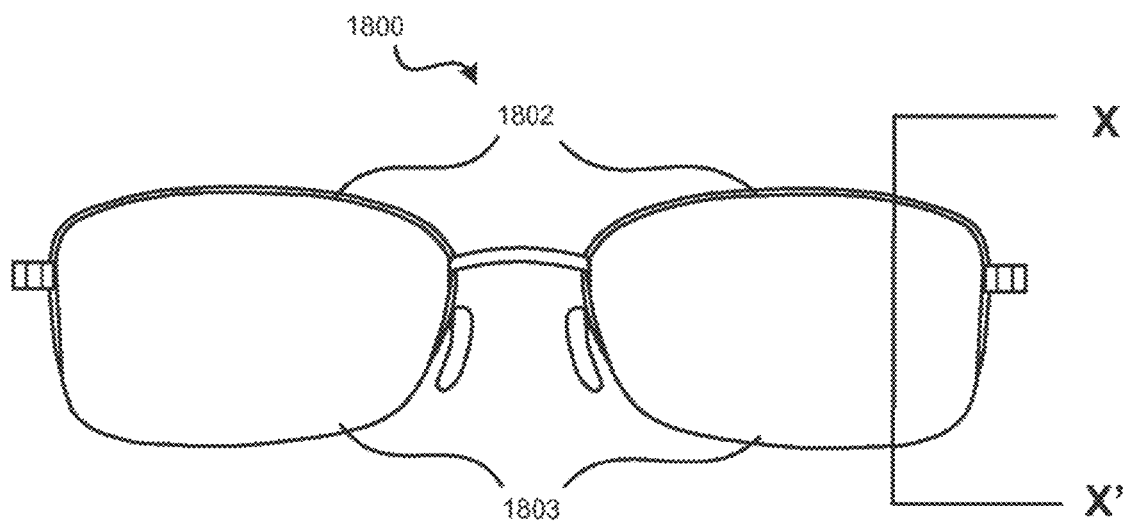
FIGS. 18A and 18B show an exemplary embodiment of a device in accordance with some embodiments.
Figure 18B:
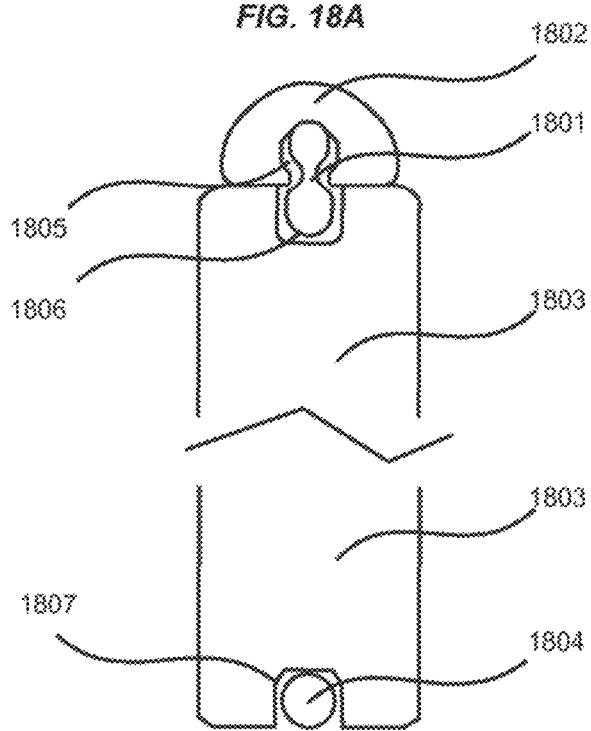

FIGS. 18A and 18B illustrate a typical exemplary semi-rimless frame 1800. FIG. 18A shows a frontal view of the semi-rimless lenses, and FIG. 18B shows the cross-section from the points X to X' of the electro-active frames 1800. As shown, the lenses 1803 are supported along their upper edge by a rigid portion of the frame 1802 (e.g. eye-wire, which may comprise a material such as metal) and supported along their lower edge by a section of clear plastic monofilament 1804 (typically nylon) that is connected to the rigid upper portion 1802 of the lens housing. The monofilament 1804 is shown as being disposed within a groove 1807 in the edge of the lens 1803. The length of the monofilament 1804 may be such that it is under tension when the lens 1803 is mounted in the frame and may thereby hold the lens in place.

With reference to FIG. 18B, a close-up of the cross section X-X' of FIG. 18A is shown so as to better illustrate an exemplary means by which the lens may be secured in a semi-rimless frame. As shown in this exemplary embodiment, the eye-wire 1802 may contain a cavity 1805 that secures a portion of an extrusion of a semi-rigid plastic 1801 (typically nylon) with a "figure-8" cross section. The remaining portion of the extrusion 1801 is disposed in the groove of the lens 1806 and keeps the lens 1803 from moving back and forth. In those portions of the outer surface of the lens 1803 that do not come into contact with the "figure-8" extrusion 1801 (e.g. along groove 1807), the nylon monofilament 1804 may essentially take the place of the extrusion 1801 as shown in this exemplary embodiment.

As the monofilament 1804 may be colorless and may be disposed completely (or substantially) within the lens groove 1807, it may be nearly invisible except under close inspection.

It should be noted that construction of an electro-active capable semi-rimless frame design has been disclosed by the inventors in U.S. Pat. Pub. No. 2010/0177277 A1. Embodiments of frames disclosed therein may be similar in appearance to the exemplary embodiment of a frame shown in FIG. 18B. Some of the differences that may enable the electro-active functionality of the frames disclosed therein may be related to the particular details of how the frame is constructed and the use of other novel conductive structures, which are described in detail in U.S. Pat. Pub. No. 2010/0177277 A1, which is hereby incorporated by reference in its entirety.

Figure 19A:
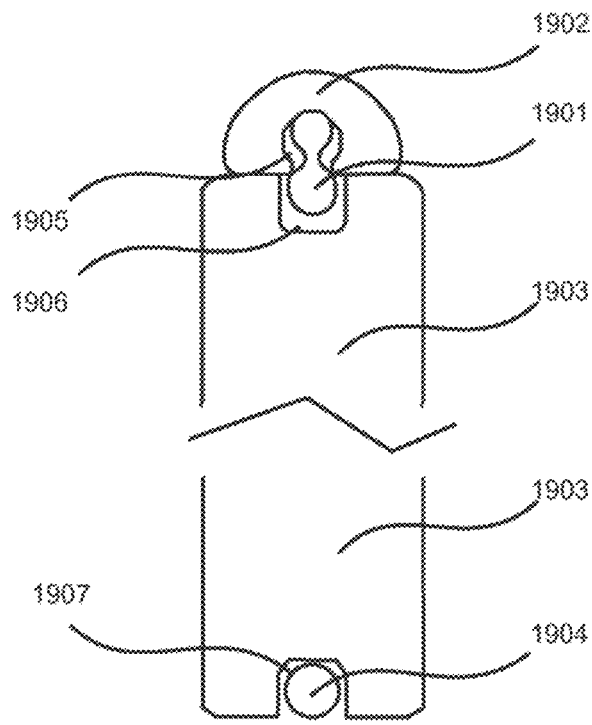
FIGS. 19A and 19B show an exemplary embodiment of a device in accordance with some embodiments.
Figure 19B:
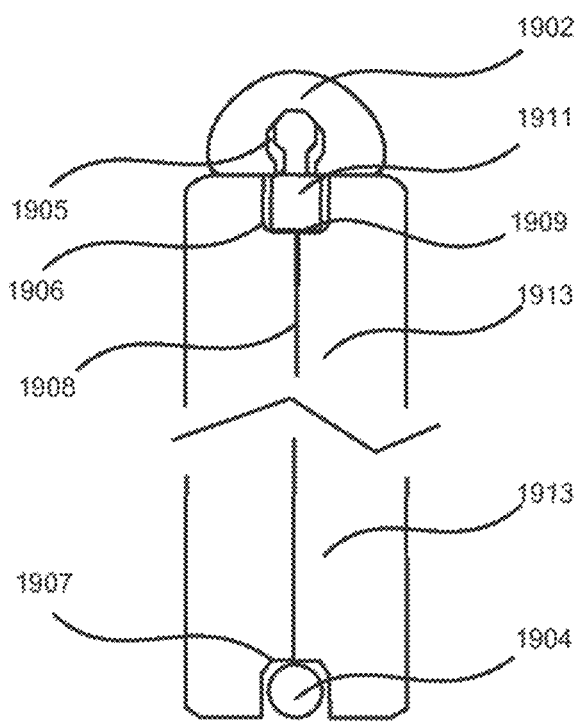

FIGS. 19A and 19B illustrate a comparison between an exemplary semi-rimless frame that is not electro-active, and an exemplary embodiment of an electro-active frame comprising electro-active lenses 1913. That is, FIG. 19A shows a cross-section of a conventional semi-rimless frame, while FIG. 19B illustrates a cross section of a frame that is essentially the electro-active counterpart of the frame shown in FIG. 19A. In both FIGS. 19A and 19B, a monofilament 1904 is used along the lower portion of the lens (1903 or 1913) disposed within groove 1907 so as to keep the lens (1903 or 1913) secure within the frame. In some embodiments of the electro-active frame shown in FIG. 19B, the eye-wire 1902 may be made of an electrically conductive material. However, this need not be the case, as a conductive path may be established within the eye-wire 1902 (and/or other components of the lens housing) using any suitable method, such as by, for instance, embedding a conductor within a non-conductive material. During the manufacturing process, in embodiments where the eye-wire 1902 comprises a conductive material, care may be taken to ensure that no coatings or finishes are applied to the inside of the eye-wire 1902 such that an electrically conductive surface is maintained (e.g. within the cavity 1905).

With reference to FIG. 19B, in some embodiments (and for the purposes of illustration only), an electro-active lens may comprise an interface 1908 between two substrates that contains internal electrodes for activating the lens 1913. This has been previously described by the inventors, such as in U.S. Pat. Pub. No. 2010/0177277 A1, which is hereby incorporated by reference. However, as noted above, embodiments are not so limited and the methods, devices, and means disclosed herein may have applicability to any electro-active frame and/or components therein (e.g. any type of electro-active lens). During an exemplary manufacturing process comprising edging the exemplary electro-active lens 1913, the groove 1906 may be placed such that it straddles this interface 1908 (which may, for example, comprise a liquid crystal layer between two electrodes).

Continuing with the exemplary manufacturing process, the lens 1913 may be edged and grooved, and one or more electrically conductive inks or paints 1909 may be applied to the locations where the electrodes are exposed within the groove 1906. The inks and paints may be used so as to provide a conductive path to the electrodes of the lens 1913 without substantially impairing the visual properties of the lens 1913, or being visible by an observer. In some embodiments, the groove 1906 may be between 0.4 mm and 1.0 mm wide (i.e. the horizontal distance shown in FIG. 19B) and between 0.4 mm and 1.0 mm deep (i.e. the vertical distance in FIG. 19B). The inventors have found that, in some embodiments, it may be preferred that the groove 1906 may be approximately 0.7 mm wide and 0.6 mm deep. Generally, the groove should be such that the extrusion or other material 1911 (or a portion thereof) may be disposed within the groove and assist in coupling the lens to the lens housing. However, it is generally not preferred that the groove be too large, as it may become visible and affect the aesthetics of the device.

In some embodiments comprising an electro-active lens, to provide a lens 1913 that functions properly, a conductive pathway is made between the inner surface of the eye-wire 1902 and the conductive paint 1909 applied to the groove 1906 of the lens 1913 (i.e. the surface of the lens 1913 that comprises the groove 1906). This may be accomplished with the use of a compliant conductive element 1911. The compliant conductive element may be a physically compliant yet electrically conductive material that may, in some embodiments, be extruded in a shape that fits substantially within the eye-wire 1902 and the groove 1906 of the lens 1913. Such a design may provide some or all of the advantages that were detailed above, including providing a conductive path between the lens housing and the lens, providing structural support for the device, preventing or minimizing damage to the rigid surfaces of the lens 1913 and lens housing 1902, etc.

As was described above, the compliant conductive element may take any shape and have any suitable dimensions. In this regard, FIG. 20A shows a cross section of an exemplary conventional extrusion (i.e. non-conductive) 2000 and its exemplary dimensions (in mm), while FIGS. 20B and 20C show a cross section and dimensions (in mm) of two exemplary compliant conductive elements 2010 that may be used, for instance, in semi-rimless electro-active frames. FIG. 20A discloses a typical "FIG. 8" shape of a non-conducive element 2000, while FIGS. 20B and 20C disclose shapes that vary slightly from the non-conductive component. The upper portions (i.e. first portions) 2001, 2002, and 2003 of each of these elements are similar, as they may each, for example, be designed to fit within the same lens frame component (e.g. an eye-wire). As depicted, each of the compliant conductive elements 2010 have a different shaped lower portion (i.e. second portion) 2005 and 2006 from that of the non-conductive extrusion lower portion 2004. This may be due to the fact that the compliant conductive elements 2010 may be designed to come into contact with the conductive painted regions within the lens groove, and form electrical connections thereto.

As can also be seen in FIGS. 20A, 20B, and 20C, as depicted, the overall vertical dimensions of the conductive compliant elements 2010 are larger than the traditional non-conductive "FIG. 8" extrusion 2000. This may be done in some embodiments to ensure that when the lens is mounted in the frame (i.e. within the cavity of the frame) the bottom of the lens groove comes into contact with the bottom (i.e. second portion) 2005 and 2006 of the compliant conductive elements, such that the lens may compress it slightly. With the compliant conductive element 2010 under compression, it will likely maintain the physical (and hence electrical) connection between the lens, the compliant conductive element 2010, and eye-wire at substantially all times, particularly as the frame flexes during donning and doffing the eye wear.

One of the important dimensions to ensure compression of the conductive compliant element is the "height," of the second portion of the conductive compliant element, which is shown as 0.75 mm for one of the compliant conductive elements 2010 by way of example only. The total height of this exemplary compliant conductive element is shown as 1.45 mm (0.75 mm+0.7 mm). As noted, the compliant conductive element 2010 could be made available in different heights to, for example, accommodate variations in lens processing (lens size and groove depth). While the design of the compliant conductive elements 2010 in FIG. 20C will likely function to form an electrical contact with portions of the surface of the lens (based on the height as shown), the width (horizontal dimension) is shown as not being optimized for the exemplary width of the groove of the lens and therefore its performance in conducting electricity may not be ideal. That is, the width of the bottom portion 2006 shown in FIG. 20C is not as wide as the groove in the lens. In contrast, the compliant conductive element 2010 in FIG. 20B is depicted as having a width that has been optimized—i.e. the width is larger, making it more likely that this configuration will make more robust electrical contacts. It should be noted that compliant conductive element 2010 made to the exact (or similar) shape as the "FIG. 8" design used for the non-conductive extrusion 2000 are, in some embodiments, the least preferred design as there may be no means to guarantee that the conductive compliant element 2010 will be compressed against the edge of the lens and hence provide a robust electrical connection.

It should be understood that the dimensions provided on FIGS. 20A-C are provided for illustration only, and are by no means limiting. Indeed, the dimensions of these components may vary based on the dimensions of the lens (and the lens groove) and the lens housing (and any cavity provided therein).

In general, from the standpoint of aesthetics, the electro-active semi-rimless frame design is may be particularly useful. For instance, through the use of appliques, facades and various lens shapes the basic semi-rimless frame shown, for example, in U.S. Pat. Pub. No. 2010/0177277 A1 can take on the look of many different styles while retaining its electro-active functionality.

Exemplary Embodiments Related to Full Rim Spectacle Frame Deigns

Figure 21:
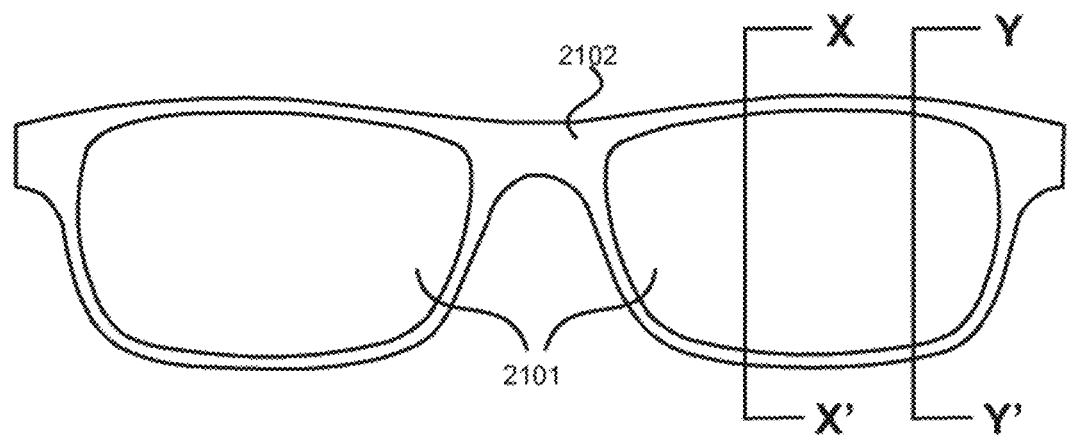
FIG. 21 shows an exemplary embodiment of a device in accordance with some embodiments.
Figure 22:
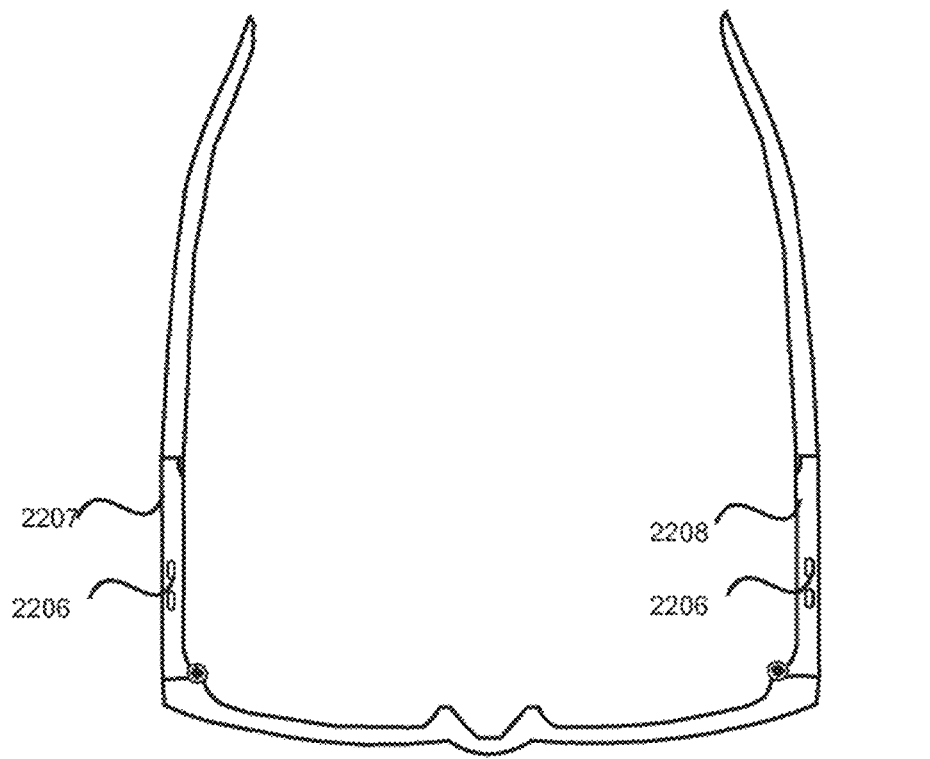
FIG. 22 shows an exemplary embodiment of a device in accordance with some embodiments.
Figure 22:
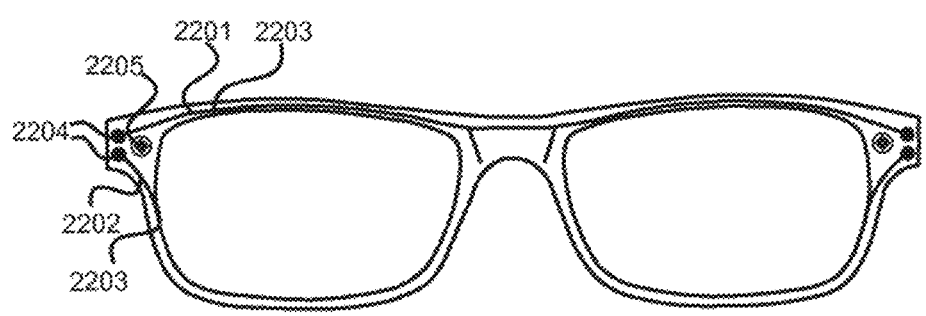

A typical full rim plastic frame (also referred to as zyl or acetate) known to those skilled in the art is shown in FIG. 21, where the lenses 2101 are supported along their entire circumference by a rigid plastic frame 2102. While an electro-active capable plastic frame was discussed with reference to FIGS. 14-17, additional embodiments are shown with reference to FIG. 22. As shown in FIG. 22, a physically continuous conductive pathway (e.g. an embedded conductor, such as a wire) is used to apply the driving voltage (e.g. the waveform) to the lenses and route synchronization signals from the master 2207 to the slave module 2208. That is, for instance as shown in FIG. 22, the embedded conductor 2201 may provide a conductive path across the lens housing from the master electronics module 2207 to the slave electronics module 2208. As noted above, embodiments that utilize a single electronics may also be used. Furthermore, FIG. 22 also shows openings in the metal casings 2206 that may hold modules or other components that allow the electronics modules 2207 and 2208 to be charged inductively. This may be beneficial in that such embodiments may provide power without the use of batteries (or may supplement the use of batteries to provide longer lifetime).

Continuing with reference to the embodiments shown in FIG. 22, a top conductor 2201 is shown embedded within the lens housing (that may comprise, e.g. acetate) and may carry a driving electronic signal from the right lens to the left lens. In addition, in some embodiments, the embedded conductor 2201 may also carry the power signal between the two lenses so as to synchronize the functionality between both lenses. Embedded conductor 2202 may carry the reference electronic signal to the lenses (e.g. ground). FIG. 22 also designates locations 2203 where special square (or any other appropriate shape) beveling into the lens housing (e.g. into the acetate frame front) may occur so as to (1) expose portions of the embedded conductors 2201 and 2202; (2) embed compliant conductive material; and/or (3) allow for an electrical connection between the exposed portions of the embedded conductors 2201 and 2202 to the compliant conductive element. That is, in the exemplary embodiment, the portions designated by 2203 may be the locations in which the conductive compliant material may be disposed within the lens housing, and where the conductive path from the lens housing to the lens may be created. FIG. 22 also indicates where the use of conductors 2204 (such as pogo pins) may be located so as to provide a conductive path from the temple to the lens housing (e.g. to the embedded conductors 2201 and 2202). FIG. 22 also shows an exemplary location of a hinge 2205 to couple the temple to the lens housing.

With initial reference to FIG. 21, FIG. 23 shows a cross section view of the sections X-X' and Y-Y' for a conventional full rim design (FIG. 23A) and of an exemplary electro-active full rim design comprising a compliant conductive element (FIGS. 23B-E).

As noted, FIG. 23A shows the cross-section X-X' of a conventional full rim (i.e. non-conductive) plastic frame with a lens 2302 possessing a beveled edge that sits (i.e. is disposed) within a similarly beveled region of an eye wire 2301. That is, the lens 2302 is designed to have a top surface that substantially matches a bottom surface of the lens housing (i.e. the eye rim).
This is one way in which traditional lens design coupled the lens to the lens housing.

FIG. 23B shows the section X-X' of an electro-active capable plastic frame in a region where no electrical contact is required. The basic construction is similar to that of the conventional frame design except that there is an embedded conductive pathway 2304 (e.g. metal wire or similar). As the conductive pathway 2304 is completely encased within the insulating material of the eye wire 2301 at this location, there is no electrical contact between the lens 2302 and lens housing 2301 (or a conductive path 2304 embedded therein).

FIG. 23C shows the section Y-Y' of an electro-active capable plastic frame in a region where electrical contact between lens housing 2301 and lens 2302 is required. In this region a square cavity 2305 is machined into the eye-wire 2301 that exposes the embedded conductive pathway 2304 (e.g. metal wire or similar). The cavity 2305 may also accept a compliant conductive element 2307 that may, in some embodiments, be extruded or otherwise configured into a rectangular shape. As also shown in FIG. 23C, the top surface of the lens 2302 may be configured to be disposed within a portion of the cavity 2305 as well.

FIG. 23D shows the cavity 2305 and the compliant conductive element 2307 in detail. As with the semi-rimless electro-active frame, it may be desirable to have the edge of the lens 2302 that is coated with the conductive paint 2306 come into physical contact with the compliant conductive element 2307 and compress it (as shown by compression region 2308) before the remainder of the circumference (i.e. the top surface) of the lens 2302 comes into contact with the conventionally beveled sections of the eye-wire 2301 (e.g. in the section defined by X-X' in FIG. 21, where no electrical contacts are made). As described above, with the compliant conductive element 2307 under compression (i.e. based on the force applied by the surface in the cavity 2305 of the lens housing 2301 and the top surface of the lens 2302), it will maintain the physical (and hence electrical) connection between the lens 2302, complaint conductive element 2307, and conductive pathway 2304, even as the frame flexes during donning and doffing the eye wear.

The dimensions of the compliant conductive element 2307 are generally determined by the dimensions of the cavity 2305 and the position of the cavity 2305 relative to the conventional lens bevel. The minimum height ($H_{min}$) of compliant conductive element 2307 may be the distance between the apex of the conventional lens bevel 2306 and the bottom of the cavity 2305 as shown in FIG. 23D. Generally, as values of the uncompressed height ($H_{uncompressed}$) increase above $H_{min}$, the more robust the electrical connection between the compliant conductive element 2307, the lens 2302, and the lens housing 2301 (and/or the embedded conductive pathway 2304). Maximum values of the height H may be determined empirically based on how compressible the compliant conductive element material is such that lens 2302 (or a portion thereof) can still be mounted into the lens housing 2301 using methods known in the art. That is, the maximum height may be the height at which the compliant conductive element 2307 will still compress sufficiently that the lens 2302 is adequately disposed within the cavity 2305 and thereby coupled to the lens housing 2301.

With reference to FIG. 23E, the width of the conductive compliant element 2307 is preferably a small amount (δ) larger than the width of the groove W such that the compliant conductive element 2307, once inserted into the cavity 2305, remains in place without the need for adhesives while the lens 2302 is mounted. The inventors have found that a δ value within the range of approximately 1 mm to 0.5 mm was preferred and functioned well for this purpose. In an exemplary embodiment, a rectangular compliant conductive element approximately 2.1 mm wide (for a 2.0 mm wide cavity) and 1.2 mm tall enabled a robust electrical connection between lens 2302 and a lens housing with a δ value of approximately 0.1 mm (100 µm).

Exemplary Embodiments Comprising Full Rim Metal Spectacle Frame Designs

As noted above, the specific embodiments discussed herein are exemplary only, and other embodiments may exist that utilize the same or similar principles. For instance, in some embodiments, it may be desirable to have an electro-active capable frame with a full metal rim manufactured from a conductive material. A cross section for such a frame is shown in FIG. 24. In this exemplary embodiment, the eye-wire 2401 contains a square cavity 2402 to which preferably no coatings or finishes have been applied such that the conductive surface of the eye-wire 2402 material is easily contacted. Into the cavity 2402 another conductive compliant material 2403 may be mounted (e.g. disposed within) that may make the electrical connection between the lens 2404 and frame (e.g. the lens housing 2401). In areas where the electrical connection need not be made, then the compliant conductive element 2403 may be omitted and the edges of the square cavity 2402 in the eye-wire 2401 support the bevel of the electro-active lens 2404. In other embodiments the conductive compliant element 2403 may be mounted (i.e. disposed within) in all parts of the eye-wire cavity 2402 and only those areas of the lens 2404 to which conductive paint is applied make electrical contact. The shape of the conductive compliant element may be any shape, including rectangular (similar to the exemplary embodiments described above with respect to the exemplary full-rim plastic rim) or embodiments may have a slight bevel. The conductive compliant element 2405 shown with the slight bevel in FIG. 24 may also be suitable for full rim plastic frames in other embodiments.

As with the previously described frame designs, it is preferred to have the edge of the lens that is coated with the conductive paint come into physical contact with the compliant conductive material and compress it before the remainder of the circumference of the lens comes into contact with the remainder of the eye-wire. As described above, with the compliant conductive element under compression, it will maintain the physical and hence electrical connection between lens, compliant conductive element, and lens housing (e.g. conductive pathway), particularly as the frame flexes during donning and doffing the eye wear.

FIG. 25 illustrates an exemplary embodiment comprising a conductive compliant element 2501 providing a conductive path from the lens housing 2500 to an electro-active lens 2507. The illustration on the left of FIG. 25 shows a close up of an exemplary electro-active frame. The frame comprises a lens housing 2500 that could, for instance comprise a non-conductive material such as a plastic (e.g. acetate). Embedded within the lens housing 2500 is a conductor 2503. As shown in this exemplary embodiment, conductor 2503 is electrically connected to the temple at 2506, which could for instance comprise another conductor, such as a pogo pin. Conductor 2503 is also connected to compliant conductive element 2501 in cavity 2502 (for instance, the conductor 2503 may be exposed at some portions along the cavity 2502. As shown, conductive compliant material 2501 is located within a portion of cavity 2502. A second conductive path is also shown, comprising a second embedded conductor 2504, which also connects to a compliant conductive element 2501 disposed within a cavity 2502 in the lens housing 2500. The second embedded conductors 2504 electrically connects to a temple at a point 2506. Thus, as shown, FIG. 25 illustrates an electro-active frame that comprises two separate conductive paths from a temple to the lens 2507 via compliant conductive elements 2501. In portions of the lens housing 2500 where the conductive compliant element 2501 is not located, the lens housing 2500 comprises a cavity 2508 that may be of a traditional shape (e.g. not square) in which a portion of the lens 2507 (e.g. a beveled edge) may be disposed within. A hinge 2505 that couples a temple to the lens housing 2500 is shown as well.

On the right of FIG. 25 are shown closes up of the cross sections shown as A-A and B-B on the illustration on the left of FIG. 25. As shown, in section A-A, an electrical connection is formed between conductor 2503, compliant conductive element 2501, and lens 2507. The cavity 2502 is shown as comprising a rectangular shape, and the compliant conductive element 2501 is shown as having dimensions such that it is substantially disposed within the cavity 2501 (dimensions in mm). At location B-B, there is no electrical contact made as the electro-active frame does not comprise a compliant conductive element 2501 in this location. The cavity 2508 is shown in this section, and the lens housing 2500 is shown as encapsulating the conductor 2503 such that no contact is made with the lens at this location. The last illustration is a cross section showing an overlap of the sections A-A and B-B, where the different between cavity 2508 and 2502 (comprising conductive element 2501) can be seen.

Material Composition of the Conductive Complaint Element and Inks

As discussed above, the conductive compliant element, regardless of the frame design, may, for example, comprise a physically compliant yet electrically conductive material that is extruded or otherwise molded into a shape that conforms to both the frame and lens for the purpose of forming an electrically conductive path (i.e. bridge) between lens and frame. While many different classes of material are suitable, good results have been obtained by the inventors when metal loaded silicone elastomers are used with volume resistivities of less than 10 $\Omega$-cm and preferred results are obtained with volume resistivities of less than 1 $\Omega$-cm. It has also been found that a material having values greater than 50 on the shore durometer A scale are suitable, but that values greater than 65 are preferred. The inventors have achieved good results with extruded silver and aluminum (Ag—Al) loaded silicone elastomer with a volume resistivity of 0.008 $\Omega$-cm and a Shore A hardness of 70. However, embodiments are not so limited.

While such materials are typically manufactured to final shape prior to assembly into the electro-active frames, in certain embodiments, it may also be possible to apply uncured material in liquid or gel form immediately prior to assembling the eye wear such that upon cure the material conforms to both the lens and frame (e.g. the lens housing) simultaneously and thus forms an electrically conductive path (e.g. bridge) in that manner. This may be preferred in some embodiments, as the compliant conductive material may thereby contact the greatest amount of the surface of both the lens and the lens housing, and may thereby maximize the electrical connections thereon.

In some embodiments comprising an electro-active lens, the conductive paint(s) or ink(s) applied to the edge of the lens to establish an electrical connection may be dependent upon the conductive materials used to make the internal electrodes of the lens itself. As these electrodes will typically be in the line of sight to both the wearer and viewer of the lenses, it is preferred to have a transparent conductive material such as ITO ink mixture X-806CN27S which is commercially available from Sumitomo Metal Mining of Japan, by way of example only. For lenses manufactured with this ink formulation, once edged and grooved, an additional amount of the X-806CN27S may be applied to the edge of the lens and cured. To establish a more robust electrical connection, a second conductive ink or paint may be applied over the cured X-806CN27S. While many conductive metal inks (silver and/or nickel based) are available, conductive carbon based inks are preferred for cosmetic reasons. Carbon based conductive inks are preferred as they do not oxidize (i.e. change color) with age and are not as bright in appearance as metal based inks. By way of example only, a conductive carbon ink such as mixture 122-49, commercially available from Creative Materials Incorporated may be preferred.

Electronic Frames Comprising a Housing Module

When designing and fabricating spectacles that comprise one or more electronic components, the manner in which these components are incorporated with the spectacle frames may also be considered. In some instances, the electronic components may be inserted or coupled to the frames of the electronic spectacles (for instance in a cavity of the temple or the lens housing). The electronic component or components may be inserted during fabrication or included thereafter. For example, in some embodiments in which the frame comprises a plastic material (such as acetate), the frame may be molded around the electronics during fabrication (such as during molding or injection molding of the plastic). However, this may limit access to the electronics, and may prevent repair or replacement. Moreover, the plastic material may expand and contract during the fabrication process, which may result in the frame components also changing size and/or shape. Molding the frames around the electronic components (such as around an electronics module) may result in spectacle frames that are not uniform, that have defects around the electronic components, are not structurally sound, do not provide access to the components therein, etc.

In some embodiments, a cavity may be formed in one of the components of the frame (such as one of the temples) during the fabrication process in which the electronics may be disposed either during fabrication or thereafter. Examples of such embodiments are illustrated in FIGS. 3-10, where the electronics module 307 is shown as being inserted into (or placed within) the cavity 308 and coupled thereto with a fastener (such as a screw, adhesive, etc.). Further examples are shown in FIGS. 16-17, where the electronic frames comprise a housing module 1603 that is attached to one of the temples and houses an electronics module 1605 (i.e. the electronics module is disposed therein). FIGS. 16 and 17 are described in more detail below. In some instances, when the frame (or a component thereof) comprises a plastic material (such as acetate) then, as noted above, the plastic material may expand and contract with heat, creating pressure on the electronics within the cavity and/or causing portions of the frame to deform around the components. Therefore, in some embodiments, it may be desirable to utilize a component (e.g. a housing module) that may be used to support the electronics and/or electronics module within (or coupled to) a structural element of the frame (such as the temple of the frame or the lens housing). In this regard, in some embodiments, such housing modules may be used to both couple (e.g. attach) the electronics to the electronic frame, as well as to maintain the shape and structural integrity (and thereby the aesthetics) of the electronic frames or a component thereof.

In some embodiments, electronic spectacle frames provided herein may include a housing module that may be coupled to (e.g. attached to and/or disposed within) a structural member of the electronic frames. As used herein, a "housing module" may refer to a component that may house (e.g. contain, substantially contain, surround, surround a portion of, encircle, etc.) of the electronics (and/or an electronics module) of the electronic spectacles. It should be noted that the housing module need not fully encapsulate the electronics or electronics module in some embodiments. That is, there could be area in which the housing module does not cover the
electronics module. Such openings or apertures may allow for interaction with the electronics module, such as by allowing the wearer to turn electro-active lenses (or other electronic components disposed on the spectacle frames) "on" and "off" (e.g. through a capacitive or membrane switch). In some embodiments, an opening in the housing module may allow for the electronics module to be selectively placed into (and/or removed from) the housing module. For instance, in some embodiments an electronics module may be pressure fitted so as to be inserted into an opening (e.g. "slid in" or otherwise disposed into) and coupled to the housing module.
The shape, size, and material of the housing module may vary based on the specific purpose of the component, as well as based on other factors such as the size, shape, and material of other components of the frame and/or the electronics module. For instance, the housing module may comprise a conductive material (e.g. a metal) or non-conductive material (e.g. plastic, carbon fiber, or nylon), and may be shaped to fit particular styles of frames. In general,
it may be preferred that the material and size of the housing module may be chosen such that during typical use, the electronics module may not be inadvertently removed or decoupled from the housing module.

The inventors have found that an inadvertent voltage or current that may be applied to the electronic components disposed within an electronics module may create unpredictable and/or unwanted behavior by those electronic components, or any electronic components that may be electrically coupled to those electronic components (such as components that are supplied with power and/or control signals from the electronic components disposed within the electronics module). In this regard, the use of conductive materials coupled to the electronics (or an electronics module that comprises the electronic components) may create such electrical conductivity issues including shorting of the components and/or capacitance issues (e.g. electrical charge storage and dissipation). This may, for instance, cause the electronic components to activate when they are not intended to, or it may cause electrical damage to the electronic components (for example, if excess current is inadvertently supplied). Therefore, it may be preferred in some embodiments that the electronic components disposed within (or substantially within) the electronics module may be electrically insulated from the electronic frames and/or the outside environment. That is, for instance, in some embodiments, an insulating material may be disposed between (or substantially between) the electronic components disposed with an electronics module and the frame of the electronic eyeglasses and/or the outside environment. However, there may still be one or more conductive paths between the electronic components disposed within the electronic module and one or more electronic components disposed on the frame and/or within one or more electroactive lenses such that the electronic component may provide power and/or control signals to these components.

For example, in some embodiments, a housing module may comprise a conductive component such as a metal. Such materials may be preferred in some embodiments because they may have structural properties that prevent or inhibit deformation of the frames and thereby serve to house and protect the electronic components (and the electronics module), while maintaining the aesthetic shape and appearance of the frames. However, the conductivity of the housing module may cause the electronic components to be inadvertently grounded, or may produce or supply additional charge to one or more of the electrical components when such charge is not required or desired. Therefore, in this example, it may be desirable in some embodiments to include an insulating material located between the housing module and the electronic components so as to prevent or reduce the risk of such shorting issues and/or stray electrical charges from an external source. In some embodiments, the insulating material may comprise a portion of the electronics module (such as a layer of material disposed on the outer surface of the electronics module, or the electronics module itself may comprise an insulating material), such that the electronics module may substantially electrically insulate the electronic components disposed therein from the conductive housing module (and/or other conductive components, such as a portion of the frame).

In general, the housing module may comprise any suitable material, including non-conductive materials (e.g. an insulating material). Thus, in some embodiments, the electronics module may comprise a conductive material, but may be electrically insulated (or substantially electrically insulated) from the frames and/or the outside environment by a housing module that comprises a non-conductive material. Indeed, the inventors have found that in some embodiments, the use of non-conductive materials for the housing module may reduce inadvertent charge dissipation in the electronics module, and thereby may increase the performance of the electro-active lenses (and/or reduce failures or undesired behaviors) in some instances. Moreover, in some embodiments that may comprise a sensing mechanism (such as a capacitive touch switch), the use of an insulating material (e.g. layer) may prevent charge storage
from an interaction with user, which may prevent or reduce the occurrence of a second electrical charge incorrectly indicating a second interaction with the user.

In some embodiments, an insulating material may be disposed within the housing module and may be located between the housing module and the electronics module (or a portion thereof). For instance, both the housing module and the electronics module could comprise a conductive material, but could be electrically insulated by a material disposed there between.
However, as used herein, any insulating material or layer that does not comprise a portion of the electronics module (including a layer disposed on an outer surface), but that is disposed between the housing module and the electronics module (or a portion thereof) may be considered a part of the housing module.

In general, the insulating material may comprise any suitable electrical insulator, including plastics and/or rubber, or any other material or composition having suitably high resistivity. In some embodiments, it may be preferred that the insulator is chosen so as to effectively isolate the electronic components in a relatively short distance for voltages of at least approximately 5 volts (but it may be preferable in some embodiments to be at least approximately 20 volts), which may correspond to the typical amount of external (and internal) voltage applied to the frames. In some embodiments, the thickness of the insulator may be less than approximately 10 mm (and preferably in some embodiments of less than approximately 5 mm). In general, the thickness of the insulator may be preferred to be as small as possible, as the available space within the electronic frames may be limited, while still providing adequate electrical insulation. Therefore, in some embodiments, it may be preferred that the thickness of the insulating material may be less than 1 mm.

As noted above, the housing module may be located in any suitable location on (or coupled to) the electronic frames. For instance, the housing module may be located on (or within or attached to) the lens housing or on (or within or attached to) one or both of the temples. That is, for instance, in some embodiments the housing module may be inserted into a component of the lens frame (such as into a cavity within the component) and provide support to maintain the shape and aesthetics of the frame, while also providing a means of coupling one or more electronic components to the electronic spectacle frame. In some embodiments, the housing module may comprise a separate section of the frame. That is, for instance, in some embodiments, the housing module may be disposed between a temple of the frame and the lens
housing, such that the housing module is coupled to both the lens housing and the temple. An example of this is shown in FIGS. 16 and 17 and described in detail below. In such embodiments, the lens housing may be coupled to the temple using any suitable means, such as an adhesive, one or more fasteners (such as a screw), and/or the two components could be designed such that a portion of the housing module may be inserted into (or otherwise structurally fitted into or coupled to) the temple and/or the lens housing (or vice versa). In some embodiments, the lens housing and the temple may share a similar structural component (such as a similar core, such as the core 1601 shown in FIGS. 16 and 17). The lens housing or temple and the electronics module may, in some embodiments, be connected by using one or more hinges.

Embodiments may thereby provide a housing module that contains, surrounds, encapsulates, is coupled to, or otherwise houses one or more electronic components (or portions thereof) and/or an electronics module that comprises one or more electronic components of an electronic spectacle frame. As noted above, in some embodiments, the housing module may provide structural support to the frame (or a component thereof) that prevents or reduces deformation of the frame during the fabrication process or during subsequent use of the frames, or may itself provide a portion of the frame consistent with the aesthetic style of the frames.

In some embodiments, it may be desirable to provide the ability to selectively couple (e.g. attach) or decouple (e.g. remove) the housing module and/or the electronics (or an electronics module) from the electronic spectacle frames. For instance, it may be desirable that the housing module be selectively coupled to the frames so that the housing module may be manufactured in a separate process from the other portions of the electronic frames. That is, for example, in some embodiments the electronic frames may be fabricated with a cavity to which the electronic housing module may be inserted into after the electronic spectacle frame, or a portion thereof, is fabricated. The housing module may then be disposed into the cavity, and an electronics module may thereafter be coupled to the housing module. In some embodiments, the electronics module may be coupled to the housing module in advance of inserting the housing module into such a cavity. In some exemplary embodiments, the housing module may serve to provide support to the frame (or a component thereof) and prevent or reduce deformation of the frame (e.g. if the frame comprises a plastic material such as acetate or nylon). Similarly, it may also be desirable that the electronics (e.g. an electronics module) be selectively coupled to and/or decoupled to (e.g. removable) from the housing module. This may permit replacement of defective, obsolete, or exhausted components (such as an old or frequently used power source). Moreover, the ability to selectively insert and remove electronic components or an electronic module may provide the ability to customize the use of the electronic spectacle frames. For instance, the same electronic spectacle frames (or components thereof) may be used for different purposes, but may be manufactured in the same manner (thereby allowing for less expensive fabrication). The customization may be provided by coupling (and thereby utilizing) different electronic components (that may be comprised for instance in separate electronic modules) with the same or similar standard frames.

Although the housing module may be secured to the frame in any suitable manner (such as by using an adhesive, screws, etc.) as noted above, it may be preferred in some embodiments to provide a manner in which the housing module and/or the electronics may be readily coupled (and/or decoupled) to the frames. The inventors have found that an example of a relatively efficient manner may be to shape the housing module (or the electronics module) so as to be pressure fitted. That is, for instance, the housing module may be coupled to the frame by "snapping" the housing module into place. In this regard, the shape and/or size of the components may be such that if a force is applied in a particular direction of the housing module (or the electronics module), the component may contract in that direction. When a force is not applied in that direction, the component may expand. If the receiving component (e.g. the electronic frame or a cavity therein) is designed so as to accept the expansion of the housing module, the housing module could be inserted into place and be readily coupled thereto (or alternatively, with the application of a similar force, decoupled and removed). Similarly, an electronics module may be designed to be pressure fitted into the housing module. In this manner, either the housing module or an electronics module may be readily coupled (or decoupled) to the electronic frame (e.g. without the need for tools—such as screw driver) in a manner in which they may be inserted or removed without damaging the structure of the frames.

Figure 27:
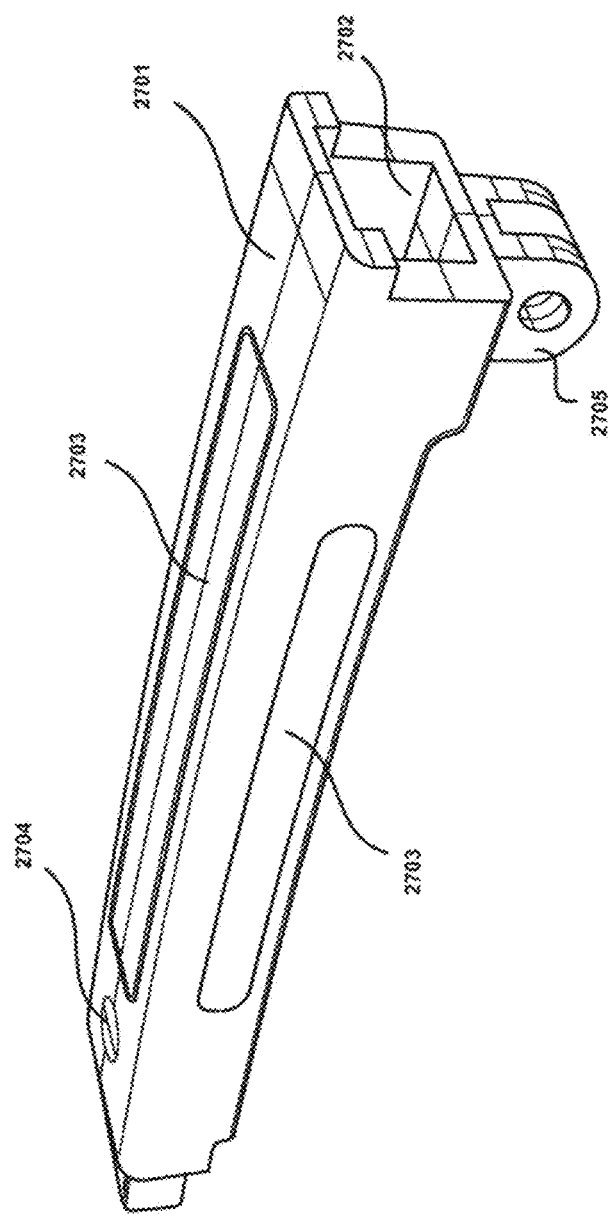
FIG. 27 shows an exemplary embodiment of an electronic frame comprising a housing module in accordance with some embodiments.

As noted above, the inventors have found that in some embodiments it may be preferred to have a housing module or an electronics module that may be pressure fitted. In some embodiments, the electronic spectacle frames may comprise a temple that has an opening in one end that allows for either the housing module or the electronics module (or both) to be inserted into the opening and thereby be disposed within the temple (e.g. within a cavity). An example of such a design is shown in FIG. 27 and described in detail below. In this way, in some embodiments, the housing module and/or the electronics module may be coupled/decoupled to the frames in a relatively efficient manner by applying pressure in a perpendicular direction (typically to deform the component to decrease a cross-sectional area) and inserting/removing the housing module or electronics module from the receiving component. In some embodiments, the housing module may comprise a component of the frame (i.e. as described above with reference to FIG. 16, the housing module may be coupled to the temple and/or the lens housing, but not necessarily be disposed within either) and an electronics module may be inserted into an opening in the end of the housing module and pressure fitted thereto. Some embodiments that comprise a pressure fitted component may provide several advantages, including, in some instances, providing an increase in the ease with which components may be coupled and decoupled.

For example, when an electronic component or components is chosen for use in an electronic frame, the electronics may be disposed in an electronics module that may be inserted into the opening in an end of the housing module or a frame component (e.g. by compressing an electronic module in one dimension). In some embodiments, the electronics module may be "slid" into place (e.g. inserted into the opening and thereby disposed in the housing module). The housing module (and/or the temple of the frames) may be configured so as to have an area, cavity, or opening that allows the electronics module to expand into and thereby the module may be coupled therein. An example of this is illustrated in FIG. 27. In addition, in some embodiments, the inventors have found that it may be more effective to compress the dimension of the electronics module that is perpendicular to the direction that it is inserted into the housing module (i.e. to decrease the dimension of the electronics module in a direction that is perpendicular to the axis of the temple (e.g. the axis on which the temple typically has its largest dimension)) because this may not, in some instances, effect the conductive path or the electronic components. This may be preferred in some embodiments to compressing the electronics module in a direction that is parallel to the axis that the temple extends along because such embodiments may cause the electronic components and/or the conductive path to be compressed—which may require additional components to maintain such conductive paths and/or specific materials (such as conductive rubber) to comprise some of the components, and may also increase the risk of potential failures in electrical contacts in some embodiments. For instance, the electronics module may in some embodiments comprise electronic components (such as a power source) that are not easily compressible. In addition, in some embodiments, locating an opening in the end of the temple (or the housing module) may provide advantages over utilizing an opening in another location (such as along the body of the temple) such as increasing the durability of the electronic spectacles when in use (which is generally when the most force may be applied to the frames) because the opening may be blocked and/or protected by the other components of the electronic spectacles (e.g. a hinge or the lens housing). This may prevent the electronics module (and/or the housing module) from inadvertently being removed from the device. Again, an exemplary illustration of such embodiments is shown in FIG. 27 and described below.

As noted above, some embodiments may provide advantages over electronic spectacles that do not comprise a housing module in which electronics and/or an electronics module may be located within. For instance, some embodiments comprising a housing module may provide additional structural support to a frame or component thereof (e.g. to a plastic frame, which may otherwise deform around components contained in a cavity therein). The housing module may provide for removable access to an electronics module because the frame components may not be molded or formed directly around the electronic components. Some embodiments may also provide benefits in the manufacturing process. For instance, the housing module and/or electronics module may be manufactured in a separate fabrication process (and may comprise a different material) and be later assembled with other components of the frames. In some embodiments, providing an electronic module and/or housing module that may be selectively coupled and/or decoupled to the frame components and/or to each other, may increase the flexibility and utility of the electronic spectacle frames by allowing a single base frame to serve multiple purposes (e.g. by using multiple and/or different electronics that may be coupled and/decoupled as required) and may further provide a more robust design (because, for instance, defective or used components may be more readily replaced). Moreover, the use of pressure fitted components in some embodiments may permit quick coupling and uncoupling of the components, without the need for tools and or risk of damaging the components of the device.

Exemplary Embodiments of Electronic Spectacle Frames Comprising a Housing Module Provided below are further exemplary embodiments of electronic frames. These examples are provided for illustration purposes only. In addition, a person of ordinary skill in the art after reading this disclosure may understand that various combinations of components discussed above or below may be made. In this regard, embodiments may provide electronic frames that comprise a housing module for electronics (and/or an electronics module) in electronic spectacles. Some embodiments, may comprise of the components and features described above in combination with a housing module. For example, some embodiments may also comprise a spring hinge and an electrical path from a temple to a lens. Some embodiments may also comprise a conductive compliant material that provides part of an electrical path between two or more components. Some embodiments may also comprise a single electronic module, or multiple electronics module. Some embodiments may also comprise a facade.

In some embodiments, a first device may be provided. The first device may include a frame having a first temple and a second temple. The frame may also comprise a housing module attached to a structural member. A "structural member" may refer to any portion of the frame including, by way of example, the lens housing, either of the temples, a cavity within a temple, the lenses themselves, etc. The housing module may be attached (or coupled) to the structural member in any suitable manner, including using one or more fastening devices (such as a screw), an adhesive, a common frame component (such as a core element), etc. In some embodiments, the structural member and the housing module may be structurally configured so that they couple without the use of another component or device. For example, the housing module may be configured to be "pressure fitted" to a cavity within a structural member of the frame, or there may be one or more connectors or common components that may be used to couple (e.g. attach) the components.

In general, it may be preferred in some embodiments that the housing module is coupled to and/or configured so as to not detract from the aesthetic features of the structural member and/or the frame of the electronic spectacles. For example, the housing module may be designed so as to appear as part of the frame, or may be designed such that it adds to the stylistic design and appearance. In some embodiments, the housing module may be designed or configured to provide support to the structural member and also contain one or more electronic components (or an electronics module that comprises one or more electronic components) of the device. It may be preferred, in some embodiments, that the support provided by the housing module prevents or reduces the deformity of a structural member, particularly where the structural member comprises a plastic (such as acetate), nylon, or any other material which may have their shape altered by the application of force, such as heat or physical force applied during fabrication and/or during typical use. The structural components may thereby be more susceptible to physical damage if not structurally reinforced (e.g. if electronics or an electronic module are to be located in a cavity). Thus, in some embodiments where the structural component of the electronic frames may comprise a material that may have its shape changed and deformed in a manner that affects the performance of the device and/or the structural aesthetics of the frames, it may be preferred to include a housing module that provides support. However, embodiments are not so limited, and the housing module may be attached or coupled to structural components (such as temples) that comprise any suitable material, including conductive materials such as metals, which may not require additional support to prevent deformation during use or subsequent to fabrication. In addition, as described below, the housing module may itself comprise a separate component such that it may not be disposed within the structural member (and thereby does not provide support for the structural member) or it may be coupled to a structural member or members. An example of such an embodiment is shown in FIG. 16.

In some embodiments, the first device as described above may include a first lens and a second lens coupled to the frame, and an electronics module. The electronics module may be located (e.g. disposed) within the housing module. That is, for instance, the electronics module may be disposed such that some or all of its components are contained within the periphery of the housing module. However, as noted above, in some embodiments, portions of the electronics module may not be covered (e.g. encapsulated or surrounded) by the housing module.

Moreover, in some embodiments, portions of the electronics module may protrude through, or be disposed outside of, the housing module. One such example provided for illustration purposes may be a touch sensitive switch, such as a capacitive switch or a membrane switch, that has at least a portion that is exposed such that it may interact with a user (such as a user's finger). The electronics module may further include at least any two of: a power source; a controller; and a sensing mechanism (i.e. the electronics module may comprise more than one electronic component). For instance, the electronics module may comprise a power source and a controller; a power source and a sensing mechanism; a controller and a sensing mechanism; or only one of these components.

In some embodiments, the first device may be self sufficient—that is, it may comprise a power source and one or more electronic components that are driven by the power source. It should be understood that the first device (e.g. an electronic spectacle frame) may comprise other electronic components disposed on (or within) different parts of the device (e.g. coupled to different parts of the frame such as the temples, the lens housing, or the lenses). Each of the electronic components may be electrically connected together (via one or more conductive paths) or each may be electrically isolated from one or more of the other electrical components and/or modules.

In some embodiments, in the first device as described above, an insulating layer may be disposed between one or more electronic components (that may themselves be disposed within the electronics module) and the frame of the first device. The term "disposed between" may refer to when an insulating material (e.g. an insulating layer) may be located so as to electrically isolate one or more of the electronic components from at least a portion of the frame. The insulating layer may also isolate some or all of the electronic components from the external environment. In general, the insulating layer may be designed or configured to electrically isolate the electronic components that may be disposed within the electronics module from external sources of current or voltage. As explained above, the less electrical contact the electronic components have to external sources of current and/or voltage, the less likely it is that an occurrence of a short current or external electrical charge or voltage may affect the performance of the electronic frames or components thereof. For example, in some embodiments, the insulating layer may be utilized so that inadvertent or unwanted voltages or currents are not applied to the electronic components disposed within the electronics module. For instance, in some embodiments where the electronics module may include a sensing mechanism, the sensing mechanism may not function properly if unwanted voltage or current is applied thereto (such as through a conductive housing module), or if a charge that was generated based on a user's "touch" is not effectively dissipated because of the conductive material.

However, it should be noted that a conductive path may still be established to the components within the housing module (e.g. through the use of a conductor inserted into an opening of the electronics module). For instance, in some embodiments a sensing module that may be disposed on the outside of the electronics module may have a conductive path to, for instance, a controller located inside the electronics module. In addition, a power source or controller may be electrically coupled to other components on the electronic frame. In some embodiments, these conductive paths may also be electrically isolated from the frames or a housing module that may comprise a conductive material.

In some embodiments, where an insulating layer may be disposed between one or more electronic components (which may be disposed within the electronics module) and the frame, the housing module may comprise the insulating layer. That is, for example, the housing module (or a portion thereof) may comprise an insulating material. The housing module may in some embodiments substantially surround and/or be coupled to the electronics module and thereby if the housing module comprises an insulating material, then a substantial portion of the electronics module (and thereby the electronic components disposed within the module) may be electrically isolated from the frame and/or the external environment. Indeed, in some instances, the electronics module may comprise a conductive material, and may thereby be electrically isolated (or portions thereof may be electrically isolated) by the housing module. This may permit some embodiments to include an electronics module that could comprise a conductive material (such as a metal). This material may offer advantages over other types of materials, such as with regard to increased manufacturing efficiencies, and/or may also comprise a material that is better able to protect the electronic components disposed therein such as, for instance, during manufacture, assembly, transportation, and/or during use of the first device.

In some embodiments, in the first device as described, where an insulating layer may be disposed between one or more electronic components that may be disposed within the electronics module and the frame of electronic spectacles, the housing module may comprise a conductive material and the insulating layer may be disposed between at least a portion of the housing module and the electronics module. By "at least a portion" it is generally meant that at least 25% of the electronics module may be isolated from the housing module by the insulating layer. For example, in some embodiments the housing module may not be adjacent to (or electrically coupled to) the entire surface of the electronics module, and thereby the insulating layer may need not electrically isolate the entire electronics module from a conductive housing module.

For instance, the housing module may have one or more openings that may provide access to the electronics module (or components therein, such as a sensing mechanism). In some embodiments, the insulating layer may isolate more of the electronics module (such as, for instance at least 50% or, preferably, at least 95%), which may depend on the design and functionality provided by the electronic spectacles.

In some embodiments, in the first device as described, where an insulating layer may be disposed between one or more electronic components that may be disposed within the electronics module and the frame of electronic spectacles, the insulating material may comprise a portion of the electronics module. That is, for instance, in some embodiments, the electronics module may have an insulating material disposed (e.g. attached or deposited) on its outer surface (or the outer surface or casing of the electronics module may comprise an insulating material) and thereby the electronics module may serve to electrically isolate some or all of the electronic components from the frame, the housing module, and/or external environment. Thus, as used herein, in some embodiments where an electronics module comprises an exterior wall (e.g. an outer wall, container, shell, etc.) that is made of, or includes, an insulating material, the exterior wall may be considered as the insulating layer disposed between the electronic components (that are disposed within the electronics module) and the frame. For example, in some embodiments, the outer wall (or the container) of the electronics module (or an insulating layer disposed thereon) may also serve to electrically isolate the electronic components that may be disposed within the electronics module from a housing module that comprises a conductive material (or any other component of the electronic spectacles, such as the frames). As noted above, the inventors have found that, in some embodiments such as when the housing module includes a conductive material, it may be preferred to electrically isolate the electronic components disposed therein from the housing module because, for instance, electrical charge may be stored or applied to the housing module (particularly where a sensing mechanism may be exposed between a portion of the housing module) that may thereby affect the performance of the electronics.

The insulating material that may be used in some embodiments may be of any suitable material, such as a plastic, nylon, rubber, carbon fiber, etc. In general, given the relatively small area typically available within a spectacle frame, it may be preferred to minimize the size of components and layers (including the insulating layer). That is, for instance, in some embodiments it may not be considered aesthetically pleasing if the portion of the electronic spectacle frame that comprises the electronics is readily perceivable (such as if the components extend out of the frame). In some embodiments, the insulating layer may be less than 5 mm thick, and may preferably be less than 2 mm thick. In some embodiments, as was described in detail above, the insulating layer may comprise a part of the electronics module. That is, for instance, in some embodiments the insulating layer may comprise the exterior wall of the electronics module, or some other internal component that isolates the electronics disposed within from current or voltage that may be applied to (or retained on) the housing module. In some embodiments, the insulating layer may be disposed only between the portions of the housing module and the electronics module that may be coupled or physically connected (or electrically coupled to in the absence of the insulating material disposed between). This may reduce the size of the insulating layer while still electrically insulating the electronic components from any undesired external electrical charge.

In some embodiments, in the first device as described above, the housing module may be removably coupled to the first temple. That is, the structural member may comprise one of the temples of the frame. As used herein, "removably coupled" may refer to when the housing module (or another component) is not permanently coupled to the temple such that its removal would require altering the structure of the frame. For example, if the frame was molded around the housing module, then in some embodiments, the only way to remove the housing module may be to damage or permanently alter the structural component. As noted above, the housing module may be attached or coupled to the structural member in any suitable manner; however, it may be preferred that the housing module is removably coupled so as to provide greater flexibility in the fabrication process as well as adaptability in the field (i.e. in everyday use). In addition to the benefits noted above regarding the potential for increased efficiency in the fabrication process provided by manufacturing the housing module and the structural member (e.g. a temple) in a separate process (each of which may comprise a different material), embodiments may also provide the ability to exchange defective or obsolete electronics for new electronics (or electronics that provide a different functionality). For example, in some embodiments, the electronics module may be coupled to the housing module so that one need only coupled the housing module to the electronic frames to provide the electronic functionality (i.e. to couple the electronics to the frames). Similarly, the electronics may be removed by decoupling (i.e. removing) the housing module from the frames).

In this regard, in some embodiments, in the first device as described above, the housing module may be removably coupled to the first temple such that it is adapted to be removed and recoupled to the first temple. For instance, in some embodiments, it may be desirable to be able to remove the housing module, replace or adjust the electronic module that may be disposed therein, and then recouple the housing module to the structural member. By allowing for the housing module to be removed, this may provide a user with easier access to the electronics module, without the risk of damaging other portions of the electronic frames (such as the lenses) when removing (or adjusting) the electronics module from the housing module. In some embodiments, as noted above, the housing module may be removed and replaced with another housing module (which may or may not comprise a new electronics module).

In some embodiments, in the first device as described above, the electronics module may be removably coupled to the housing module. That is, similar to embodiments wherein the housing module is removably coupled to the structural member, the electronics module may be removably coupled to the housing module such that it may be removed without permanently altering the structure of the housing module and/or the structural member (e.g. a temple of the frames). This may allow for a replacement electronic module to be used (such as if one or more electronic components fail or otherwise does not function as desired) without requiring the purchase of a new device. In addition, embodiments may provide for a single device (e.g. a single model electronic spectacles or frames) to be used for multiple purposes, such as those described in detail below with regard to the various electronic components that such devices may comprise. That is, for example, in one instance the electronics module may comprise the components to function as a Fall Down Monitor. The electronics module may be removed and a new module may be coupled to the housing module such that in another instance the same electronic spectacles may function as a Step Counter and Timer (or may provide any other suitable function). Indeed, any electronic component (which may be contained within an electronics module) may be coupled or removed in this manner.

In this regard, in some embodiments, the electronics module may be adapted to be removed and recoupled to the housing module. In this manner, for instance, the components that are disposed within the electronics module may be replaced (for instance, the power source may be replaced, e.g. if the power source comprises used batteries, etc.), without purchasing an entire new electronics module (or otherwise replacing the other electronic components that may still function properly). A user may simply remove the electronics module, replace an electronic component (e.g. the power source such as one or more batteries) and recouple the electronics module to the housing module (that may, for instance, be still coupled to the electronic frames).

In some embodiments, in the first device as described above, the housing module may have a first end, a second end, and a body disposed between the first end and the second end. The first end may comprise an opening. The electronics module may be configured to be inserted into the opening. In some embodiments, the electronics module may have dimensions such that it is smaller than the opening, and therefore once inserted, it may be coupled to the housing module using a fastener such as an adhesive, a screw, or any other suitable means. In some embodiments the electronics module may be configured to be compressible in at least one direction (typically in the direction perpendicular to the direction the module may be inserted into the housing module). In this regard, the electronics module (or a portion thereof) may comprise a flexible material that may be deformed by the application of a force but may return to an original shape.

In some embodiments, the electronics module may be pressure fitted to the housing module. That is, for instance, the electronics module (or a component thereof) may expand into a section or portion of the housing module such that it locks into place (and may thereby be coupled to the housing module). In this regard, the housing module may comprise an opening for receiving the expanding portion of the electronics module. The electronics module may be removed by application of a similar force in the same direction on the expanding portion of the electronics module. An example of such an embodiment is illustrated and described with reference to FIGS. 26 and 27 herein. However, embodiments are not so limited and in some instances, the electronics module may be inserted into the opening in the end of the housing module with or without compression of a dimension (e.g. the electronics module may be inserted into the opening and coupled to the housing module using a fastener).

In some embodiments, the electronics module may be located within the body of the housing module. That is, for instance, the electronics module may be inserted through an opening of the housing module and then be disposed inside the housing module and may thereby be coupled to the frame. The housing module may serve to both couple the electronics module to the frame and to provide protection/electrical isolation of the electronics module (and/or components therein) from external forces. In this regard, in some embodiments, the housing module may comprise a non-conductive material such as nylon or carbon fiber. As noted above, this may prevent or inhibit an external electrical charge from affecting the operation of the electronics. In addition, the use of carbon fiber, plastics, etc. may be lighter than some other materials (such as some metals)—which may be another factor that may be considered given that the electronic spectacle frames may be worn by a user for extensive periods of time. However, embodiments are not so limited and the housing module may comprise a conductive material such as metal—which may provide in some instances greater protection from a physical force, additional support for other structural components, and/or may be less susceptible to deformation or damage.

In some embodiments, in the first device as described above, the structural member may comprise a cavity in the first temple and the housing module may be configured to be selectively placed within the cavity. As used herein "selectively placed" may refer to when the housing module is provided as a separate component (and thereby the electronics module may also be provided separately and disposed within the housing module) that may be later added to the temple, such as by "snapping" the housing module into the temple. In some embodiments, this may provide the advantage that the housing module may be designed and/or manufactured separately, and may be later placed within the temples of different style frames. However, "selective placement" may also involve a process by which the housing module may not be removably coupled (i.e. the housing module may be coupled to the structural member such that it may not be removed without damaging or permanently altering).

However, embodiments are not so limited, and the housing module may be selectively placed within a cavity so as to be removed there from. For instance, in some embodiments, the housing module may be coupled to the first temple using at least one of a fastening device (such as a screw) or an adhesive (such as a two face adhesive tape. In some embodiments, the housing module may be selectively removed. However, any suitable manner of coupling the housing module to the cavity in the temple may be used. In some embodiments, the housing module is pressure fitted to the cavity in the first temple. As used herein, "pressure fitted" may refer to, for example, when the housing module is snapped into the cavity. That is, the housing module may comprise a portion that may be reduced in size upon insertion, but may expand into a portion of the cavity of the temple such that it cannot be removed with a similar reduction in size. In this manner, the housing module may be removably coupled such that it may then be snapped in and out (i.e. coupled and uncoupled) by applying a similar force.

In addition, some embodiments in which the housing module is disposed within a cavity of the temple may provide some advantages. For instance, in some embodiments, the temple may comprise a plastic or nylon material. If the electronics module is directly inserted into the cavity, then material that comprises the temple may deform so as to conform to the shape of the electronics module. By utilizing a housing module, embodiments may provide additional support to the cavity so as to prevent the cavity from deforming. In some embodiments, where the temple comprises a conductive material such as a metal, the housing module may be inserted into the cavity so as to electrically isolate some, or all, of the electronics module from the temple. That is, for instance, the housing module may comprise an insulating material so as to limit the amount of current that may flow from the temple to the electronics module, which could affect the performance of such components and/or damage the components.

In some embodiments, in the first device as described above, the first lens may be electrically connected to the electronics module. That is, for instance, the first device may comprise a conductive path from the electronics module to the lens that is coupled to the lens housing. As noted above, the housing module (and thereby the electronics module that is housed therein) may be attached to any structural member of the device (e.g. a temple, the lens housing, etc). In embodiments where the lens housing is attached to one of the temples, the conductive path may comprise an embedded conductor (such as conductive compliant material) and/or a conductive path through a hinge to the lens housing). The lens may comprise any additional electronic components needed to provide a given functionality (such as varying the focal length of the electro-active lens, changing the tint of the lens, etc.).

In some embodiments, in the first device as described above where the first lens is electrically connected to the electronics module, the electronics module may comprise a controller that is configured to generate a time varying signal to supply to the first lens from the power source. That is, for instance, in some embodiments it may be preferred to supply an AC signal to one or more of the electronic components. This may, for instance, create a large peak to peak voltage (e.g. 20 volts) which, when coupled to an electro-active lens, may in turn provide for increased clarity (while potentially increasing power consumption and cost). In some embodiments, the sensing mechanism may be configured to provide an input to the controller for determining when to supply the time varying signal to the first lens. That is, for instance, the sensing module may be configured to receive an input (e.g. from user, such as by tilting the head or touching a switch), which then may be used to trigger the controller to supply the signal (such as an "on"-"off" switch) or to adjust the signal (e.g. adjusting the voltage, etc). In some embodiments, the power source comprises a battery. Generally, it may be preferred to use a simple power source given the relatively small area that may be available within the structural member (such as within the temple) and/or the housing module. However, it should be understood that any power source may be used. In some embodiments, the controller may
include firmware. While firmware may be preferred in some embodiments because it may reduce the space required by the controller, embodiments are not so limited and the controller may comprise any combination of software and firmware to provide a desired functionality. In some embodiments, the controller may include a voltage multiplier. The voltage multiplier maybe used in conjunction with a simpler (e.g. smaller) power source to provide a higher voltage while minimizing the space needed within the electronics module. However, embodiments need not utilize a voltage multiplier where the voltage (or the current) supplied by the power supply is sufficient. In some embodiments, the controller is configured to provide at least one of: a zero DC biased sine wave or a zero DC biased square wave to the first lens.

In some embodiments, in the first device as described above, the housing module may further include an aperture disposed on an outer side of the housing module. The "outer side" may refer to a side of the housing module that does not face toward a wearer's head (e.g. the side that faces away from the wearer's head). In this manner, and as noted above, the housing module need not fully encapsulate the entire electronic module. The aperture may provide an avenue in which a wearer may interact with the electronics module disposed therein. For instance, in some embodiments, the aperture may have an area that is approximately within the range of 1 $cm^2$ to 5 $cm^2$. While the size may vary based on the application and the use, this area is typically suitable to allow for a wearer to manually interact with the sensing mechanism. For instance, the sensing mechanism may comprise a touch sensitive switch exposed substantially through the aperture. As used herein, "touch sensitive" may including any switch that may be turned on or off by a wearer's touch. This may include, for example, a capacitance switch or a membrane switch. As used herein the touch switch may still be considered "exposed" even if a thin insulator layer is deposed over the touch sensitive component—it is still exposed to the extent that a wearer may interact with the touch sensitive switch. That is, the term "exposed" is used to refer to a configuration in which the touch sensitive switch is sufficiently not covered that it can respond to a user's touch. In this regard, in some embodiments, the use of a capacitance switch generally requires that the electrical charge generated by the interaction with the wearer be dissipated. Otherwise such devices may create a short situation, or may activate the electro-active lenses incorrectly. Therefore, embodiments may require the use of an insulator, particularly when the housing module and/or the structural member of the frame comprise a conductive material.

In some embodiments, in the first device as described above, the structural member includes the first temple of an electronic spectacle frame. That is, for instance, the housing module may be coupled to (e.g. attached to) the first temple or a portion thereof. This may for instance comprise embodiments where the housing module may be disposed in a cavity of the first temple, embodiments where the housing module may be attached to a portion of the temple (e.g. as an extension of the temple or attached to one of the surfaces of the temple), embodiments where the housing module may be coupled to the temple and may also be coupled to the lens housing, etc. As noted above, however, it may be preferred in some embodiments that the housing module coincides with the style (e.g. the aesthetics) of the frame (e.g. or a portion thereof, such as the appearance of a temple).

In some embodiments, the first temple of an electronic spectacle frame may include a first portion and a second portion. The first portion may be located closer to the first lens than the second portion, and the housing module may be attached to the first portion of the first temple. This may be preferred in some embodiments, as it may utilize a shorter conductive path from the electronics module to any electronics (including electro-active lenses) that may be located on the lens housing. In some embodiments, the housing module may be the first portion of the first temple. That is, for instance and as noted above, the housing module may be disposed between the lens housing and a portion of the temple, but may not be disposed within the temple (or within a cavity in the temple). The lens housing may be coupled to the temple in any suitable manner including, for instance, the use of a fastener (such as a screw) or adhesive. In addition, in some embodiments, each of the lens housing and the temple may comprise a structural component or components such that the two components may be connected to one another. Some embodiments may provide advantages such as, for instance, allowing the manufacture of the electronics module separate from the temple and/or the lens housing (because the housing module may be subsequently coupled to these components). In addition, some embodiments may permit the fabrication of the temple without the creation of a cavity (or other components for disposing the housing module and/or electronics module there within), which may result in more structural stability for the frame component.

In some embodiments, in the first device as described above, the housing module may comprise a conductive material such as, for instance, a metal or a compliant conductive material. As noted above, in some embodiments when the housing module comprises a conductive material, the first device may further include an insulating material disposed between the housing module and the electronics module. As noted above, "disposed between" may refer to a configuration in which the insulating layer electrically isolates the housing module from the electronics module (and/or the electronic components disposed within the electronics module).

As noted above, in some embodiments, when the housing module comprises a conductive material, there may be an increased risk of shorting to the electronic components. In addition, in some embodiments that may use a sensing mechanism such as a touch switch (e.g. a capacitive switch), a charge may be generated by the user when activating the switch that may not dissipate if the housing module comprises a conductive material (e.g. the charge could be stored on the housing module). This could result in the sensing module (or other component) receiving signals that the wearer does not intend, which may alter the functionality of the electronic components of the device.

In some embodiments, in the first device as described above, the housing module may comprise a non-conductive material. For instance, the housing module may comprise a plastic (such as acetate) or nylon. This may be preferred in some embodiments because it may not require an additional insulator between the electronics module and the housing module. In some embodiments, the structural member may also comprise a non-conductive material. That is, for instance, both the housing module and the structural member may both comprise a non-conductive material. This may be preferred in some embodiments because it may be more readily achievable to electrically isolate one or more conductive paths from the electronics module to one or more other electronic components disposed on the frame of the electronic spectacles. In some embodiments, the structural member may comprise any one of, or some combination of: a plastic or nylon. In some embodiments, the structural member comprises acetate. Acetate may be preferred in some embodiments as it is a common material used in the manufacture of frames. However, as noted above, embedding electronics within an acetate frame without the additional support provided by a housing module may result in deformation of the structural member. It should be understood that any suitable non-conductive material may be used for either the structural member and or the housing module.

In some embodiments, in the first device as described above where the housing module may comprise a non-conductive material, the structural member may comprise a conductive material. That is, the housing module may comprise a material such as plastic (e.g. acetate), nylon, etc., and the structural member that is coupled to the housing module may comprise a material such as a metal. The housing module may be configured or positioned so as to electrically isolate the electronics module (and/or the electronic components disposed within the electronics module) from the structural member (and the frame). That is, for instance, the housing module may be disposed within a cavity of the structural member, and the electronics module may be disposed within the housing module. The housing module may substantially house or encapsulate the electronics module (or at least the portions of the electronics module that could be electrically connected to the structural member or another portion of the frame) so as to electrically isolate the two components from one another. In some embodiments, the housing module and/or the structural member may have one or more apertures such that a wearer may interact with the electronics module (e.g. through a sensing mechanism such as a touch sensitive switch). In some embodiments, the housing module may not be disposed with the structural member, but may, for instance, be coupled thereto (e.g. to a portion thereof). The electronics module may be disposed with the housing module such that it is electrically isolated from the structural member by the housing module that comprises a non-conductive material. In this manner, embodiments may reduce the risk of shorting issues for the electronics module, and potentially increase the performance and responsiveness of the electronics module (including embodiments where, for instance, a touch sensitive switch that may produce a charge is to be dissipated).

In some embodiments, in the first device as described above where the housing module may comprise a non-conductive material, the electronics module may comprise a conductive material. As noted above, it may be beneficial in some embodiments to use a conductive material for the electronics module for manufacturing and/or durability purposes. However, embodiments are not so limited and in some instances, both the housing module and the electronics module may comprise a non-conductive material (such as an insulating material).

In some embodiments, in the first device as described above where the housing module comprises non-conductive material, the first device may further include a first lens having a first electrical contact and a conductive path in electrical contact with the first electrical contact of the first lens (e.g. electrically coupled). The electronics module may also have a first electrical contact. The conductive path may be electrically coupled to the first electrical contact of the electronics module. In this manner, embodiments may provide a conductive path between the
electronics module and an electro-active lens. The electronics module may comprise electronic components for controlling some of the functionality of the lens (e.g. by varying the focal length, the tint, providing shutter effects, etc.) and may be controlled by the sensing module (such as by using the touch of a wearer or the tilt of his head, etc.). In some embodiments, the conductive path may include at least one pogo pin. A pogo pin may be used to maintain the electrical path, even if, for instance, the temple does not form a right angle with the housing, or if some other factor causes the conductive path between the lens housing and the electronics module to increase in size. In some embodiments, the conductive path may include a spring hinge. A spring hinge may be preferred in some embodiments because it may be used to hold electronic frames tight against a wearer's head. By utilizing a conductive path through the spring hinge, embodiments may provide for a conductive path despite the changing angle between the lens housing and the temple. In some embodiments, the conductive path may include a compliant conductive element. As noted above, the compliant conductive element may be used to form robust electrical connections with the electro-active lenses. Moreover, it may be readily applied within small areas and in prefabricated designs, as necessary.

In some embodiments, in the first device as described above, the housing module may have a thickness that is less than or equal to approximately 0.7 mm. As used herein, the "thickness" of the housing module may refer to the dimension of one of the sides of the housing module in a direction that is perpendicular to the electronics module. The inventors have found that generally, the performance of many sensing mechanisms (such as touch switches) begins to degrade at thicknesses of the housing module that are greater than 0.7 mm. For example, the thickness of the capacitance switch may be partly predicated on the thickness of the lens housing, as it may protrude out of the housing module so as to be available to a wearer to swipe. In addition, the smaller the thickness of the housing module, the greater the area potentially available for the electronics module. This may allow for more advanced electronics to be provided, and/or more electronic components (e.g. a bigger electronics housing module). However, the decreased thickness may weaken the structural support of the housing module and/or decrease its insulation properties (when it does not comprise a conductive material). The inventors have found that, in some embodiments, the housing module may have a thickness that is less than or equal to approximately 0.5 mm. In some embodiments, the housing module may have a thickness that is less than or equal to approximately 0.3 mm.

In some embodiments, a first method of fabricating a device may also be provided. The method may include fabricating or manufacturing a frame having a first temple, a second temple, and a housing module that includes a first end, a second end, a body disposed between the first and second end, and a cavity disposed within the body. That is, for instance, the method may be applied to electronic spectacles that may comprise a housing module that has an area in which the electronics module may be located in (e.g. a cavity). An example of such embodiments is shown in FIG. 16. The first end may include an opening. The first method may further comprise inserting an electronics module (or electronic components) into the opening of the housing module such that the electronics module may be disposed in the cavity of the housing module.

As noted above, utilizing such a method of fabricating a device by inserting the electronics module through an opening in the end of the housing module may be both an efficient manner of disposing the electronics module into the housing module (and thereby coupling the electronics to the frame), and may also serve to protect the electronics as, for example, less of the electronics module may be exposed to direct physical force—particularly when the frames are in use as the opening may be covered by other components (such as the lens housing).

In some embodiments, the first method as described above may further comprise removing the electronics module (i.e. a first electronics module) from the cavity through the opening of the housing module (and/or temple), and inserting an electronics module (i.e. a second electronics module) into the opening of the housing module such that the second housing module is disposed in the cavity of the housing module. In this manner, in some embodiments, the electronics module may be removed and replaced with a new electronics module that may comprise electronics that provide different functionality (thereby providing increased flexibility and functionality for the same electronic frames) or may be used to replace defective or depleted electronics (such as when a power source is drained). In this regard, in some embodiments, the first electronics module and the second electronics module may be different electronics modules. However, embodiments are not so limited, and in some instances, the first electronics module and the second electronics module may be the same electronics module (e.g. they are the same module or they comprise the same components). As noted above, some embodiments may provide the advantage of being able to replace components within an electronics module, without replacing the entire module. Moreover, by using a method of removing and inserting the module thought the opening in the end of the housing module, embodiments may provide a fast and easier way of accessing and changing the electronic components as opposed to embodiments that may require applying an adhesive and/or fastener to the electronics module.

A second method may also be provided. The second method may comprise a method of manufacturing (e.g. fabricating) a device that includes a frame having a first temple and second temple. The first temple may include a first end; a second end, a body disposed between the first and second end; and a cavity disposed within the body. The first end may include an opening. The first method may further comprise the steps of inserting an electronics module into a housing module and inserting the housing module into the opening of the temple such that the housing module is disposed in the cavity of the first temple. As noted above, inserting the housing module into the cavity through an opening may be an efficient manner of coupling the housing module and/or the electronics module to the structural member (in this case the temple), particularly when the housing module may be pressure fitted so as to snap into place when it is inserted in one end of the temple. This provides the advantage of not necessarily requiring a fastener (such as a screw) or adhesive to couple the housing module to the temple (which may make removal of the housing module and/or recoupling more readily achievable).

In addition, sliding the housing module into the temple through an end (rather than directly into the body) may be more efficient because it allows for the housing module and/or the electronics module to compress as necessary in the vertical direction (i.e. the direction perpendicular to the body of the temple). In addition, inserting the housing module into one end of the structural member may provide an efficient manner of replacing the housing module (and/or an electronics module that may be disposed within the housing module) in an electronic spectacle frame.

In some embodiments, the first method as described above may further comprise removing the housing module from the first cavity through the opening of the temple, and inserting a second housing module into the opening of the temple such that the housing module is disposed in the cavity of the first temple. Removing the housing module may provide ready access to the electronics module disposed therein. It may also provide for efficient replacement of the components. In some embodiments, the housing module and the second housing module are the same housing module. That is, as noted above in some embodiments, this method may be used to simply replace some of the electronics components that may comprise the electronics module or may replace the electronics module itself. The housing module may thereby not need to be replaced, and may be reattached to the structural member (e.g. a temple or cavity therein)
and include a new or revised electronics module located therein. Thus, in some embodiments, where the electronics module (or electronic components) is removed with the housing module, a second electronics module (or electronic components) may be inserted into the cavity in conjunction with the second housing module. However, embodiments are not so limited, and thereby in some embodiments, the housing module and the second housing module may be different housing modules. This exemplary method may be used in some situations where the housing module may be required to be replaced (e.g. if it was damaged or defective) or for instances when the electronics module and the housing module are coupled in such a way that they may not be readily coupled and recoupled, and the electronics module is to be replaced. In this regard, in some embodiments, the electronics module (or electronic components) may be removed with the housing module.

In some embodiments, the first method as described above may further include removing the housing module from the first cavity through the opening of the temple without removing the electronics module. That is, for instance, the electrics module may be disposed (e.g. located) within the housing module, but need not be coupled thereto. The housing module may provide structural support to the portions of the structural member located near or around the electronics module. The housing module may be removed and replaced if, for instance, it is damaged. In some instances, it may be removed and replaced for aesthetic regions (e.g. the wearer changes the style of the frames and/or other components of the frame).

In some embodiments, in the first method as described above, the step of inserting the electronics module into the housing module may include coupling the housing module to the electronics module. In some embodiments, in the first method as described above, the housing module may be inserted into the opening of the temple prior to the electronics module being inserted in the housing module. An electronics module may then be inserted into the housing module. In this manner, each component may be manufactured and assembled in different stages.

Although described above, FIGS. 16 and 17 will now be described in more detail. FIG. 16 illustrates an exemplary embodiment of an electronic frame that comprises a housing module 1603. A core element 1601 may be provided, which may in some embodiments comprise a conductive material (such as steel) and may be coupled to or disposed within the temple 1602 soar to provide a portion of a conductive path from one component to another and/or structural
support for the temple. As shown, the core element 1601 may, for instance, provide a conductive path from the temple end (which may comprise, e.g., a power source) to the electronics module 1605. A housing module 1603 is shown, which may house (e.g. contain) the electronics module 1605 and be coupled to the temple 1602. In some embodiments, the housing module 1603 may comprise a conductive material (e.g. metal). However, as noted above in some instances, the inventors have found that the use of a conductive material for the housing module 1603 may affect (or interfere with) the electronic components (e.g. in the electronics module 1605) and/or the functioning of a sensing component or mechanism (such as a switch 1604, which may comprise a capacitive switch). Therefore, in some embodiments, an insulating material may be disposed between the housing module 1603 and any electronic components of the electronic frames (e.g. the electronics module 1605). In addition, in some embodiments, an insulating material may be disposed between the housing module 1603 and sensing component (e.g. a capacitive touch switch 1604) so as to dissipate any electrical charge that may be generated and/or stored therein (or otherwise insulate the electronics from the charge). This may prevent an electrical charge from affecting the electronics, which could lead to unpredictable behavior (e.g. activation/deactivation of the electronics when not desired or signaled) or damage to the components.

In some embodiments, the housing module 1603 may comprise a portion of the temple 1602. That is, for instance and as shown in FIG. 16, the housing module may be disposed between a portion of the temple 1602 and the lens housing. This may be preferred in some embodiments because it may allow for each component to be manufactured in separate processes and then assembled at a later point in time. The housing module 1603 and another portion of the temple (e.g. the end portion of the temple 1602) and/or the lens housing may be attached in any suitable manner. As shown in the exemplary embodiment in FIG. 16, the core 1601 may be common to at least a part of the temple 1602 and the housing module 1603 so as to couple the components. In addition, in some embodiments, A switch 1604 (such as a capacitance or "cap" switch) is shown, which may be coupled to the electronics module 1605 and/or the electronics module housing 1603 to provide a switch or control for the electronics module 1605. For instance, and as shown in FIG. 16, the electronics module housing 1603 may have an opening that may allow a wearer to interact with switch 1604 so as to turn a function on or off, or to otherwise vary the functions provided by an electronic spectacle. The electronics module 1605, the switch 1604, and the electronics module housing 1603 may be coupled using any suitable manner, including one or more screws as shown in FIG. 16. As noted above, other methods may also be used, such as pressure fitting one or more components as described with reference to FIGS. 26 and 27 below. One or more conductors 1606 may also be included to provide one or more electrical contacts (e.g. conductive paths) from the electronics module 1605 to the lens housing. The conductors 1606 could, for instance, electrically connect to the one or more conductive paths provided by compliant conductive element 1401 shown in FIGS. 14 and 15. A hinge 1607 is also shown, which may be coupled to the temple 1602 or a component thereof (such as the housing module 1603) and also to the lens housing. The hinge 1607 may provide the capability for each of these components to move relative to the other while remaining coupled. In some embodiments, the hinge 1607 may comprise one or more conductors, or may itself comprise conductive material so as to form a conductive path or portion thereof.

FIG. 17 illustrates the components shown in FIG. 16 coupled together in an exemplary embodiment. As can be seen, the conductive compliant element 1601 is no longer visible as it is embedded within the temple 1602. Similarly, the electronics module 1605 is housed within the housing module 1603 and covered (and likely coupled to) on one side by the switch 1604. In this regard, the housing module may be considered to comprise the switch, even though it may not be contained within the module itself. The hinge 1607 is coupled to the electronics module housing 1603. The conductors 1606 may be embedded substantially within portions of the hinge 1607 and/or electronics module housing 1603 so as to form a portion of a conductive path between the electronics module 1604 and the lens housing.

Figure 26:
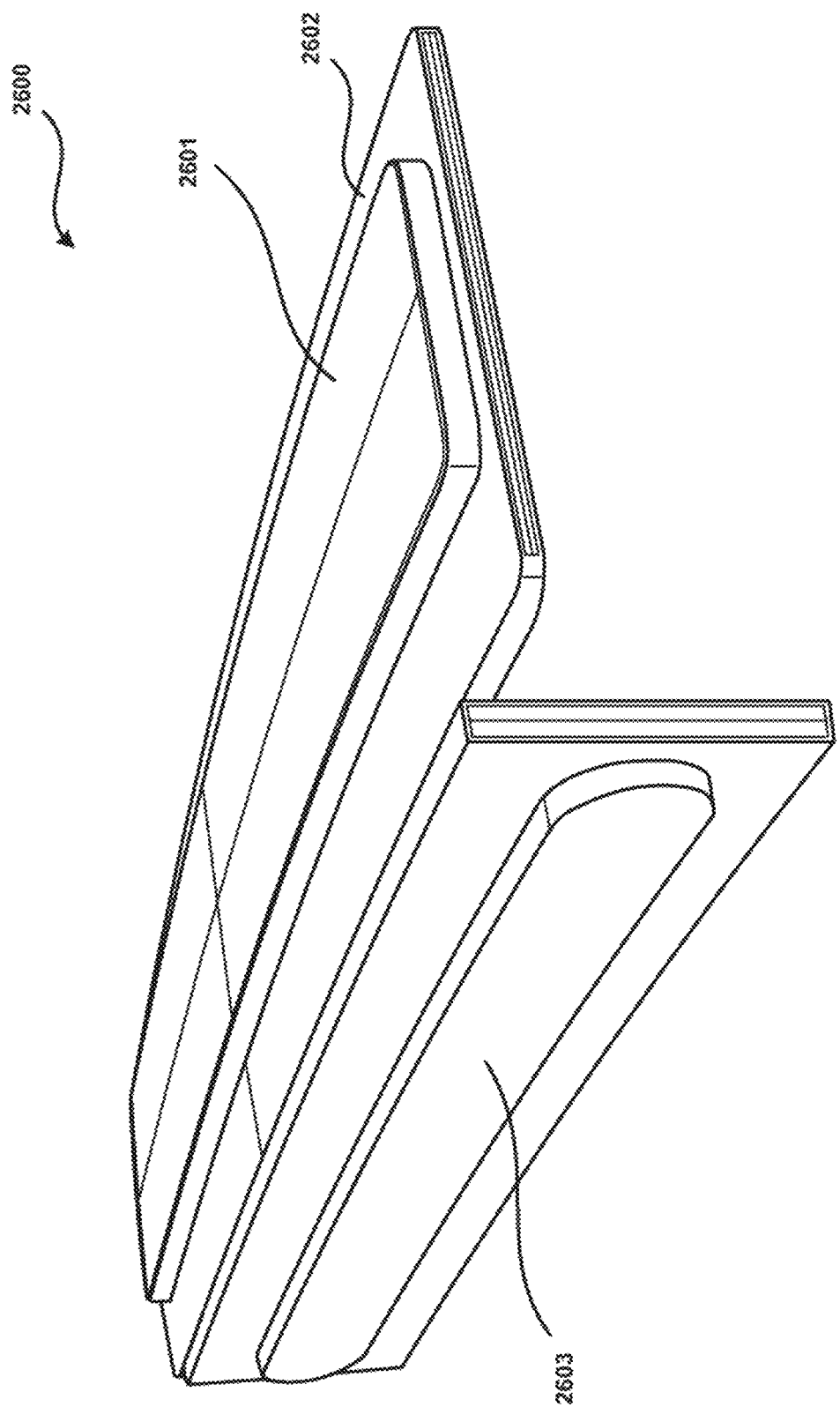
FIG. 26 shows an exemplary embodiment of a sensing mechanism in accordance with some embodiments.

With reference to FIG. 26 an exemplary embodiment of a touch switch 2600 is show in accordance with some embodiments. As shown, the touch switch 2600 may comprise one or more sections (2601 and 2603) that are raised or elevated (i.e. extend out from) the remaining structure of the touch switch 2602. These portions 2601 and 2603 may extend out of one or more apertures in the housing module so that a wearer may interact with the touch switch to send a control signal to the electronics therein. As noted above, in some embodiments the thickness of the housing module may be preferably less than 0.7 mm thick, so that the touch switch may protrude out of the aperture and still effectively react to signals provided by the swipe of a wearer's finger. In some embodiments, the touch switch may comprise the portions labeled as
2601 and 2603, and the electronics module may comprise the portions 2602 (i.e. the touch switch may form one or more surfaces of the electronics module, or be directly coupled thereto). In addition, in some embodiments, the touch switch 2600 may form a portion of a pressure fitted electronics module that may be inserted into the housing module (e.g. through an opening in one of the ends) by being compressed in one more dimensions. When the electronics module is then inserted so as to be disposed within the housing module, the portions of the electronics module that were compressed may expand and "snap" into place (i.e. the portions be structurally coupled to the housing module). For instance, when the electronics module comprising the touch switch 2600 is inserted into a housing module, the portions 2601 and/or 2603 may extend into one or more apertures of the housing module. Once this occurs, the electronics module may be coupled to the housing module such that an inward force is applied to the portions 2601 and 2603 prior to removing the electronics module.

With reference to FIG. 27, an exemplary housing module 2701 is shown comprising an electronics module disposed therein. The exemplary housing module 2701 is shown as having an opening 2702 in one end in which the electronics module may be selectively inserted. That is, for instance, the electronics module may be inserted in the opening 2702 and slid into the housing module 2701 so as to be disposed with the body of the housing module 2701 (e.g. within a cavity). In some embodiments, the electronics module may be pressure fitted, such that when the electronics module is inserted into the opening 2702 and is sufficiently disposed in the housing module 2701, the portions 2703 of the electronics module may extend into the apertures of the housing module 2701 and snap into place. The portions 2703 of the electronics module may in some embodiments comprise a touch sensitive switch (such as a capacitive or membrane switch), but embodiments are not so limited. For instance, portions 2703 may comprise any portion of the electronics module. In addition, an optional screw 2704 or other fastener may be used to couple the housing module 2701 to another structural member of the electronic spectacle frames (e.g. to a temple). In some embodiments, a fastener (such as screw 2704) may be used to couple the electronics module to the housing module 2701 (that is, for instance, a portion of the electronics module may extend into the housing module 2701 such that the screw 2704 could couple the two components together). In some embodiments, the use of a fastener may be in addition to a pressure fitted component (although it may be preferred to use a fastener when the electronics module is not pressure fitted so to prevent the electronics module form being removed from the housing module 2701 inadvertently. In addition, FIG. 27 shows an embodiment whereby a hinge 2705 is coupled to the housing module 2701 which may be used to couple the housing module 2701 to another structural member of the frame, such as the lens housing.

In some embodiments, a housing module as defined above may be used to cover or encapsulate portions of the electronics module. Some embodiments may serve several purposes, including for example, electrically isolating the electronics module from the electronic frames, from external components and forces, or both. In addition, in some embodiments, the housing module may secure the electronics module to the electronic spectacle frames. Embodiments may also provide the advantage of allowing the electronics module to be selectively placed into (i.e. attached or coupled to) and selectively removed from a structural member (such as the temple of the frames) of an electronic spectacle frame. In this manner, embodiments may provide the ability to change electronics modules quickly and efficiently.

Embodiments Comprising a Façade

As used herein, the term "façade" may refer to an element of an electronic frame that may be attached to any portion of the frame, but preferably is attached to the "front" of the frames (e.g. the lens housing) that faces in the direction of a wearer's gaze. That is, the façade may typically be located on the frames so to be the farthest component away from the wearer's face. The façade is generally designed to not serve any structural or functional purpose (e.g. it does not itself house the lenses), but is provided for aesthetic reasons. The façade may be decorative, and may mask or hide some of the functional components of the electronic spectacles, such as one or more conductive paths between electronic components. In general, it may be preferred that the lens housing may comprise a frame design that is less than or equal to the appearance provided by the façade. That is, for instance, in some embodiments, the façade may present the appearance of a full rimmed frame design on rimless or semi-rimless spectacles, or the façade may present a semi-rimless appearance for rimless spectacles. However, embodiments are not so limited and any style façade may be used on any type of lens housing.

Spectacle frames may provide both functional and aesthetic value to a wearer. As noted above, spectacle frames are often stylistic and it is generally desirable that they have an appearance that the wearer deems appropriate. In this regard, in some instances, the electronic components of electronic spectacles may generally be noticeable and/or may add additional structural components to a device. Thus, it may be preferred that these components be concealed or otherwise hidden from outside observers, while maintaining the aesthetics and functionality of the electronic spectacles. In some instances, this may be done by utilizing the structural components of the eyeglasses (e.g. by embedding components in a temple of the frame); however, this may not always be possible and/or may not be suitable for other portions of the frames, such as for components on the lens housing. Such approaches may also increase the cost and complexity of manufacturing the electronic frames, and may, in some instances, affect the structural integrity of the frames (e.g. the structural members may not be as robust and may not be capable of withstanding the same amount of force as regular frames without breaking).

Moreover, embedding electronic components in the frame may make access and/or maintenance of the components more difficult. In some instances, it may be desirable that a single electronic frame is capable of use for multiple functions, and thereby electronic components may need to be changed or replaced with other components without needing extensive fabrication or damaging the electronic frames.

In some embodiments, a façade may be provided that may be used to both provide aesthetic value and/or to hide or conceal non-aesthetically pleasing components, such as those that are associated with electronic components. In addition, in some embodiments, the façade may be a separate component that can attach to a structural member (such as the lens housing or the temples) and may thereby be manufactured in a different process than the other components of the electronic frames. In some instances, a single style or type of façade may be used for multiple types of electronic frames, which may thereby reduce manufacturing costs.

Furthermore, in some embodiments and described in more detail below, the façade may be detachable (and/or re-attachable) such that one façade may be replaced with another for an electronic frame. In this manner, for instance, a user may change the appearance of the electronic frames without changing (or damaging) the underlying frames or components therein. This may essentially provide the user with the ability to have different style frames (or the appearance of different style frames) by simply replacing the façade that is attached to the lens housing or other structural member.

Moreover, in some instances, the use of a façade may reduce the costs and complexity of manufacturing electronic spectacles frames, and in some embodiments, may reduce the complexity and fabrication of forming the electrical connections to electro-active lenses (or other electronic components). For instance, in some embodiments, a conductive path from an electronic component (such as a power source, controller, and/or other components which may, for instance, be disposed in an electronics module) may be partially exposed after manufacturing. A façade may be used to both conceal this part of the conductive path, and also to protect and insulate the path from external forces. In this manner, in some embodiments, the conductive path (or a portion thereof) need not be embedded or manufactured directly into the electronic spectacle frames. Furthermore, it may be less complex to form such connections, particularly on rimless or semi-rimless frame designs, but for stylistic purposes, a wearer may desire a semi-rimless or full rimmed design, respectively. A façade may be used in such instances to provide the appearance of a different style frame, while allowing for spectacle frames that provide the functional and/or structural benefits of a different style frame.

Exemplary Embodiments of Electronic Spectacle Frames Comprising a Façade

Provided below are further exemplary embodiments of electronic frames. These examples are provided for illustration purposes only. In addition, a person of ordinary skill in the art after reading this disclosure may understand that various combinations of components discussed above or below may be made. In this regard, embodiments may provide electronic frames that comprise a façade.

Figure 28:
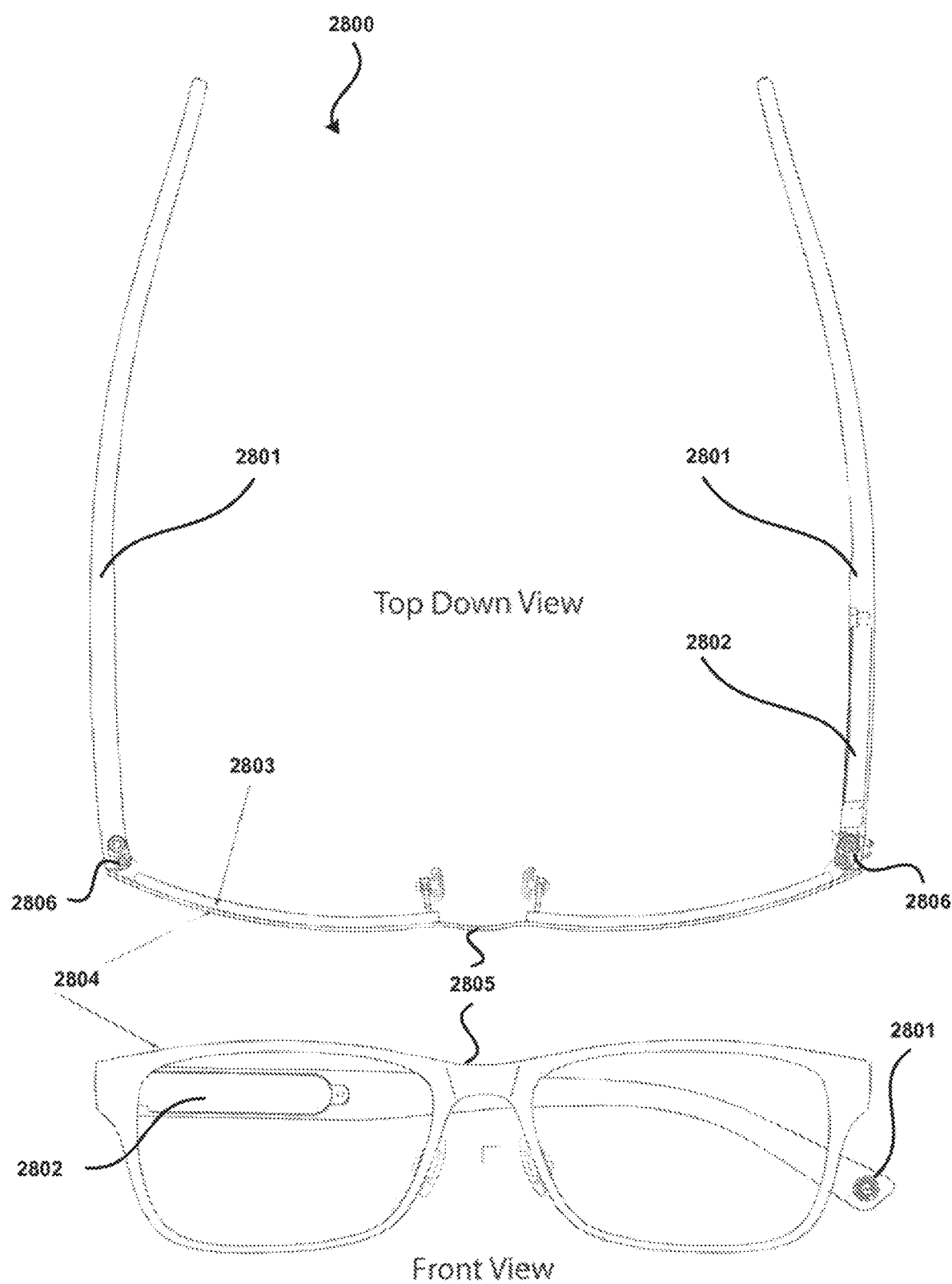
FIG. 28 shows a top view and a front view of an exemplary embodiment of an electronic frame comprising a façade in accordance with some embodiments.
Figure 29:
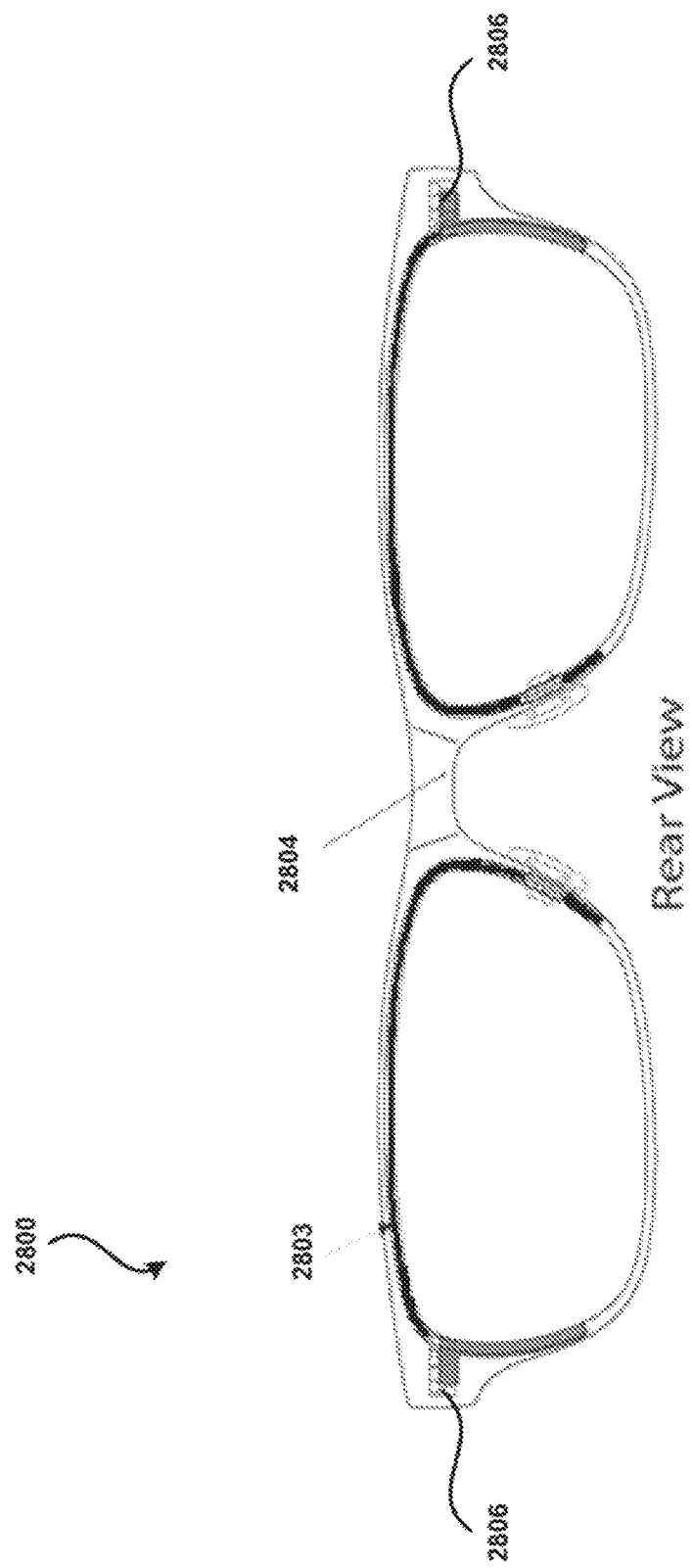
FIG. 29 shows a rear view of an exemplary embodiment of an electronic frame comprising a façade in accordance with some embodiments.

A first device may be provided that comprises eyeglasses, where the eyeglasses may further include a lens housing and a first and a second temple coupled to the lens housing. The lens housing may support a first and a second lens (or other optics). The first and second lens may be electro-active lenses; however, embodiments are not so limited. The first device may further include a façade that covers the lens housing. The term "covers" as used herein may refer to when the façade provides aesthetic value while obscuring at least a part of the lens housing from view. However, the façade need not encapsulate the lens housing or surround the entire lens housing to "cover" it, but rather the façade obscures the lens housing (or portions thereof) from a viewer (typically from a frontal view). That is, and as described above, the façade may be provided for cosmetic reasons and may cover, for instance, the front of the lens housing (i.e. the portion of the lens housing that faces away from the wearer); however, embodiments are not so limited as the façade may be located on any part of the frame. Examples of embodiments comprising a façade are shown in FIGS. 28 and 29 and described in detail below.

The first device may further include an electronic component, and at least one conductive path may be provided from the electronic component to the first lens having a portion that runs through the lens housing. As used in this context, the term "runs through" may refer to when a conductor (such as a wire or conductive rubber) may be disposed within (or coupled to) the lens housing, or that the lens housing (or a component thereof) may itself be conductive. As noted above, an electronic component may comprise any electrical device or component thereof, which may in some embodiments include an electronics module (as described above). For instance, an electronic component may comprise a power source such that the first conductive path may drive current or voltage from the electronic component (e.g. a battery) to the first lens or any other component. The electronic component may also comprise any other component of an electronics module, such as a controller and/or sensor mechanism. The electronic component or components may provide some of the functionality of the electronic spectacle frames, while the façade may provide or enhance the aesthetic value and appearance of those same frames.

Some embodiments may thereby provide the advantages of the functionality of electronic spectacle frames with a desired aesthetic appearance. For instance, by utilizing a façade, embodiments may provide rimless or semi-rimless electronic spectacle frames that appear as semi-rimless or full rimmed frames. In this manner, some embodiments may provide the advantages associated with a semi-rimless or rimless design (e.g. in some instances, more accessibility to electronic components or electrical paths provided therein, less materials required to fabricate a lens housing, etc.) with the aesthetics of other frame designs (e.g. the façade could give the appearance of a metal or plastic (such as zyle style) front while the frames comprise a semi-rimless or rimless design behind the façade). In some instances, the use of a façade may provide the wearer with the ability to use different façades (and thereby give the appearance of different frame designs) while utilizing the same base electronic frames. That is, for instance, a wearer may be provided with the ability to change the appearance of frame style and design without having to purchase multiple (and potentially expensive) electronic frames. In some instances, the façade may hide or conceal portions of the conductive path. In this manner, it maybe possible to use less desirable materials (e.g. materials with distinct and conspicuous colors) that may be less expensive and/or easier to use to fabricate the electronic frames without sacrificing the aesthetic value of the lens. By concealing such undesirable components, the façade may thereby provide additional choices for components, as well as the location of the components. For instance, rather than requiring that the conductive path be completely or substantially embedded within the lens housing (or another structural member), embodiments that utilize a façade may locate these components in locations that might otherwise be visible but—for the façade concealing those portions. In this regard, in some embodiments, the use of a façade may permit fabrication of portions of the electronic frame (such as the lens housing) using components that may be less expensive than other, more desirable components (or may allow for the use of a smaller amount of those components), while still giving the appearance that the frames comprise the more desirable material. It should be understood that these advantages are purely exemplary and are not meant to be limiting.

In general, the electronic component (or components) in the first device as described above that comprises a façade may be located in any suitable location on the electronic frames. For instance, the electronic component (which may be included within an electronics module) may be coupled to the first temple. Locating the electronic component on the temple may be advantageous in some embodiments as it may provide a relatively large amount of space to dispose such components in a location that may not be readily apparent to an observer. In comparison, for instance, locating electronic components on the lens housing may be more apparent to an observer. However, embodiments are not so Limited and in some embodiments, the electronic component (or components) may be coupled to the lens housing. This may provide, in some instances, an advantage in that a conductive path may not need to be provided from the temple to the lens housing (or to an electro-active lens). In addition, in some instances, the façade may be disposed so as to cover or conceal the electronic component from an observer, whether the component is located on the lens housing or on the temple.

In some embodiments, in the first device as described above that comprises a facade, at least one conductive path may be provided from the electronic component to the second lens having a portion that runs through the lens housing. That is, for instance, in some embodiments, an electronic component (or components) may be electrically connected to both the first lens and the second lens (and the first and second lens may be electro-active lenses). In this manner, a single electronic component (such as a power source, controller, etc.) may provide functionality to both lenses, and thereby reduce the number of electronic components that may need to be located on the electronic frame. The conductive path may be provided by the lens housing, through the lens housing (e.g. by an embedded conductive element), and/or by a conductive element coupled to the lens housing. The façade may cover some, or all, of the conductive path provided to the second lens.

As noted above, in some embodiments, in the first device as described above, the façade may cover a portion of the lens housing. That is, the façade need not necessarily cover the entire lens housing of the electronic frames. In some embodiments, the façade is coupled electronic frames so as to cover only the front of the lens housing, which is often the portion of the lens housing that is most conspicuous to an observer. The façade may be coupled to the front of the housing using any suitable means, including by way of example only, an adhesive (e.g. double sided tape), a fastener (such as a screw), or the lens housing may be structurally configured so as to receive and couple to the façade. For instance, the lens housing may comprise a slot or recess, and the façade may comprise a corresponding structural component that may be inserted into the slot or recess and thereby couple the two components (or vice versa). However, any suitable means of coupling the components may be used. For instance, in some embodiments, the façade (or a component thereof) may be pressure fitted so as to be inserted into an opening of the lens housing, and expand (i.e. "snap" into place) so as to couple the two devices together.

Moreover, in some embodiments, the façade may only cover the top portion of the lens housing (such as if one or more electronic components are located on the top portion of the lens housing, and it is desirable to conceal or cover just those components). In some embodiments (for instance, in semi-rimless frame embodiments), the façade may only cover the portion of the lens housing that does not comprise eye-wire, and may thereby give the appearance of a full rimmed spectacle frame. The use of the term "appearance" in this context may generally refer to the perception of the components that an observer may have when viewing the first device or a portion thereof. Similarly, in some embodiments, such as when the electronic frame comprises a rimless design, the façade may provide the appearance of semi-rimless spectacle frames, and may thereby only be required to cover a corresponding portion of the rimless frames. Indeed, in general and as noted above, it may not be necessary in some embodiments for the façade to cover the portions of the lens housing that may be less conspicuous to an observer (such as the back of the lens housing). However, embodiments are not so limited, and in some instances, in the first device as described above, the façade covers the entire lens housing. This may be advantageous in that the façade may provide a desired stylistic appearance no matter the angle that an observer is viewing the device from. However, providing a façade that covers all or substantially all of the lens housing may increase the cost and complexity of the façade, including in some instances, making it difficult to couple and decouple the façade to the electronic frames.

In some embodiments, in the first device as described above that comprises a façade, the lens housing may comprise rimless or semi-rimless spectacle frames. In this regard, the lens housing may include in some embodiments at least one of: one or more screws (e.g. rimless frame designs) or rim wire (e.g. semi-rimless or full rimmed designs). As was described above, the façade may provide the appearance that rimless frames (e.g. rims that do not comprise eye-wire and/or have a lens housing that comprises one or more screws that couple the lenses to the temples) are semi-rimless or full rimmed spectacle frames. Similarly, in some embodiments, the façade may provide the appearance that semi-rimless frames (e.g. rims that comprise eye-wire around some but not all of the outer edge of the lenses) are full rimmed spectacle frames. This may, for instance, provide an appearance that is desired for the wearer, while requiring less materials to manufacture the electronic frames, and may permit the use of materials that may be more functional but less suitable for a style or aesthetics (because the façade may cover the components), etc. In some embodiments, the façade may even be used to cover portions of a full rimmed electronic frame. This may be the case, for instance, if the full rim design uses components that are not aesthetically pleasing (but may be suitable for use in electronic spectacles, such as if the components of the frame comprise conductive materials). The façade may be used to cover such non-appealing features, and also serve to cover electrical connections between components. In addition, the use of the façade may permit the style of the full rimmed spectacles to be changed, without necessarily requiring the purchase of new electronic frames or significant portions thereof.

Therefore, as noted above, although in general the façade may be utilized to provide the appearance of spectacles as having a design that utilizes more frame, embodiments are not so limited. For example, in some embodiments, the façade may provide the appearance of full-rimmed frames on spectacles where the lens housing also comprises a full-rimmed frame design. In some embodiments, the lens housing may comprise a semi-rimless design, and the façade may also provide the appearance of a semi-rimless design. In some embodiments, the lens housing may comprise a rimless design, and the façade may provide the appearance of a rimless spectacle frame. Such embodiments may enable the use to customize and/or change the appearance of the lens housing, while still maintaining the frame design features. That is, for instance, the façade may comprise a different color, design, material, and/or otherwise provide a different appearance. Moreover, the façade may also be used to hide or cover one or more conductive paths (or electronic components) that may otherwise be visible (or exposed) in such embodiments.

In some embodiments, in the first device as described above that comprises a facade, the façade may mask a conductive path. The use of the term "masks" in this context may refer to when the façade conceals or otherwise makes it difficult to view the masked object (in this case, the conductive path or a portion thereof). "Masking" may comprise, for instance, covering all or substantially all of a component (e.g. part of the components that comprise a conductive path), or only those components that are exposed or capable be being seen by an observer. As was noted above, the conductive path may comprise any type of conductive material, including by way of example a conductive wire (or other conductive material, such as a conductive compliant material described above) coupled to or embedded within (or substantially within) the lens housing. The façade may be disposed so as to cover the portions of the conductive material that are exposed or would otherwise be visible. For instance, if the conductive path comprises a wire that is attached to the lens housing (e.g. on an external surface), the façade may be disposed so that the conductor is not perceivable by an outside observer of the electronic frame. In some embodiments, particularly in embodiments comprising rimless or semi-rimless frames, it may be preferred that the conductive path comprises a conductive compliant material (e.g. conductive rubber), as it may, for instance, be readily disposed within a groove of the lens and/or the lens housing. However, this material may comprise a conspicuous color, shape, and/or appearance.

The use of the façade may, in some instances, provide the advantage that this conductive material need not be painted, colored, or otherwise changed to be less conspicuous, and still permit the material to be located on the lens housing in places where, without the use of a façade, it would be apparent to an observer.

In some embodiments, in the first device as described above comprising a façade, the conductive path may also comprise the lens housing itself (or portions thereof)—i.e. the lens housing could comprise a conductive material. The portions of the lens housing that comprise the conductive path may be of a different material than other portions of the lens housing, and this difference in material could be noticeable without an additional concealment process. The façade could be used in such embodiments to mask or cover these non-uniformities, so that the electronic frame appears as a single uniform material and composition.

In some embodiments, in the first device as described above comprising a façade, and as was noted above, the façade may be coupled to the lens housing utilizing an adhesive material. In general, any adhesive material that may suitably couple the façade to the lens housing may be used, such as for instance double sided tape or a glue epoxy. In some embodiments, in the first device as described above, the facade may be coupled to the lens housing utilizing one or more fasteners such as one or more screws. This type of fastener may be preferred in some embodiments, because the device may be designed so that a wearer (or a person or machine as part of the fabrication process) may readily align the façade properly with the lens housing. That is, the location of the screws on both the lens housing and the façade may be such that, when the screws are inserted properly, the façade is disposed so as to cover a desired portion of the lens housing. This may reduce human error that may be present in the use of adhesives (e.g. alignment may not be as precise).

In some embodiments, in the first device as described above that comprises a façade, the façade may be removably coupled to the lens housing. The term "removably" may refer to embodiments where the façade is coupled to the lens housing so as to permit the facade to be attached and detached without affecting the structure and function of the lens housing or other components of the electronic frame. For instance, the façade may be coupled to the lens housing using one or more screws such that a wearer (or other entity) may decouple the façade from the lens housing by unscrewing (e.g. removing) the screw, and may then recouple the same façade or a different façade by reinserting the screw or screws. However, any suitable means may be utilized. For instance, in some embodiments, the façade and lens housing may be configured such that the façade has a structural portion that connects (e.g. may be inserted into a groove or cavity) to the lens housing such that the two components are coupled. The components may be decoupled by applying an appropriate force in a particular direction. For example, the lens housing and the façade may be configured such that façade is pressure fitted to the lens housing.

Embodiments that comprise a façade that is removably coupled may provide some advantages. For instance, some embodiments may permit different façades to be used for the same base electronic frame. This may permit an electronic frame to provide different styles without requiring the purchase of multiple electronic frames (which could be increase expenses). In addition, the ability to couple and decouple the façade to the lens housing (or other portion of the frame) may permit access to one or more components that are typically covered by the façade. For instance, if the façade covers an electronic component, and that component needs to be removed, replaced, or otherwise interacted with, a removably coupled façade may be removed from the electronic frame to provide such access. In contrast, a device that comprises a façade that is not removably coupled may not provide ready access to such devices, and may cause damage to the electronic frames if the façade is removed.

In some embodiments, where the façade may be removably coupled to the lens housing, the lens housing may be configured to be coupled to a plurality of facades and each of the plurality of facades may be different. As noted above, this may permit different façades to be matched with different electronic frames, and readily allow for changes in the appearance and style of the device. In addition, in some embodiments, "different facades" may comprise façades that are made of the same materials and have the same appearance, but are separate components. That, is for instance, one façade may be replaced by an identical façade (which may be used, for instance, if the façade breaks or is otherwise damaged).

In general, the façade and/or the lens housing may comprise any suitable material. For instance, in some embodiments, in the first device as described above, the façade may comprise a metal and the lens housing may comprise a plastic material, such as for instance acetate. Such embodiments may for instance, permit the majority of the frame to be fabricated using an inexpensive material (either in the cost of the material itself or in the cost of fabricating a frame using the material) such as plastic, while giving the appearance of a more expensive or stylish frame (such as one that is made of a metal). However, embodiments are not so limited and in some embodiments, the façade may comprise a plastic material and the lens housing may comprise a metal. Similarly, in some embodiments, both the lens housing and the façade may comprise a metal material, or both the lens housing and the façade may comprise a plastic material.

The façade may also have any suitable shape or size. In some embodiments, it may be preferred, that the thickness of the façade is less than approximately 5 mm. In general, it may be desirable that the façade is not readily identifiable as a separate component from the frame. By fabricating the thickness of the façade so as to be relatively thin, this may assist in giving the appearance of a uniform frame, even from various viewing angles. However, it may also be desirable that the façade by structurally strong enough to withstand the typical forces experienced by the lens housing of spectacle frames.

With reference to FIG. 28, a top view and a front view of an exemplary electronic spectacle 2800 that comprises a façade 2804 is provided. The exemplary electronic spectacle 2800 comprises two temples 2801 that are coupled to the lens housing 2803 by hinges 2806. The lens housing 2803 is shown as a semi-rimless design (e.g. in this example, having eye wire on the top portion of the lens, but comprising nylon along the bottom portion of the lens to hold it in place. The electronic spectacles are also shown as comprising an electronics module 2802 located in one of the temples 2801. The façade 2804 is shown in this exemplary embodiments as providing the appearance of a full rimmed spectacle frame (that is, eye wire on the around the entirety of the lenses). Indeed, as shown, the façade 2804 covers the front portion of the lens housing 2803 such that there are no portions of the lens housing visible to an observer located in front of the electronic spectacles 2800. For instance, the façade extends so as to cover both hinges 2806 and lens housing 2803. The façade also comprises a bridge 2805 portion that extends between the two lenses.

With reference to FIG. 29, the same exemplary embodiment of electronic spectacles 2800 is shown from a rear view. As shown, the lens housing 2803 (shown as the darker portions of electronic spectacle frames 2800) is again shown as comprising a semi-rimless design. The façade 2804 is shown as covering the lens housing 2803 and also extending between and around the entirety of the lenses. However, as can be seen, the façade 2804 does not provide structural support to the lenses, as the lenses are held in place by the lens housing 2803 which connected to hinges 2806. In this exemplary embodiment, the electronic spectacle frames 2800 will provide the appearance of a full rimmed spectacle frame (based on the appearance of the façade 2804), while comprising a lens housing 2803 that is semi-rimless. As was described above, the façade 2804 may comprise any material and may be coupled to the lens housing 2803 using any suitable means, including those described in detail above.

It should be understood that, after reading the disclosure provided herein, a person of ordinary skill in the art may understand that various combinations of the devices described above may be made such that some or all of the features described with regards to one device may be combined with some or all of the features of another device.

Spectacle Lens Frame Electronics

As noted above, electronic spectacles and frames may comprise any suitable electronic components. That is, for instance, exemplary spectacle frames such those describe above, or any other electronic spectacles such as, for instance, those described in U.S. patent application Ser. No. 12/684,490, filed Jan. 8, 2010 and entitled "ELECTRO-ACTIVE SPECTACLES AND ASSOCIATED ELECTRONICS" (incorporated by reference herein in its entirety) can comprise electronic components to provide a variety of functions, such as, for example, control of electro-active lenses. Additional exemplary functions (and components to accomplish the functions) are described below.

These components, whether alone or in some combination, can be built into or otherwise coupled to the spectacle lens frame or lenses and/or be located remotely and be in communication with components on the electronic spectacle frame or lens. Some of the components may be controlled by the wearer. Moreover, each of the components described below may be located on electronic frames that comprise some or all of the features described above. Furthermore, the components (including the electrical components referenced) and descriptions provided herein are exemplary, and many variations and combinations of these features may be included.

Fall Detector Module:

A fall detector module may be used by seniors or other individuals to determine if a fall has occurred. These modules may utilize, by way of example, an accelerometer, a gyroscope, or other motion sensor coupled to the electronic spectacles worn by a user. If a fall is detected, the module can trigger an alarm system in a house, an alarm could be sent to preset phone numbers (e.g., 9-1-1), and/or a message may be sent to one or more e-mail addresses. In some embodiments, electrical components located on the electronic spectacles may also enable a manual signal (such as a call to a preset phone number or e-mail address) with, for example, a finger touch to the temple or the press of a button located somewhere on the electronic spectacles (such as a touch twitch). These manual operations could also thereby serve as an indication that a wearer has suffered a fall or other emergency situation.

In some embodiments a Fall Detector Module may comprise a small electronic module coupled to, or disposed within, the frame or the lenses of electronic spectacles. The module may be disposed in any suitable location on the electronic frames, and may be coupled thereto in any suitable manner. For instance, the Fall Detector Module may be disposed on the electronic spectacles in the manners described above with regard to the electronics module. Moreover, the components disposed within the fall detector module may be electrically or operationally coupled to one or more components that are disposed outside of the module (such as a power source or transmitter).

In some embodiments, the Fall Detector Module may include various electrical components. For instance, as noted above the module may comprise a fall sensor to detect that a fall has occurred (e.g., a micro-accelerometer or a micro-gyroscope). The module may also comprise a power source, a controller, and/or a small transmitter. The controller may include a microprocessor that may receive signals from the fall sensor and determine whether a fall has occurred. The controller may also comprise preprogrammed instructions (e.g. stored in a memory device) to execute one or more functions so as to provide an alarm or notification service (e.g. the controller may be configured to send a signal via a transmitter indicating that a fall has occurred, such as dialing or connection to a phone number such as 9-1-1; sending an email; etc). In some embodiments, a modified cell phone or a number of signal relay devices present in the house (or in any suitable location) can detect the alarm signal from the module, and send a series of emergency information (e.g. test message, e-mail, phone call, etc) via an existing network (e.g. internet, cell phone, or custom network) to individuals or health care institutes. In some embodiments, the device may utilize an ITO patterned layer (or other transparent or translucent materials) of electro-active lenses as a transmitter (e.g. an antenna); however, embodiments are not so limited. For instance, a conductive material may be disposed in the frames (e.g. within a portion of the temple) or within the module that may be used to transmit a signal.

Step Counter and Timer Module:

In some embodiments, a Step Counter and Timer Module may be include that, for instance, may count the number of steps taken by a wearer (e.g. for walker or jogger) over a given period of time. This may be used to determine the distance traveled by a wearer for a set period of time, the wearer's pace (e.g. miles-per-hour or average time to complete a mile), and/or any other relevant information. In some embodiments, this information may be displayed to a user via a heads-up display (HUD) in the lenses of the electronic spectacles in real time (e.g. while the wearer is exercising). The Step Counter and Timer Module may also comprise a button (e.g. touch switch) that may reset and/or display these results (e.g. pertaining to time and distance) on a small LCD housed on the frame or via a HUD.

In some embodiments, the components of the module may include a motion detection and/or distance detection system to determine the distance travelled by the wearer. This may include, for example, a power source, a sensor, and/or a controller (that may comprise hardware, software, and/or firmware) to count the number of steps taken. The controller may be a simple counter (e.g. it may simply count the number of steps taken based on signals received by the sensor) or it may include calibration techniques to adjust the distance measurements to the particular wearer for more accurate measures. The sensor may comprise, by way of example, micro-electromechanical (MEMS) inertial sensors and software that detect steps (in some embodiments, the software may form a part of the controller that receives the signals from the motion sensor). Examples of such sensors may include, for example, a micro-accelerometer and/or a gyroscope that detects either 1-, 2- or 3-axis of acceleration. The sensor may also comprise a vibration detector, which may utilize any suitable method of detecting when a step occurs, such as piezoelectric materials that generate a voltage or a simple mechanical sensor. This information may be sent from the sensor to the controller, which may then determine the number of steps taken.

In some embodiments, the module may also include a timing mechanism. The timing mechanism may function like a stop-watch, which may be activated by the user in any suitable way (such as via sudden movement of the head, or through the use of a button or switch on the electronic frames). The timer may comprise a portion of the function provided by the controller, or may be a separate component. As noted above, in some embodiments, the module may further include a display system, such an LCD screen or components of a HUD to convey the relevant information to a wearer.

Drowsiness Detector and Alarm Module:

In some embodiments, a Drowsiness Detector and Alarm Module may be included on the electronic spectacles. This module may, for instance, be utilized for long distance drivers or individuals that work late shifts to determine their level of alertness and their ability to operate a motor vehicle or other heavy machinery safely. The module may, for example, detect sudden head motion (or any other motion associated with drowsy behavior) and trigger an alarm when the predefined motion is detected.

In some embodiments, the module may comprise components such as a motion sensor, a controller, an alarm or display, etc. The sensor may, for instance, detect a sudden movement (or other movement associated with drowsiness) and send this information via a signal the controller. The controller can process the data received from the sensor and trigger an audible or visible alarm if it is determined that such action is necessary. The motion sensor may comprise, by way of example, a micro-gyroscope, accelerometer, or any other suitable motion detector.

The controller may comprise a micro-processor, hardware, software, and/or firmware to receive and process the information from the sensor and to activate an alarm if necessary. The alarm may, in some embodiments, be included in the electronic spectacle frames or lenses, or could be located remotely. For example, an external alarm may be located on the wearer's person and may vibrate, or an alarm could comprise the wearer's car stereo, etc. In such embodiments, the electronic frames may further include a transmitter to send a signal to the external alarm components to activate the device.

Timer as Taking Pill Reminder Module:

In some embodiments, the electronic spectacles may comprise a Timer as Taking Pill Reminder Module (or any other reminder module). The module may, for example, use an audio (for a wearer to hear) or visual (such as an LED or HUD for the wearer or a third-person to see) signal to indicate that it is time for the wearer to take his medication (or to perform any other tasks); however, embodiments are not so limited, and may comprise a timer and an alarm that may be set by a user for any purpose.

In some embodiments, the Time as Taking Pill Reminder Module may comprise electronic components such as, for example, an electronic timer, controller, a visible or audible alarm, and an input component. The electronic timer (such as an electronic clock) may comprise any suitable components to determine time, date, time lapsed, etc. The controller may comprise a micro-processor, hardware, software, and/or firmware to receive and process the information from the timer and to activate an alarm if necessary. The alarm may, in some embodiments, be included in the electronic spectacle frames or lenses, or could be located remotely. For example, an external alarm may be located on the wearer's person and may vibrate, or an alarm could comprise sending a signal to another device (such as an email or text message to a cell phone).

The input component may enable a wearer to enter time and date information to set a reminder, and may include, by way of example, a keyboard entry component, a voice recognition system—which would require a microphone, etc. The input component may also receive a signal from an external device such as a cell phone, personal computer, laptop, etc. that may be used to program the controller or timer with the information about a reminder. This may utilize any suitable method of transferring date, including a physical interface (such as a USB input), short range communication (e.g. Bluetooth®), radio frequency, or other network interface (Wi-Fi, Wi-Max, wireless network, etc). The module may also be capable of storing multiple dates and timers (e.g. multiple different medication reminders), and may provide different indications for each reminder.

UV Light Monitor Module:

In some embodiments, electronic spectacles may comprise an Ultra Violate (UV) Light Monitor module. This module may, for example, be utilized during outdoor activities to determine the risk to a wearer associated with harmful UV rays and alert the wearer to this risk. In some embodiments, the module may comprise a sensor (that may be disposed the frame or the lenses) that can detector the UV intensity of light. This may include, for example, a photodiode or photocathode. The module may also comprise a controller, which may comprise a micro-processor, hardware, software, and/or firmware to receive and process the information from the sensor and to determine the level of risk associated with exposure to the UV light. The module may further include a display to indicate to the wearer or a third party the current level of UV light and/or the associated risk to the wearer. The display may include an LED indicator or other display (such as an LCD) or a HUD in the lenses of the electronic spectacles to provide this information to a wearer. For example, when UV intensity detected by the sensor passes a certain predetermined limit, a visible or audio indicator (e.g., an LED or audible beeper) may provide a warning signal to the wearer.

Emergency Wireless Call Module:

In some embodiments, electronic spectacles may comprise an Emergency Wireless Call Module that may, for example, be utilized by seniors or other individuals to alert authorities as to an emergency. The module may for example utilize a preset phone number, e-mail address, or other device and any communication medium to send out a signal related to an emergency. The module may include a sensor or input component that may be used to activate the module. For example, the sensor may comprise a touch switch or other push button that may be activated using a finger touch to the temple of the electronic spectacles. The module may include or be combined with a GPS or other position locator to identify the location of the individual and/or the emergency. This location information may be sent along with the emergency message to enable a more rapid response to the emergency. Embodiments may also provide the ability to communication (e.g. verbally) through the module to an emergency responder or third party.

The Emergency Wireless Call Module may comprise any suitable electronic components such as a sensor, a controller, and/or a transmitter. The transmitter may comprise any suitable components to provide a signal processing path for connecting to an outside network, such as those described with reference to the fall detector module, or any other suitable components. These may comprise an antenna that may be disposed in the frame (e.g. a temple), in the lens, and/or within the module. The controller may comprise a microprocessor, software, hardware, and/or firmware that may receive a signal from the sensor, connect to a network, and send an emergency message (or otherwise facilitate the communication between the wearer and a third party).

Directional Hearing Aids Module:

In some embodiments, the electronic spectacles may include a Directional Hearing Aid Module that may be utilized to enhance the hearing of the wearer. The module may comprise, for instance, hearing aids or other auditory assistance devices coupled to the electronic frame. As used herein, a hearing aid may refer to any electro-acoustic device that typically fits in or behind the wearer's ear, and is designed to amplify and/or modulate sound for the wearer. Any suitable hearing aid that may be disposed within, or coupled to, the electronic spectacles may be used. The hearing aid may include an internal power source, or the hearing aid may be connected to a power source disposed on, or within, the electronic spectacles. In some embodiments, the electronic spectacles may comprise multiple hearings aids. Each hearing aid may be powered by a separate power source or by a single power source (e.g. using a conductive path across the lens housing).

Pulse and Partial Oxygen Concentration (P02) Monitor Module:

In some embodiments, the electronic spectacles may comprise a Pulse and Partial Oxygen Concentration (P02) Monitor Module that may, for example, comprise a small electro-optical sensor or acoustic sensor that can be placed at the area near the ear of the user, or other suitable location to detect hear rate and other vital signs. In some embodiments, the module may comprise a receiver that receives signals from a device that may be located on the wearer's body (such as a strap across the wearer's chest), where the device or component monitors the pulse rate and sends this information to a controller disposed within the module for recording and/or analysis. This information may then be displayed to a wearer (e.g. via a HUD or LCD display).

In some embodiments, the module may further comprise an electro-optical sensor (or other similar device) that may be capable of measuring the blood oxygen level of the wearer using, for instance, pulse oximetry. This may comprise an external component that may extend from the electronic spectacles to the wearer's ear that may be in communication with one or more components on the electronic spectacle frames (such as a controller). That is, for instance, a sensor may be disposed in a location such that light having certain wavelengths may be passed sequentially through the wearer (e.g. the wearer's ear) and received by a photo detector. The difference in the absorbance of light of different wavelengths may then be measured, enabling the determination of the absorbance due to the pulsing arterial blood alone (excluding other factors such as venous blood, skin, bone, muscle, fat, and etc). This information may be sent to a controller or similar device, which may then determine the amount of the oxygen in the blood.

The Pulse and Partial Oxygen Concentration (P02) Monitor Module may also comprise components for displaying the results of the vital statistics that were measured, such an LCD display or a HUD in the lenses. The module may also comprise an alarm, and the controller maybe configured to trigger the alarm if abnormal readings are found. In some embodiments, components (such as those described above with regard to the Fall Detector Module) for alerting emergency services or other individuals may also be utilized.

RFID Monitor Module:

In some embodiments, the electronic spectacles may include a radio frequency identification (RFID) Monitor (or other near field communication device such as Bluetooth®, contactless interfaces, etc.). This module may comprise, for example, an antenna that may be embedded in the lenses or elsewhere in the frame (e.g. in one of the temples). The module may be coupled to the frame, such disposed within a portion of the frame (which may contain other electronics, including an electronics module). The RFID Monitor Module may be utilized to send and/or receive information from components or devices that may otherwise not be coupled to the electronics disposed on the electronic spectacles and thus may be utilized in combination with some of the embodiments described above.

In some embodiments, the "working mode" for the module can be passive or active. For example, in passive mode, the module may not require its own power source, but may utilize a magnetic or electric field generated by another device to activate and thereby send or receive information. The RFID Monitor Module may include a microprocessor and/or memory storage device coupled to the antenna. The module may be used for any suitable purpose, such as for security (e.g. it may comprise encrypted information that may be used to access a location or files on a computer), to make payments (e.g. the microprocessor and memory device may comprise payment account information that may be sent to a point-of-sale terminal to complete a financial transaction), to identify individuals, etc. The module may also be used by a locator (e.g. it may be scanned by a device that can identify the individual, thereby identifying the individual as being at the location where the scanner is located).

Flash Memory Card Module:

In some embodiments, the electronic spectacles may include a Flash Memory Module that may be utilized to store and transport information. For example, a personal computer or other communication device may read or write to the module contained in the electronics spectacles, such as within one of the temples. In some embodiments, the Flash Memory Module, and the memory device stored therein, may be coupled to an RFID Monitor Module or other communication device so as to send and receive data, or there could be a physical interface to the module. That is, for instance, in some embodiments, the information may be transferred to or from the memory device wirelessly or through a physical interface (such as a USB port). The Flash Memory Module may also comprise a power source and/or a controller.

Digital Watch and Alarm Module:

In some embodiments, the electronic spectacles may include a Digital Watch and Alarm Module that may maintain the current time and alert an individual when particular time occurs. This module may comprise similar components as those that were described above with reference to the Timer as Taking Pill Reminder Module, including an electronic clock, power source, controller, input device (for setting times for an alarm), alarm system (or other visual or audio alerts), etc. The module may also comprise a display (such as an LCD display or a HUD) or even an audio indication that may provide the time to the wearer. For example, this module may comprise a press button or other touch switch that a wearer may interact with such that a signal is sent to a controller in the module to display the time.

Electronic Eyewear Repairing Kits:

In some embodiments, the electronic spectacles may comprise a module that may include tools that may be used for immediate eyeglass repair and maintenance. This module may, for instance, store components such as conductive rubber strips, a conductive glue dispenser, screws, screw driver, etc. The Electronic Eyewear Repairing Kits may be a physically separable module that may be inserted into a cavity or opening of the eyeglass frames, or could be a component that could be coupled to the outer surface of the electronic frames. In some embodiments, the module may be permanently coupled to the electronic spectacles, and the tools and components may be inserted and removed as needed.

Voice Recorder Module:

In some embodiments, an electronic spectacle frame may include a Voice Recorder Module. This may be used, for instance, to record audio messages from the wearer, to dictate correspondences and letters for the wearer, or to record audio noises that the wearer is hearing (such as recording a speech or a lecture). This may comprise, for instance, a sensor (such as a push button or touch switch) that may activate the voice recording function. The module may further include a microphone, power source, data storage device, speaker or audio output (for the wearer to hear the recorded audio data), and or a transmitter for sending the audio data to another device. In some embodiments, the voice recorder module (or the storage component therein) may be read by a wireless reader and played on a speaker, or any other suitable playback mode. That is, for example, the Voice Recorded Module may be coupled to a RFID Monitor Module, or comprise similar components (such as a physical interface) for transferring the information stored therein.

Battery Pack:

In some embodiments, electronic spectacles may include an extra battery pack. The extra power source may be stored, for instance, as a backup power for a lens driving module or any other electronic component. The battery pack may be stored within the electronic frames (e.g. within a component or module of a temple or the lens housing) or may be coupled to an outer surface using any suitable means.

Spy Video or Still Picture Recorder:

In some embodiments, the electronic spectacles may comprise a recording device such as a miniature video camera (e.g., a pin hole camera) or still picture recorder (e.g. a camera) and associated equipment. This module and components may be utilized, for instance, to record visual images without outside observers being aware of the recording device. The spy video or still picture recorder may be coupled to a power source (e.g. a battery), a controller, a sensor, and/or a data storage device. The controller may be coupled to the sensor, such that the wearer may activate or deactivate the recording device based on an interaction with the sensor (e.g. a touch switch or a device such as a micro-accelerometer that may detect a sudden movement of the wearer's head). The sensor may send a signal to the controller, which may then determine whether to activate the recording device. The data storage device may comprise any suitable component, such as RAM or Flash memory. This data stored in the storage device may be retrieved from the electronic spectacles using any of the suitable methods described herein. For example, in some embodiments there may be a physical interface to the storage device (which may, in some embodiments, comprise a part of the recording device) or the electronic spectacles could wireless transfer the data (including in real time) to a receiving device using an antenna, short range communications, or similar method.
Thermometer In some embodiments, the electronic spectacles may comprise a digital thermometer that may measure and display the temperature of the surrounding environment (e.g. ambient temperature). That is, for instance, the electronic spectacles may comprise a variable resistor or other device that may have a variable voltage drop based on the temperature of the device (which can therefore be monitored to determine a corresponding temperature). However, embodiments are not so limited, and any suitable electronic thermometer may be used. The thermometer may be electrically coupled to a display and/or a sensor, such that the wearer may interact with the sensor and thereby request that the display show the current temperature. The display may, for example, comprise a LCD display or a HUD.
Remote Controller In some embodiments, the electronic spectacles may include a controller for other devices (e.g. a garage door, a car, a TV, etc). For example, the electronic spectacles may comprise the components of a typical remote control device, such as a controller, a sensor, a storage device, and a transmitter (such as an antenna or infrared device). The storage device may
contain information on the instructions, protocols, codes, and transmission/reception standards for activating or controlling a device that is not otherwise coupled to the electronic spectacles. The sensor (or other input components) may be configured to receive a command from a wearer, and signal to the controller to convey instructions or information to the remote device. For example, a sensor that may be disposed on the side of the temple of spectacles may be touched or pressed using certain predefined finger moves to indicate different desired functionality—which may very convenient for seniors. The controller may then utilize the predefined functions and corresponding instructions stored in a memory device to identify instructions to send to the remote device corresponding to a desired function requested by the wearer. The controller may then utilize the transmitter to send this information wirelessly to the remote device.
Data Collection Unit In some embodiments, electronic spectacles may include a Data Collection Unit that may be used by a wearer to record information about the wearer, the wearer's surrounding, or another suitable information. For example, in some embodiments, data that can be collected may include the on and off angles when the eyeglass are controlled manually, the time interval between two sequential battery charges, the wearer's behavior or physical state (such as daily calorie burning rate, real time pulse, skin moisture, daily UV exposure), etc. The Data Collection Unit may comprise one or more sensors, a controller, and/or a storage device for receiving and storing relevant data, or it may be operatively coupled to any of the components in described with respect to the modules above. The data that is collected may be wirelessly transferred to a device (e.g. using an antenna and connecting to a network such as a mobile device network) with high computation power in-real time, or stored in the memory residing in the module and transferred after data collection (e.g. using an RFID module or physical interface). The receiving device may for instance use artificial intelligence to analyze the data for specific applications, such as to train the software to reset the personalized control parameter, or provide recommendations for wearer's daily activity.

In some embodiments, the data collection unit may be a unit separate from the frame/lens electronics that can be used to capture data stored in the electronic frames. For example, data stored in RAM included in the lens electronics can be relayed to a remote unit for analysis. Data may be relayed via a wireless or wired link (including e.g. infrared or radio frequency). In some embodiments, data may be stored in local storage disposed within the frame electronics for long periods of time and then collected (or transferred) periodically or, as noted above, there may be instantaneous data collection in some instances.
Embodiments Comprising a Moisture Barrier For some embodiments comprising electronic frames that may include one or more electrical connections between an electronic component (or components) that may be disposed on the electronic frames and one or more electro-active lenses that may be coupled to a lens housing, the inventors have found that one issue that may arise in some instances is that moisture may affect the conductive path between these components. That is, moisture may affect the electrical contacts between the electrical components disposed in the electro-active lens and the electrical components disposed outside of the lens. The moisture may create inconsistent performance of the electro-active lenses and/or result in one or more failed connections between the components (i.e. the electrical path may be severed such that current cannot flow between the components). The inventors have found this to be particularly prevalent for the electrical connections that are formed around the periphery of the electro-active lens.

The moisture may contact the conductive paths between the electronic components on the electronic frames and the electronic components disposed in the electro-active lenses based on, for example, openings that may exist from the manufacturing process (e.g. the connection may not be fully sealed to the outside environment) or even from degradation of the components during use (which may create gaps or otherwise expose the electrical connections between the components). Indeed, the inventors have found that salt (which may contact the lens from a wearer's skin or perspiration) may degrade the components of the electronic spectacles (such as the lenses) and thereby create openings and/or otherwise expose and degrade the conductive paths.

In some embodiments, a first device, may be provided. A first device may include a lens comprising at least a first electrical contact, a lens housing holding the lens, where the lens housing comprises at least a second electrical contact, and a conductive element disposed between the first and the second electrical contact, wherein the conductive element electrically connects the first and second electrical contacts. The first device may further comprise a barrier layer that is disposed so as to cover at least a portion of the conductive material. The "barrier layer" may be disposed so as to cover the conductor (or a portion thereof) at or near the periphery of the lens such that it may not be exposed to the external environment. As noted
above, the inventors have found that the location between the electro-active lenses and the lens housing typically tends to be where the conductors are exposed to the external environment. The barrier layer may be moisture resistant, such that it may prevent moisture from contacting the electrical connections. In some embodiments, the barrier layer of moisture resistant material may comprise a polymer substance.

In some embodiments, the barrier layer may be applied or disposed in areas of the electronic spectacles between two components (such as between the lens housing and the electro-active lenses). In some embodiments, these components of the electronic spectacles may be coupled in advance, and the barrier layer may be applied in a later process (e.g. as part of a finishing or sealing process after the electrical connections have been formed). This may be preferred because, for instance, the barrier layer may function to prevent the electrical connection at the interface between the components from being exposed to the external environment. Thus, in some embodiments, once the barrier layer is set, access to this interface may be limited. However, embodiments are not so limited, and the barrier layer may be applied at any suitable time.

The inventors have found that in some embodiments it may be preferred that the barrier layer may comprise a material that has a viscosity that is thin enough such that it may be applied or injected into the areas between the components of the electronic spectacles. As noted above, in some embodiments the barrier layer may be applied to prevent or limit contact with moisture (e.g. water) and, therefore, it may be preferred that the viscosity of the barrier layer material be comparable to water. In this manner, the barrier layer may be applied to (and thereby disposed in) the same areas that would otherwise be accessible to this moisture. In some embodiments, where the barrier layer may comprise a polymer material (such as a two component epoxy), after the barrier layer has been applied to the electronic spectacles, it may be cured to set the material in place. In general, the barrier layer may be cured using any suitable process, such as visible light curing, ultra-violet curing, and/or thermal curing. In some embodiments, where thermal curing is used, the material of the barrier layer may be chosen such that it may be cured at a low enough temperature that the other components of the electronic spectacles (e.g. the lenses, lens housing, and/or electronics) are not affected by the increase in temperature.

The inventors have also found that, in some embodiments, it may be preferred that the material that comprises the barrier layer be flexible and/or soft enough such that it does not damage (or damage other components, such as the lens) when experiencing the typical forces of daily use. For instance, when the barrier layer is disposed in the area between the lens housing and the lens component, there may be forces applied to either one of, or both of these components in various directions. If the barrier layer is too rigid, this force may be applied to the lens, which could cause chipping or cracking. This may result, for example, in exposure of the electrical contacts, damage to the lens, and/or one or more components could be decoupled.

Figure 30:
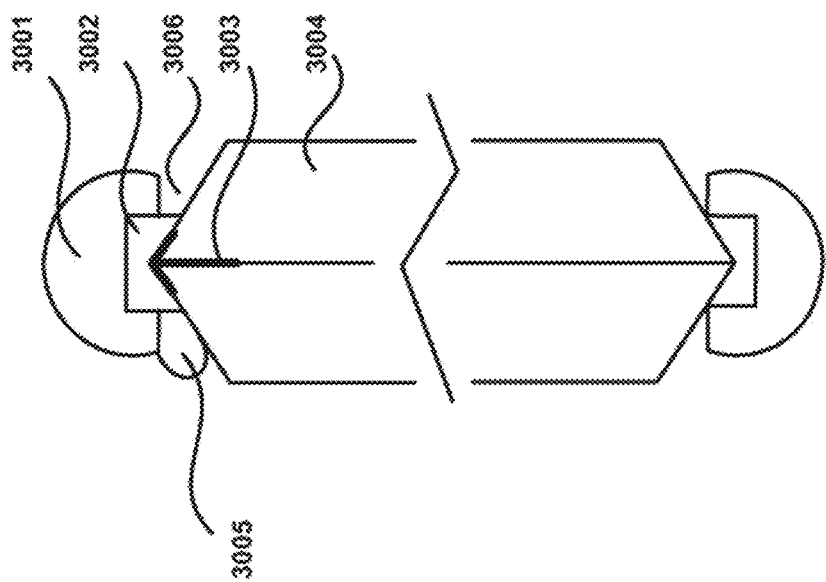
FIG. 30 shows an exemplary barrier layer coupled to electronic spectacles in accordance with some embodiments.

An exemplary embodiment that comprises a barrier layer applied to electronic spectacles so as to prevent or limit exposure of the electrical contacts between a lens and a lens housing to the outside environment (including to moisture) is shown in FIG. 30. The electronic spectacles comprise a lens housing 3001, a conductor 3002 (in this case, shown as a compliant conductive material), conductive paint 3003 that forms a part of an electrical path to one or more electrical components of the lens 3004, and a barrier layer 3005. As shown in FIG. 30, in some instances a space or area may exist between the lens housing 3001 and the lens 3004 shown as air gap 3006. As noted above, this may be created during the manufacturing process (e.g. the lens housing 3001 and a portion of the lens 3004 do not fit tightly so as to seal the components there between from exposure to the outside environment) and/or may develop through use of the spectacles. On the opposite side of the air gap 3006 shown in FIG. 30 is a barrier layer 3005 that has been disposed so as to insulate the conductor 3002 from the external environment. The barrier layer 3005 is shown as disposed within the area between the lens housing 3001 and the lens 3004. As noted above, the barrier layer 3005 could have been injected into this region between these components, and may have been cured thereto so as to be coupled to the lens housing 3001 and/or the electro-active lens 3004.

Combination of Elements

Although many embodiments were described above as comprising different features and/or combination of features, a person of ordinary skill in the art after reading this disclosure may understand that in some instances, one or more of these components could be combined with any of the components or features described above. For instance, embodiments of electronic frames that comprise a spring hinge may also comprise any one of, or some combination of (1) a compliant conductive material; (2) a façade; (3) a housing module that is coupled to an electronics module; and/or (4) one or more electronics modules (and/or a conductive path form one electronics module to one or both electro-active lenses): Similarly, embodiments that comprise a compliant conductive material may also comprise any one of, or some combination of: (1) a façade; (2) a housing module that is coupled to an electronics module; and/or (3) one or more electronics modules (and/or a conductive path form one electronics module to one or both electro-active lenses). Similarly, embodiments that comprise a façade may also comprise any one of, or some combination of: (1) a housing module that is coupled to an electronics module; and/or (2) one or more electronics modules (and or/a conductive path form one electronics module to one or both electro-active lenses). Similarly, embodiments that comprise a housing module that is coupled to an electronics module may also comprise one or more electronics modules (and/or a conductive path form one electronics module to one or both electro-active lenses). Moreover, the exemplary features and aspects of any of the above embodiments may also be used in any suitable combination, as would be understood by one of ordinary skill in the art after reading this disclosure.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

The invention claimed is:

1. An electronic spectacles frame comprising:
   a first temple;
   a first electronics module disposed in the first temple comprising at least one electronic component;
   two pogo pins disposed in the first temple to maintain an electrical connection to the at least one electronic component;
   a second temple;
   a second electronics module disposed in the second temple;
   a lens housing movably coupled to the first temple and movably coupled to the second temple, the lens housing comprising a housing conductor positioned in an upper rim portion of the lens housing, extending across a bridge of the electronic spectacles frame, and forming a portion of a first conductive pathway through at least part of the lens housing to the first electronics module, wherein the first conductive pathway extends into the first electronics module to connect to the at least one electronic component such that at least a portion of the first conductive pathway is sealed within the first electronics module;
   a first conductor disposed in the first temple and forming a portion of the first conductive pathway;
   a second conductor disposed in the second temple forming a portion of a second conductive pathway between the second electronics module and the lens housing;
   a camera, disposed in the electronic spectacles frame and operably coupled to the first electronics module, to acquire images;
   a processor, disposed in the electronic spectacles frame and operably coupled to the camera, to control the camera;
   a data storage device, disposed in the electronic spectacles frame and operably coupled to the camera and the processor, to store images acquired by the camera; and
   a wireless communications device, disposed in the electronic spectacles frame and operably coupled to the processor and the data storage device, to transfer data wirelessly from the data storage device to a remote device,
   wherein the first and second conductive pathways are each one of a plurality of continuous electrically isolated pathways.

2. The electronic spectacles frame of claim 1, further comprising:
   a first hinge mechanically coupling the first temple and the lens housing, wherein at least a portion of the first hinge is electrically conductive and forms a portion of the first conductive pathway.

3. The electronic spectacles frame of claim 2, wherein the first hinge is configured to provide a portion of the first conductive pathway at each of a plurality of angles between the lens housing and the first temple.

4. The electronic spectacles frame of claim 1, further comprising:
   a first hinge mechanically coupling the first temple and the lens housing, wherein the first conductor is disposed adjacent to at least a portion of the first hinge.

5. The electronic spectacles frame of claim 1, further comprising:
   a first hinge mechanically coupling the first temple and the lens housing, wherein the first conductor is disposed within the first hinge.

6. The electronic spectacles frame of claim 1, further comprising:
   an insulating material electrically insulating the first conductive pathway and the second conductive pathway.

7. The electronic spectacles frame of claim 1, wherein the first electronics module comprises:
   a battery electrically coupled to the camera, the processor, and the data storage device; and
   an insulating layer disposed between the battery and the at least one electronic component in the electronic spectacles frame.

8. The electronic spectacles frame of claim 7, further comprising:
   a switch, electrically coupled to the processor, to provide control of the at least one electronic component.

9. The electronic spectacles frame of claim 1, wherein the lens housing further comprises a first rim and a second rim, at least one of the first rim or the second rim comprising a rim conductor.

10. The electronic spectacles frame of claim 1, wherein the lens housing further comprises a barrier layer to create a substantially moisture-resistant environment within the lens housing.

11. The electronic spectacles frame of claim 1, wherein the camera records at least one of video or photographs.

12. The electronic spectacles frame of claim 1, wherein the first electronics module comprises a speaker.

13. The electronic spectacles frame of claim 1, further comprising:
    a microphone, disposed in the electronic spectacles frame, and operably coupled to the processor, to receive voice commands from a wearer.

14. The electronic spectacles frame of claim 13, wherein the wireless communications device is configured to send audio data acquired by the microphone to the remote device.

15. The electronic spectacles frame of claim 1, wherein the wireless communications device comprises an antenna, and the wireless communications device transfers data wirelessly between the processor and the remote device.

16. The electronic spectacles frame of claim 1, wherein the housing conductor connects the first conductor and the second conductor.

17. The electronic spectacles frame of claim 1, wherein the housing conductor is used to route signals from the first electronics module to the second electronics module.

18. The electronic spectacles frame of claim 1, wherein the housing conductor is completely embedded within the electronic spectacles frame and is not visible.

19. The electronic spectacles frame of claim 1, further comprising:
    a fastener securing at least one of the first electronics module or the second electronic module.

20. The electronic spectacles frame of claim 1, wherein at least one of the first electronics module or the second electronic module is pressure fitted into position.

21. The electronic spectacles frame of claim 1, wherein one of the two pogo pins forms a portion of the first conductive pathway.

22. The electronic spectacles frame of claim 1, wherein at least one of the first electronics module or the second electronic module is detachable.

23. An electronic spectacles frame comprising:
    a lens housing having a housing cavity formed therein, the housing cavity comprising:
    a first housing conductor positioned in an upper rim portion of the lens housing, extending across a bridge of the electronic spectacles frame, and providing a portion of a first conductive pathway; and a second housing conductor in the upper rim portion of the lens housing, extending across the bridge of the electronic spectacles frame, and providing a portion of a second conductive pathway electrically isolated from the first conductive pathway;

a first lens and a second lens supported by the lens housing;

a first temple hingedly coupled to one side of the lens housing, the first temple comprising a first module of electronic components in a first temple cavity, a first temple conductor attached to a first spring and providing a portion of the first conductive pathway between the first module of electronic components and the lens housing, and a second temple conductor attached to a second spring and providing a portion of the second conductive pathway between the first module of electronic components and the lens housing, wherein the first temple conductor, the second temple conductor, the first spring, and the second spring are embedded in the first temple cavity;

a second temple hingedly coupled to another side of the lens housing, the second temple comprising a second module of electronic components in a second temple cavity, a third temple conductor providing a portion of the first conductive pathway between the second module of electronic components and the lens housing, and a fourth temple conductor providing a portion of the second conductive pathway between the second module of electronic components and the lens housing;

at least one camera disposed in the electronic spectacles frame and operably coupled to at least one of the first module of electronic components or the second module of electronic components;

at least one microphone disposed in the electronic spectacles frame and operably coupled to at least one of the first module of electronic components or the second module of electronic components; and at least one wireless communication device comprising an antenna disposed in the electronic spectacles frame and operably coupled to at least one of the first module of electronic components or the second module of electronic components, wherein the electronic components comprise at least a battery, a processor, and a data storage device, wherein an insulating layer electrically isolates at least one of the electronic components in the first module of electronic components from the first temple, and wherein the first conductive pathway is a physically continuous conductive pathway connecting the first module of electronic components and the second module of electronic components via the first housing conductor, the first temple conductor, and the third temple conductor regardless of a position of the first and second temples with respect to the lens housing.

24. The electronic spectacles frame of claim 23, wherein the first conductive pathway is configured to route signals from the first module of electronic components to the second module of electronic components.

25. The electronic spectacles frame of claim 23, wherein the first housing conductor traverses the upper rim portion of the lens housing via the bridge from a first hinge connecting the first temple to the lens housing to a second hinge connecting the second temple to the lens housing.

26. The electronic spectacles frame of claim 23, wherein the first temple conductor and the first spring form a first pogo pin and the second temple conductor and the second spring form a second pogo pin.

27. The electronic spectacles frame of claim 23, wherein at least one of the first module of electronic components or the second module of electronic components is detachable.

* * * * *